(12) United States Patent
Fujita et al.

(10) Patent No.: US 11,959,652 B2
(45) Date of Patent: Apr. 16, 2024

(54) MACHINE LEARNING APPARATUS, AIR CONDITIONING SYSTEM, AND MACHINE LEARNING METHOD

(71) Applicant: DAIKIN INDUSTRIES, LTD., Osaka (JP)

(72) Inventors: Naotoshi Fujita, Osaka (JP); Hiroshi Nakayama, Osaka (JP); Yasunori Okamoto, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 436 days.

(21) Appl. No.: 17/604,491

(22) PCT Filed: Apr. 24, 2020

(86) PCT No.: PCT/JP2020/017806
§ 371 (c)(1),
(2) Date: Oct. 18, 2021

(87) PCT Pub. No.: WO2020/218563
PCT Pub. Date: Oct. 29, 2020

(65) Prior Publication Data
US 2022/0205661 A1     Jun. 30, 2022

(30) Foreign Application Priority Data

Apr. 26, 2019 (JP) .................... 2019-086781
Apr. 26, 2019 (JP) .................... 2019-086782
Apr. 26, 2019 (JP) .................... 2019-086785

(51) Int. Cl.
*F24F 11/46*     (2018.01)
*F24F 11/63*     (2018.01)
(Continued)

(52) U.S. Cl.
CPC .............. *F24F 11/46* (2018.01); *F24F 11/63* (2018.01); *F24F 11/83* (2018.01); *G05B 19/042* (2013.01);
(Continued)

(58) Field of Classification Search
CPC .. F24F 11/46; F24F 11/63; F24F 11/83; F24F 2110/12; F24F 2110/22; F24F 2140/50; F24F 2140/60; G05B 2219/2614
(Continued)

(56) References Cited

U.S. PATENT DOCUMENTS 6,732,540 B2    5/2004   Sugihara et al.
2010/0023167 A1   1/2010   Ito et al.
(Continued)

FOREIGN PATENT DOCUMENTS

CN    201129823 Y    10/2008
CN    101646905      2/2010
(Continued)

OTHER PUBLICATIONS

International Preliminary Report on Patentability for PCT/JP2020/017806 dated Nov. 4, 2021.
(Continued)

*Primary Examiner* — Jigneshkumar C Patel
(74) *Attorney, Agent, or Firm* — IPUSA, PLLC

(57) ABSTRACT

A machine learning apparatus for optimizing transfer of heat quantity is provided. A machine learning apparatus for learning at least one of a temperature and a flowrate at which a thermal transfer apparatus transfers a thermal medium in an air conditioning system including a device on a heat-providing side, a device on a heat-using side, and the thermal transfer apparatus configured to transfer the thermal medium from the device on the heat-providing side to the device on the heat-using side, the machine learning apparatus includ-
(Continued)

ing: a state variable obtaining unit configured to obtain state variables including an operation condition of the device on the heat-providing side, an operation condition of the device on the heat-using side, and a value correlated with a heat quantity required by the device on the heat-using side; a learning unit configured to perform learning by associating the state variables with the at least one of the temperature and the flowrate; and a reward calculating unit configured to calculate a reward, based on a total value of a power consumption of the device on the heat-providing side, a power consumption of the device on the heat-using side, and a power consumption of the thermal transfer apparatus, wherein the learning unit performs learning by using the reward.

17 Claims, 30 Drawing Sheets

(51) Int. Cl.
*F24F 11/83* (2018.01)
*G05B 19/042* (2006.01)
*G06N 20/00* (2019.01)
*F24F 110/12* (2018.01)
*F24F 110/22* (2018.01)
*F24F 140/50* (2018.01)
*F24F 140/60* (2018.01)

(52) U.S. Cl.
CPC .......... *G06N 20/00* (2019.01); *F24F 2110/12* (2018.01); *F24F 2110/22* (2018.01); *F24F 2140/50* (2018.01); *F24F 2140/60* (2018.01); *G05B 2219/2614* (2013.01)

(58) Field of Classification Search
USPC .......................................................... 700/276
See application file for complete search history.

(56) References Cited

U.S. PATENT DOCUMENTS

| 2017/0227950 | A1 | 8/2017 | Kinoshita et al. |
| 2018/0100662 | A1* | 4/2018 | Farahmand ........ G05B 19/0428 |
| 2018/0204116 | A1* | 7/2018 | Evans .................... G06N 3/045 |
| 2019/0042979 | A1* | 2/2019 | Devulapalli ........... G06N 3/006 |
| 2019/0353378 | A1* | 11/2019 | Ramamurti ............ G05B 15/02 |

FOREIGN PATENT DOCUMENTS

| JP | 2004-053127 | 2/2004 |
| JP | 2004-293844 | 10/2004 |
| JP | 2008-256258 | 10/2008 |
| JP | 2012-127573 | 7/2012 |
| JP | 2017-142595 | 8/2017 |
| JP | 2018-173221 | 11/2018 |
| JP | 2019-002591 | 1/2019 |
| JP | 2019-026103 | 2/2019 |
| WO | 2017/099539 | 6/2017 |

OTHER PUBLICATIONS

Extended European Search Report dated May 19, 2022 with respect to the corresponding European patent application No. 20794146.9.
Ning M et al: "Neuro-optimal operation of a variable air vol. HVAC&R system", Applied Thermal Engineering, Pergamon, Oxford, GB, vol. 30, No. 5, Apr. 1, 2010 (Apr. 1, 2010), pp. 385-399, XP026871217, ISSN: 1359-4311.
International Search Report dated Jul. 28, 2020, issued to PCT/JP2020/017806.

* cited by examiner

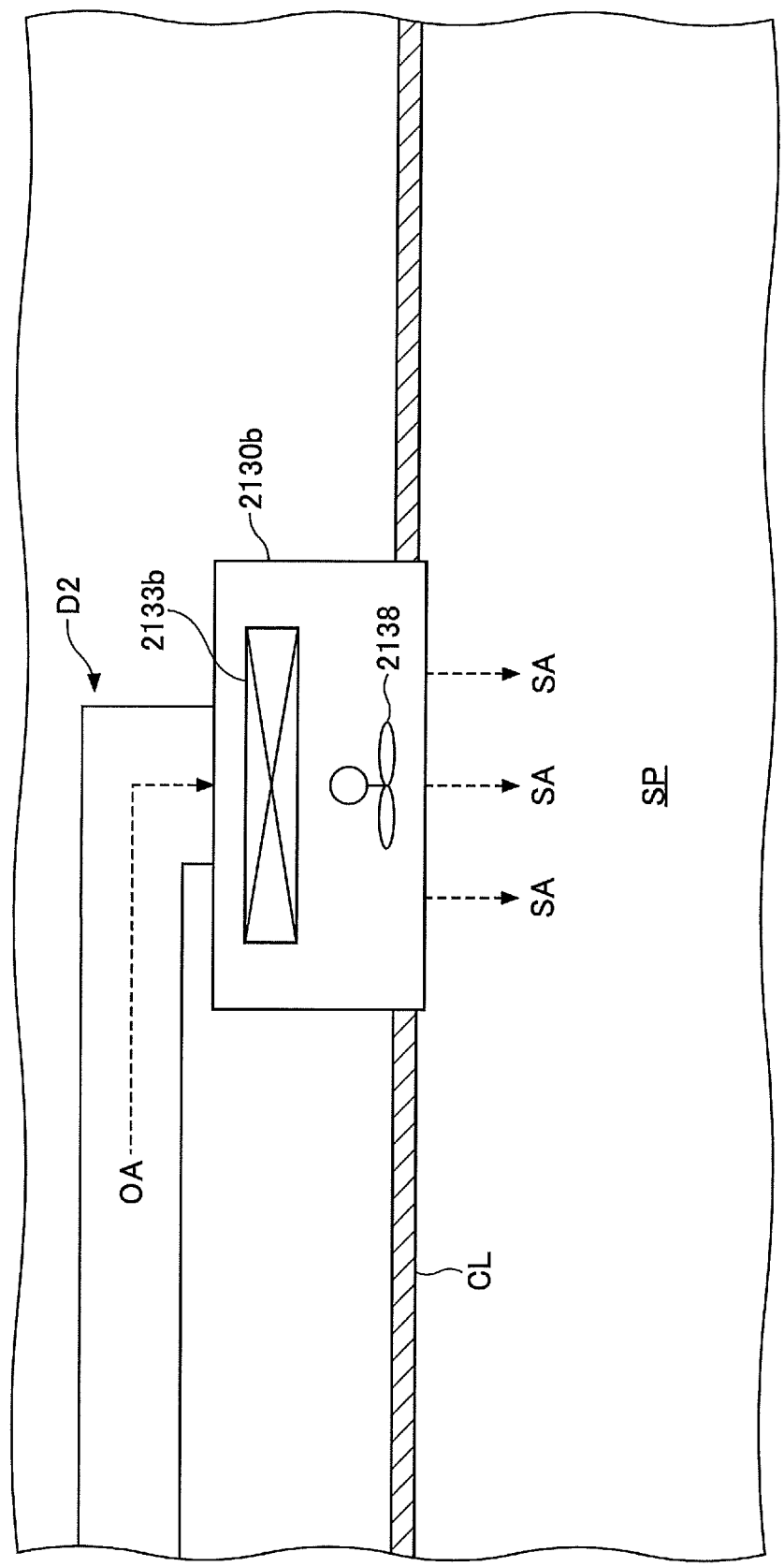

MACHINE LEARNING APPARATUS, AIR CONDITIONING SYSTEM, AND MACHINE LEARNING METHOD

TECHNICAL FIELD

The present disclosure relates to a machine learning apparatus, an air conditioning system, and a machine learning method.

BACKGROUND ART

In general, an air conditioning system is a system that transfers heat quantity by transferring a thermal medium to adjust the temperature or the humidity of a target space, and conventionally, a configuration for optimizing the transfer of the heat quantity (i.e., optimizing the flowrate and the temperature of the thermal medium) has been proposed.

For example, Patent Document 1 and the like listed below suggest configurations for simulating the energy consumption of the air conditioning system and optimizing the transfer of the heat quantity so as to reduce the energy consumption.

RELATED-ART DOCUMENTS

Patent Documents

[Patent Document 1] Japanese Laid-Open Patent Publication No. 2004-293844
[Patent Document 2] Japanese Laid-Open Patent Publication No. 2004-53127
[Patent Document 3] Japanese Laid-Open Patent Publication No. 2018-173221

SUMMARY OF THE INVENTION

Problem to be Solved by the Invention

However, in a case of an air conditioning system, the transfer of the optimum heat quantity (an optimum flowrate and an optimum temperature of the thermal medium) differs depending on a combination of: the operation condition of a device that provides the heat quantity; and the operation conditions or the load of a device that uses the provided heat quantity.

Therefore, in a case where the transfer of the heat quantity is optimized by simulating the energy consumption, it is necessary to previously obtain data of the energy consumption for a vast number of combinations and build a model according to characteristics of each device of the air conditioning system, and this results in a high work load.

The present disclosure provides a machine learning apparatus, an air conditioning system, and a machine learning method for optimizing the transfer of the heat quantity.

Means to Solve the Problem

A machine learning apparatus according to a first aspect of the present disclosure is a machine learning apparatus for learning at least one of a temperature and a flowrate at which a thermal transfer apparatus transfers a thermal medium in an air conditioning system including a device on a heat-providing side, a device on a heat-using side, and the thermal transfer apparatus configured to transfer the thermal medium from the device on the heat-providing side to the device on the heat-using side,
the machine learning apparatus comprising:
a state variable obtaining unit configured to obtain state variables including an operation condition of the device on the heat-providing side, an operation condition of the device on the heat-using side, and a value correlated with a heat quantity required by the device on the heat-using side;
a learning unit configured to perform learning by associating the state variables with the at least one of the temperature and the flowrate; and
a reward calculating unit configured to calculate a reward, based on a total value of a power consumption of the device on the heat-providing side, a power consumption of the device on the heat-using side, and a power consumption of the thermal transfer apparatus,
wherein the learning unit performs learning by using the reward.

According to the first aspect of the present disclosure, the machine learning apparatus for optimizing the transfer of the heat quantity can be provided.

A second aspect of the present disclosure is the machine learning apparatus described in the first aspect,
wherein the operation condition of the device on the heat-providing side includes any one of an outdoor temperature, an ambient wet-bulb temperature, and an underground temperature that affect a processing performance of the device on the heat-providing side.

A third aspect of the present disclosure is the machine learning apparatus described in the first aspect,
wherein the operation condition of the device on the heat-using side includes either an intake air temperature or a cold water return temperature that affect a processing performance of the device on the heat-using side.

A fourth aspect of the present disclosure is the machine learning apparatus described in the third aspect,
wherein the operation condition of the device on the heat-using side further includes either an air volume or a cold water flowrate.

A fifth aspect of the present disclosure is the machine learning apparatus described in the first aspect,
wherein the value correlated with the heat quantity required by the device on the heat-using side includes either an air supply temperature or a cold water supply temperature.

A sixth aspect of the present disclosure is the machine learning apparatus described in the fifth aspect,
wherein a temperature at which the thermal transfer apparatus transfers the thermal medium includes a cold water supply temperature or a cooling water supply temperature, and a flowrate at which the thermal transfer apparatus transfers the thermal medium includes either a cold water flowrate or a cooling water flowrate.

A seventh aspect of the present disclosure is the machine learning apparatus described in the first aspect,
wherein the device on the heat-providing side includes an air-cooled chiller, the device on the heat-using side includes an air-conditioning apparatus, and the thermal transfer apparatus includes a cold water pump.

An eighth aspect of the present disclosure is the machine learning apparatus described in the first aspect,
wherein the device on the heat-providing side includes a cooling tower, the device on the heat-using side includes a water-cooled chiller, and the thermal transfer apparatus includes a cooling water pump.

A ninth aspect of the present disclosure is the machine learning apparatus described in the first aspect, wherein the device on the heat-providing side includes an underground heat exchanger, the device on the heat-using side includes a water-cooled chiller, and the thermal transfer apparatus includes a cooling water pump.

A tenth aspect of the present disclosure is the machine learning apparatus described in the first aspect,
wherein the device on the heat-providing side includes a cooling tower, a cooling water pump, and a water-cooled chiller, the device on the heat-using side includes an air-conditioning apparatus, and the thermal transfer apparatus includes a cold water pump.

An eleventh aspect of the present disclosure is the machine learning apparatus described in the first aspect,
wherein the device on the heat-providing side includes a cooling tower, the device on the heat-using side includes a water-cooled chiller, a cold water pump, and an air-conditioning apparatus, and the thermal transfer apparatus includes a cooling water pump.

A twelfth aspect of the present disclosure is the machine learning apparatus described in the first aspect,
wherein in a case where a risk of the air conditioning system increases when the device on the heat-providing side is caused to operate based on at least any one of the temperature and the flowrate learned by the learning unit, the reward calculating unit decreases the reward.

A thirteenth aspect of the present disclosure is the machine learning apparatus described in the first aspect,
wherein in a case where at least any one of the temperature and the flowrate learned by the learning unit exceeds an upper limit value or a lower limit value determined in advance, the device on the heat-providing side is caused to operate based on the upper limit value or the lower limit value determined in advance.

An air conditioning system according to a fourteenth aspect of the present disclosure is an air conditioning system comprising a device on a heat-providing side, a device on a heat-using side, a thermal transfer apparatus configured to transfer a thermal medium from the device on the heat-providing side to the device on the heat-using side, and a machine learning apparatus configured to learn at least one of a temperature and a flowrate at which the thermal transfer apparatus transfers the thermal medium,
wherein the machine learning apparatus includes:
a state variable obtaining unit configured to obtain state variables including an operation condition of the device on the heat-providing side, an operation condition of the device on the heat-using side, and a value correlated with a heat quantity required by the device on the heat-using side;
a learning unit configured to perform learning by associating the state variables with the at least one of the temperature and the flowrate; and
a reward calculating unit configured to calculate a reward, based on a total value of a power consumption of the device on the heat-providing side, a power consumption of the device on the heat-using side, and a power consumption of the thermal transfer apparatus,
wherein the learning unit performs learning by using the reward.

According to the fourteenth aspect of the present disclosure, the air conditioning system for optimizing the transfer of the heat quantity can be provided.

A machine learning method according to a fifteenth aspect of the present disclosure is a machine learning method for learning at least one of a temperature and a flowrate at which a thermal transfer apparatus transfers a thermal medium in an air conditioning system including a device on a heat-providing side, a device on a heat-using side, and the thermal transfer apparatus configured to transfer the thermal medium from the device on the heat-providing side to the device on the heat-using side,
the machine learning method comprising:
a state variable obtaining step of obtaining state variables including an operation condition of the device on the heat-providing side, an operation condition of the device on the heat-using side, and a value correlated with a heat quantity required by the device on the heat-using side;
a learning step of performing learning by associating the state variables with the at least one of the temperature and the flowrate; and
a reward calculating step of calculating a reward, based on a total value of a power consumption of the device on the heat-providing side, a power consumption of the device on the heat-using side, and a power consumption of the thermal transfer apparatus,
wherein in the learning step, the learning is performed by using the reward.

According to the fifteenth aspect of the present disclosure, the machine learning method, the machine learning method for optimizing the transfer of the heat quantity can be provided.

A machine learning apparatus according to a sixteenth aspect of the present disclosure is a machine learning apparatus for learning at least one machine learning apparatus for learning at least one pair of: a pair of temperatures that are a temperature of cooling water supplied by a cooling water pump and a temperature of cold water supplied by a cold water pump; or a pair of flowrates that are a flowrate of the cooling water supplied by the cooling water pump and a flowrate of the cold water supplied by the cold water pump, in an air conditioning system including a water-cooled chiller, a cooling water pump configured to supply cooling water for cooling refrigerant by performing heat exchange in the water-cooled chiller, a cooling tower configured to bring the cooling water transferred from the water-cooled chiller into contact with outside air to cool the cooling water, an air-conditioning apparatus, and a cold water pump configured supply the cold water cooled by the refrigerant in the heat exchange performed in the water-cooled chiller to the air-conditioning apparatus,
wherein the machine learning apparatus comprises:
a state variable obtaining unit configured to obtain state variables including an operation condition of the cooling tower, an operation condition of the air-conditioning apparatus, and a load of the air-conditioning apparatus;
a learning unit configured to perform learning by associating the state variables with the at least one pair; and
a reward calculating unit configured to calculate a reward, based on a total value of energy consumptions of the cooling tower, the water-cooled chiller, the cooling water pump, the cold water pump, and the air-conditioning apparatus,
wherein the learning unit performs learning by using the reward.

According to the sixteenth aspect of the present disclosure, the machine learning apparatus for optimizing the transfer of the heat quantity can be provided.

A machine learning apparatus according to a seventeenth aspect of the present disclosure is a machine learning apparatus for learning at least one of a temperature and a flowrate of a thermal medium supplied by a pump, in an air conditioning system including a heat source apparatus configured to heat or cool the thermal medium, the pump configured to discharge the thermal medium heated or cooled by the heat source apparatus, and a heat exchanger configured to perform heat exchange between passing air and the thermal medium discharged from the pump, wherein the air-conditioning apparatus blows the air having passed through the heat exchanger to a target space, wherein the machine learning apparatus comprising:
a state variable obtaining unit configured to obtain state variables including an operation condition of the heat source apparatus, an operation condition of the air-conditioning apparatus, and a load of the air-conditioning apparatus;
a learning unit configured to perform learning by associating the state variables with at least one of the temperature and the flowrate of the thermal medium; and
a reward calculating unit configured to calculate a reward, based on a total value of energy consumptions of the heat source apparatus, the air-conditioning apparatus, and the pump,
wherein the learning unit performs learning by using the reward.

According to the seventeenth aspect of the present disclosure, a machine learning apparatus for optimizing the transfer of the heat quantity can be provided.

BRIEF DESCRIPTION OF DRAWINGS

FIG. 30 is a second drawing illustrating how a fan coil unit is installed in a target space.

MODE FOR CARRYING OUT THE INVENTION

Figure 1:
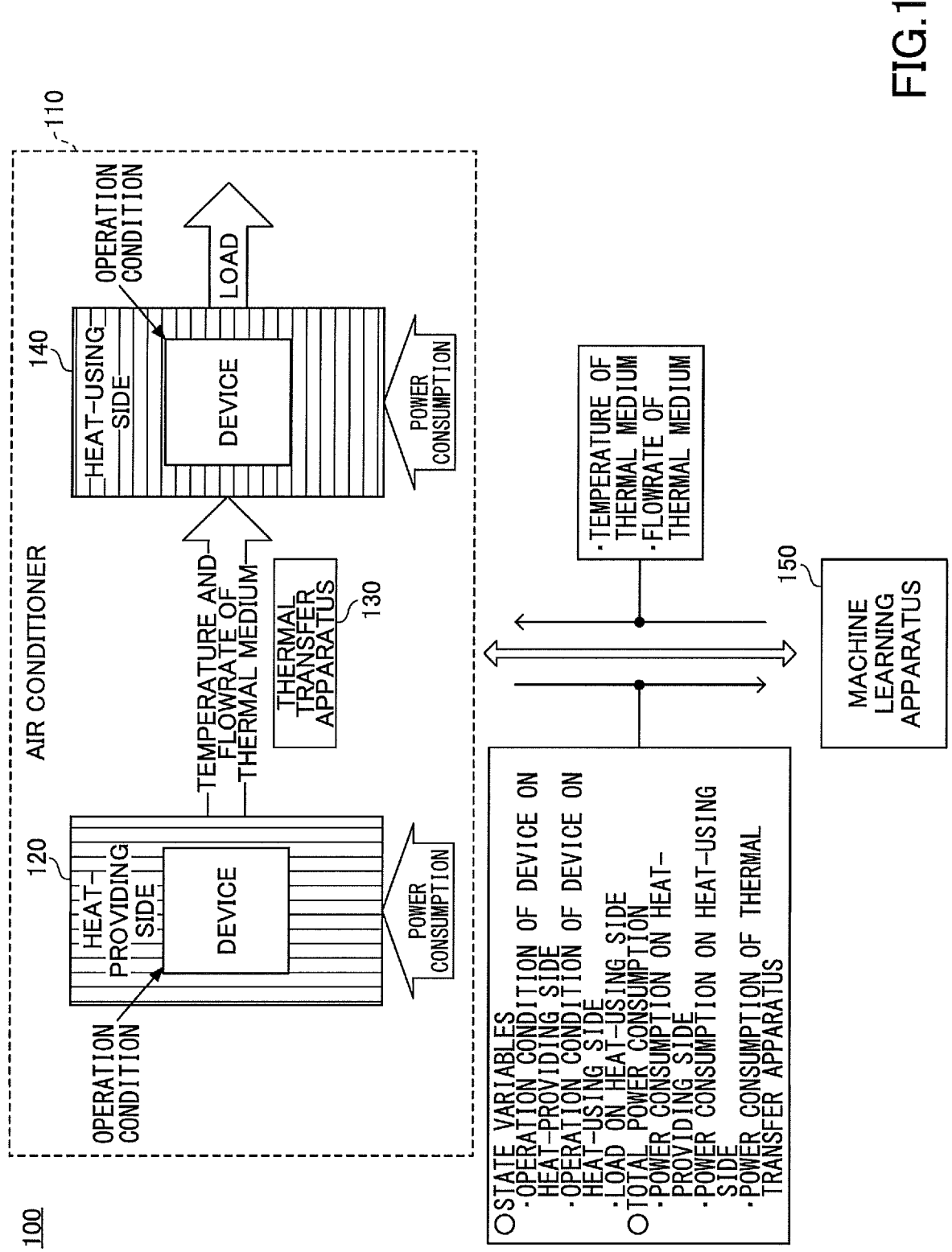
FIG. 1 is a drawing illustrating an example of a system configuration of an air conditioning system.

Hereinafter, embodiments are described with reference to the attached drawings. In the present specification and drawings, constituent elements having substantially the same functional configurations are denoted by the same reference numerals to omit duplicate explanations.

First Embodiment

<System Configuration of Air Conditioning System>

First, a system configuration of an air conditioning system according to the first embodiment is explained. FIG. 1 is a drawing illustrating an example of the system configuration of the air conditioning system. As illustrated in FIG. 1, the air conditioning system 100 includes an air conditioner 110 and a machine learning apparatus 150.

The air conditioner 110 includes multiple devices, which can be roughly divided into a device on a heat-providing side 120, a device on a heat-using side 140, and a thermal transfer apparatus 130. In this case, the heat-using side 140 is the side that receives the supply of the heat quantity, and refers to the side that is in proximity to the air-conditioned target space with respect to the transfer direction of the thermal medium. The heat-providing side 120 is the side that supplies the heat quantity, and refers to the side far from the air-conditioned target space with respect to the transfer direction of the thermal medium.

The thermal transfer apparatus 130 is an apparatus that transfers the heat quantity by transferring the thermal medium from the device on the heat-providing side 120 to the device on the heat-using side 140. The heat quantity is identified based on the temperature of the thermal medium and the flowrate of the thermal medium.

As illustrated in FIG. 1, the device on the heat-providing side 120 operates to attain the target value of at least one of the temperature and the flowrate of the thermal medium, transmitted from the machine learning apparatus 150, under a predetermined operation condition.

The device on the heat-using side 140 operates to attain a target value that is set for the device on the heat-using side 140 in advance, under the predetermined operation condition and the temperature and the flowrate of the thermal medium transferred from the device on the heat-providing side 120.

The machine learning apparatus 150 obtains, as "state variables", from the air conditioner 110:
(i) the operation condition of the device on the heat-providing side 120;
(ii) the operation condition of the device on the heat-using side 140; and
(iii) the load of the device on the heat-using side 140 (i.e., a value which is correlated to the heat quantity required to attain the target value at the device on the heat-using side 140).

The machine learning apparatus 150 obtains, from the air conditioner 110, the power consumption of the device on the heat-providing side 120, the power consumption of the device on the heat-using side 140, and the power consumption of the thermal transfer apparatus 130 for a predetermined period of time, and calculates a "total power consumption".

The machine learning apparatus 150 calculates the target value of at least one of the temperature and the flowrate of the thermal medium on the basis of the state variables and the total power consumption obtained from the air conditioner 110, and transmits the target value to the device on the heat-providing side 120. Specifically, the machine learning apparatus 150 performs learning by associating the obtained state variables and the target value of at least one of the temperature and the flowrate of the thermal medium using the reward calculated on the basis of the obtained total power consumption. In addition, the machine learning apparatus 150 calculates the target value of at least one of the temperature and the flowrate of the thermal medium associated with the current state variables on the basis of the result of the learning, and transmits the target value to the device on the heat-providing side 120.

In this manner, the machine learning apparatus 150 performs the reinforcement learning using the reward calculated on the basis of the total power consumption of the air conditioner 110, changes the model parameters for reducing the power consumption, and calculates the target value of at least one of the temperature and the flowrate of the thermal medium. Accordingly, the air conditioning system 100 can optimize the transfer of the heat quantity.

The machine learning apparatus 150 can automatically build the model in which the state variables including the operation conditions and the load are associated with the target value of at least one of the temperature and the flowrate of the thermal medium, while the machine learning apparatus 150 obtains actual data. Therefore, the machine learning apparatus 150 can readily build a highly accurate model.

<Hardware Configuration of Machine Learning Apparatus>

Figure 2:
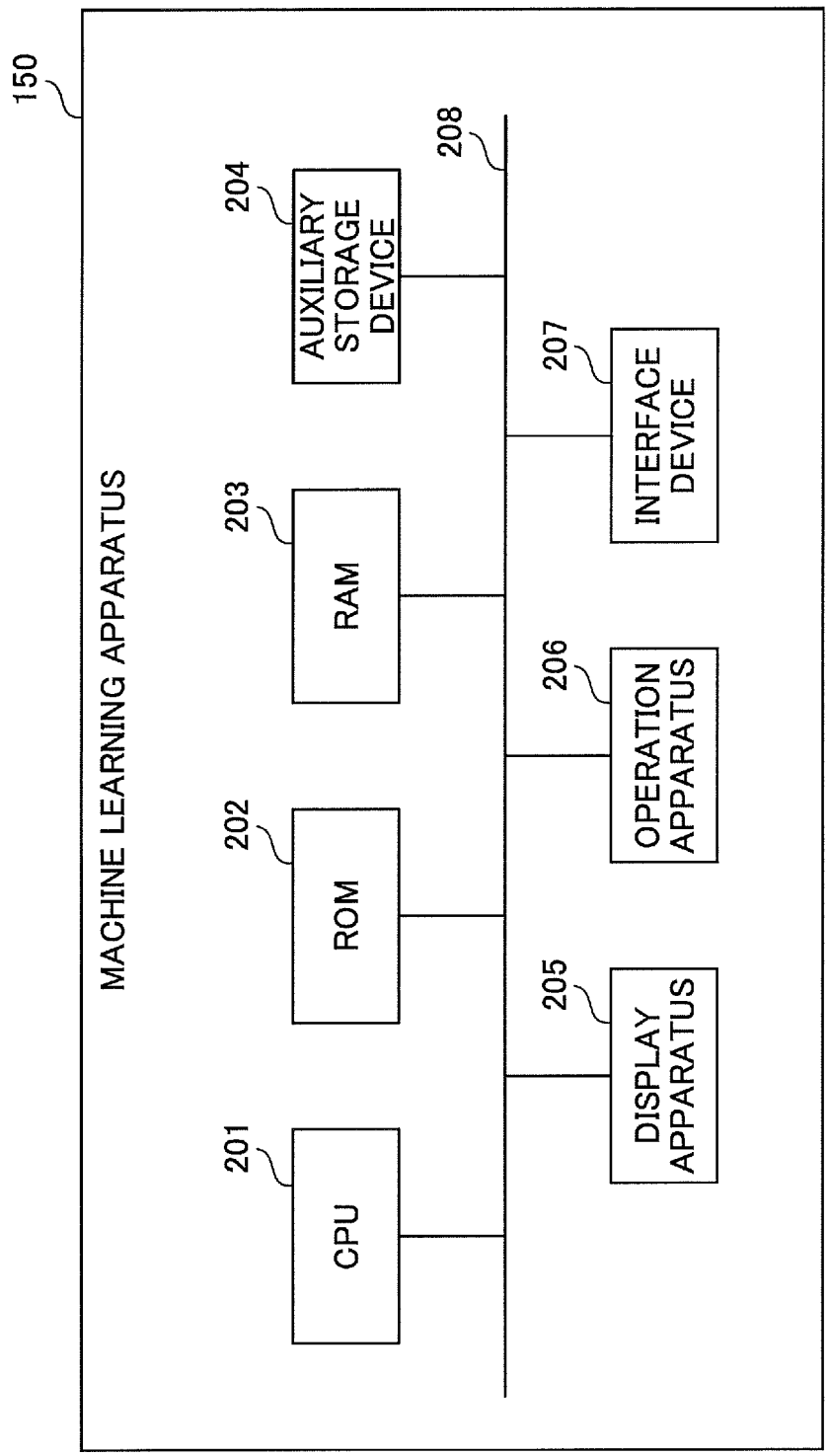
FIG. 2 is a drawing illustrating an example of a hardware configuration of a machine learning apparatus.

Next, the hardware configuration of the machine learning apparatus 150 is explained. FIG. 2 is a drawing illustrating an example of the hardware configuration of the machine learning apparatus. As illustrated in FIG. 2, the machine learning apparatus 150 includes a CPU (Central Processing Unit) 201, a ROM (Read Only Memory) 202, and a RAM (Random Access Memory) 203. The CPU 201, the ROM 202, and the RAM 203 constitute what is known as a computer. The machine learning apparatus 150 includes an auxiliary storage device 204, a display apparatus 205, an operation apparatus 206, and an interface device (I/F) 207, which are connected with each other via a bus 208.

The CPU 201 is an arithmetic device that executes various programs (for example, a machine learning program described later and the like) installed in an auxiliary storage device 204. The ROM 202 is a non-volatile memory. The ROM 202 functions as a main storage device and stores various programs and data necessary for the CPU 201 to execute various programs installed in the auxiliary storage device 204. Specifically, the ROM 202 stores a boot programs such as a basic input/output system (BIOS), an extensible firmware interface (EFI), or the like.

The RAM 203 is a volatile memory such as a DRAM (Dynamic Random Access Memory) and an SRAM (Static Random Access Memory). The RAM 203 serves as a main memory and provides a working area in which various programs installed on auxiliary storage device 204 are extracted and executed by the CPU 201.

The auxiliary storage device 204 stores various programs and information that are used when various programs are executed.

The display apparatus 205 is a display device that displays the internal state of the machine learning apparatus 150. The operation apparatus 206 is an operation device used by, for example, the administrator of the machine learning apparatus 150 to perform various operations on the machine learning apparatus 150. The interface device 207 is a connection device that connects to the devices included in the air conditioner 110 and transmits and receives data to and from the devices included in air conditioner 110.

<Functional Configuration of Machine Learning Apparatus>

Figure 3:
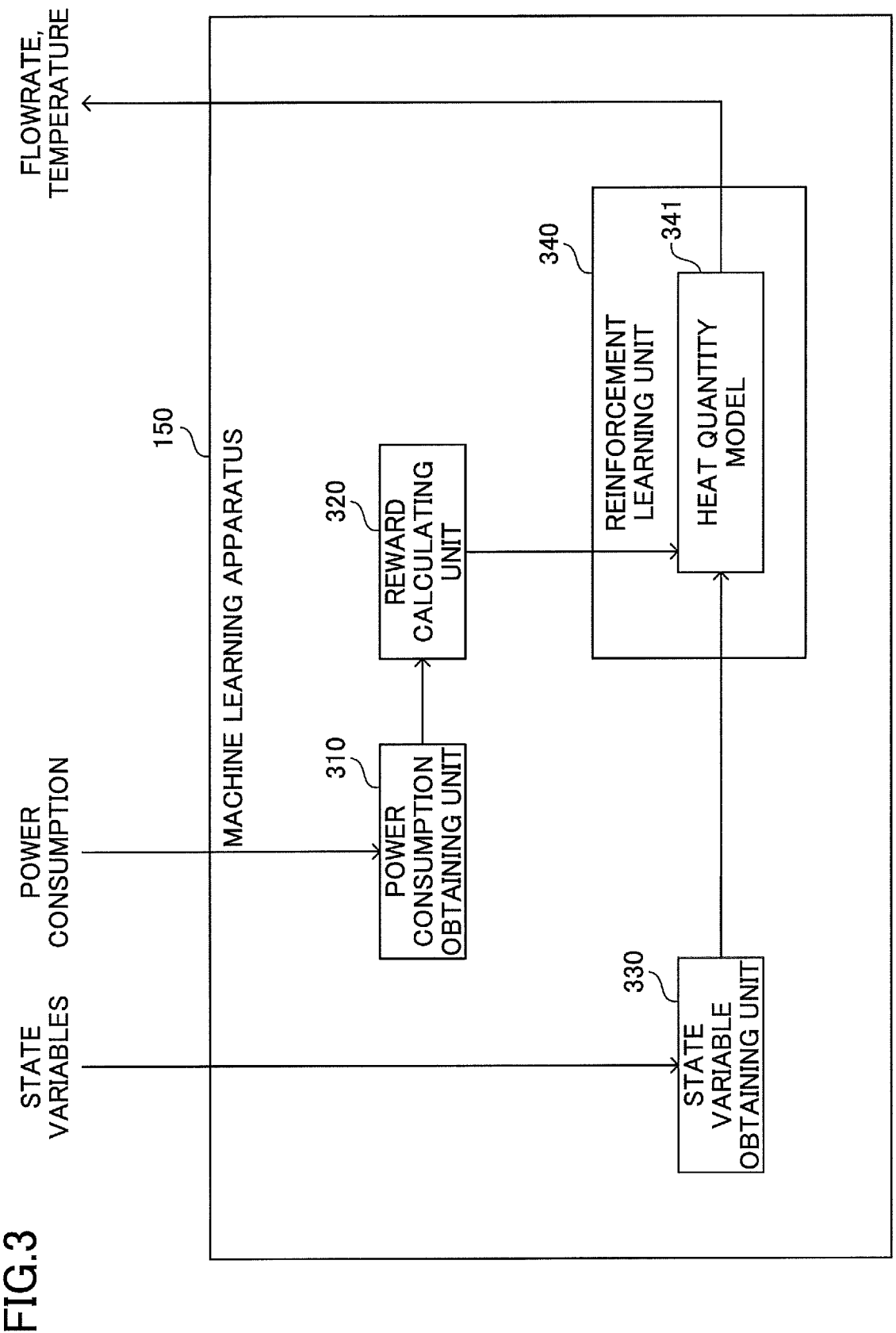
FIG. 3 is a first drawing illustrating an example of a functional configuration of the machine learning apparatus.

Next, the details of the functional configuration of the machine learning apparatus 150 are explained. FIG. 3 is a first drawing illustrating an example of a functional configuration of the machine learning apparatus. As described above, the machine learning program is installed in the machine learning apparatus 150, and when the machine learning program executes the machine learning program, the machine learning apparatus 150 functions as a power consumption obtaining unit 310, a reward calculating unit 320, a state variable obtaining unit 330, and a reinforcement learning unit 340.

The power consumption obtaining unit 310 obtains the power consumption of the device on the heat-providing side 120 for the predetermined period of time, the power consumption of the device on the heat-using side 140 for the predetermined period of time, and the power consumption of the thermal transfer apparatus 130 for the predetermined period of time, and provides notification of the total value to the reward calculating unit 320.

The reward calculating unit 320 calculates the reward on the basis of the total value provided by the power consumption obtaining unit 310, and provides notification of the reward to the reinforcement learning unit 340.

From the respective devices included in the air conditioner 110, the state variable obtaining unit 330 obtains, as state variables, the operation condition of the device on the heat-providing side 120 for the predetermined period of time, the operation condition of the device on the heat-using side 140 for the predetermined period of time, and the load of the device on the heat-using side 140 for the predetermined period of time. The state variable obtaining unit 330 provides notification of the obtained state variables to the reinforcement learning unit 340.

The reinforcement learning unit 340 includes a heat quantity model 341, and changes the model parameters of the heat quantity model 341 so that the reward provided by the reward calculating unit 320 is maximized. Accordingly, the reinforcement learning unit 340 performs the reinforcement learning with the heat quantity model 341 in which the state variables are associated with the target value of at least one of the temperature and the flowrate of the thermal medium.

The reinforcement learning unit 340 obtains the target value of at least one of the temperature and the flowrate of the thermal medium that is calculated by inputting the current state variables notified by the state variable obtaining unit 330 into the heat quantity model 341 in which the model parameters have been changed. Further, the reinforcement learning unit 340 transmits the obtained target value of at least one of the temperature and the flowrate of the thermal medium to the device on the heat-providing side 120. Accordingly, the device on the heat-providing side 120 operates to attain the received target value of at least one of the temperature and the flowrate of the thermal medium. As a result, according to the machine learning apparatus 150, the power consumption of the air conditioner 110 can be reduced.

<Flow of Reinforcement Learning Processing>

Figure 4:
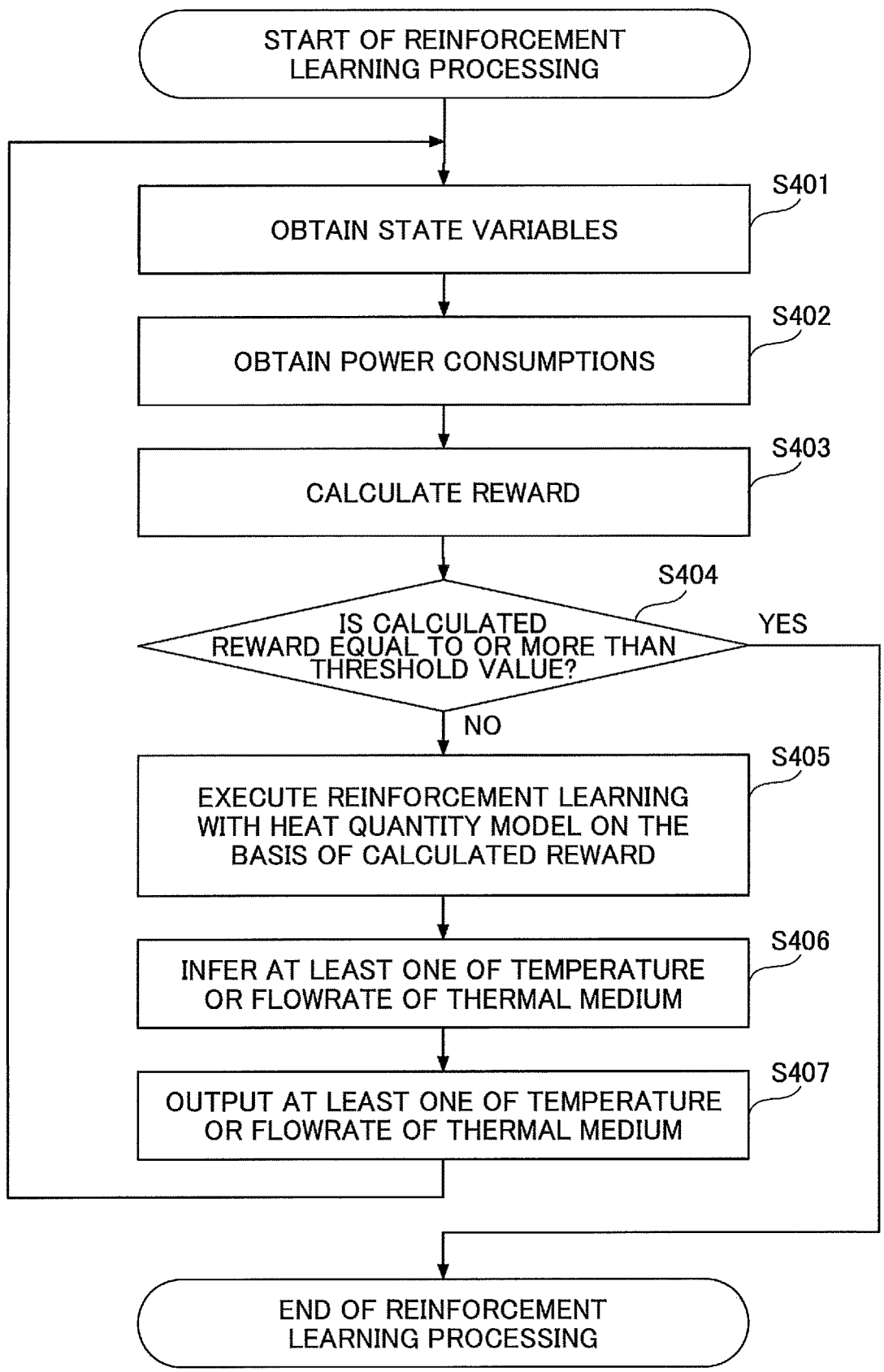
FIG. 4 is a first flowchart illustrating a flow of reinforcement learning processing performed by the machine learning apparatus.

Next, a flow of reinforcement learning processing by the machine learning apparatus 150 is explained. FIG. 4 is a first flowchart illustrating a flow of reinforcement learning processing performed by the machine learning apparatus.

In step S401, the state variable obtaining unit 330 obtains the state variables for the predetermined period of time from the respective devices included in the air conditioner 110.

In step S402, the power consumption obtaining unit 310 obtains the power consumption of the device on the heat-providing side 120 for the predetermined period of time, the power consumption of the device on the heat-using side 140 for the predetermined period of time, and the power consumption of the thermal transfer apparatus 130 for the predetermined period of time, and calculates the total value.

In step S403, the reward calculating unit 320 calculates the reward on the basis of the calculated total value.

In step S404, the reward calculating unit 320 determines whether the calculated reward is equal to or more than the predetermined threshold value. In a case where the reward calculating unit 320 determines that the calculated reward is not equal to or more than the predetermined threshold value in step S404 ("NO" in step S404), the reward calculating unit 320 proceeds to step S405.

In step S405, the reinforcement learning unit 340 performs the machine learning with the heat quantity model 341 so that the calculated reward is maximized.

In step S406, the reinforcement learning unit 340 executes the heat quantity model 341 by inputting the current state variables into the heat quantity model 341. Accordingly, the reinforcement learning unit 340 outputs the target value of at least one of the temperature and the flowrate of the thermal medium.

In step S407, the reinforcement learning unit 340 transmits the output target value of at least one of the temperature and the flowrate of the thermal medium to the device on the heat-providing side 120. Thereafter, the reinforcement learning unit 340 returns back to step S401.

Conversely, in a case where it is determined that the calculated reward is equal to or more than the predetermined threshold value in step S404 ("YES" in step S404), the reinforcement learning processing is ended.

<Summary>

As can be understood from the above explanation, the air conditioning system according to the first embodiment includes:
  a device on a heat-providing side;
  a device on a heat-using side;
  a thermal transfer apparatus configured to transfer a thermal medium from the device on the heat-providing side to the device on the heat-using side; and
  a machine learning apparatus configured to learn at least one of a temperature and a flowrate when the thermal transfer apparatus transfers the thermal medium.

Also, the machine learning apparatus obtains state variables including an operation condition of the device on the heat-providing side, an operation condition of the device on the heat-using side, and a load of the device on the heat-using side.

The machine learning apparatus performs learning by associating the state variables with the at least one of the temperature and the flowrate.

The machine learning apparatus calculates a reward on the basis of a total value of a power consumption of the device on the heat-providing side, a power consumption of the device on the heat-using side, and a power consumption of the thermal transfer apparatus.

The machine learning apparatus uses the calculated reward to perform the learning by associating the state variables and the at least one of the temperature and the flowrate of the thermal medium.

In this manner, the machine learning apparatus performs the reinforcement learning using the reward calculated on the basis of the total value of the power consumptions of the respective devices, changes the model parameters for reducing the power consumption, and calculates the target value of at least one of the temperature and the flowrate of the thermal medium. In addition, the machine learning apparatus automatically builds the model in which the state variables including the operation conditions are associated with the target value of at least one of the temperature and the flowrate of the thermal medium, while the machine learning apparatus obtains actual data.

As a result, according to the first embodiment, a highly accurate model can be readily built, and the transfer of the heat quantity can be optimized.

Second Embodiment

In the first embodiment, specific examples of the device on the heat-providing side 120 and the device on the heat-using side 140 have not been mentioned. However, the air conditioner 110 includes various devices, and there are various combinations of the device on the heat-providing side 120 and the device on the heat-using side 140.

Therefore, in the second embodiment, specific examples of the device on the heat-providing side 120 and specific examples of the device on the heat-using side are explained, and the details of learning data set used for the reinforcement learning are explained. In the second embodiment, first, a case where devices included in the heat-providing side 120 or the heat-using side 140 are configured in multiple stages is explained. However, in the second embodiment, portions different from the first embodiment are mainly explained for the sake of simplifying the explanation.

Specific Example 1 of Heat-Providing Side Devices and Heat-Using Side Device

Figure 5:
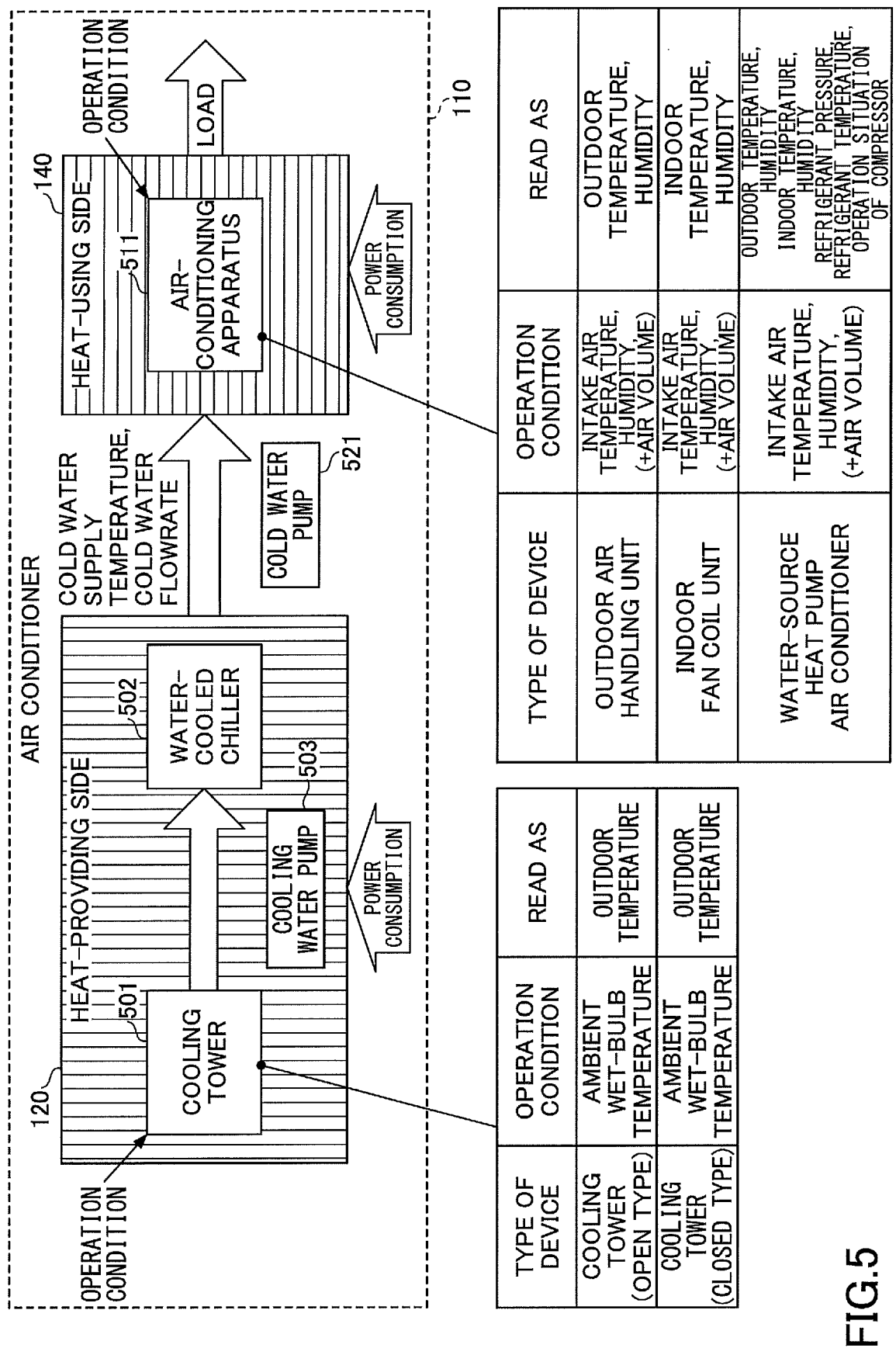
FIG. 5 is a first drawing illustrating a specific example of heat-providing side devices and a heat-using side device.

FIG. 5 is a first drawing illustrating a specific example of heat-providing side devices and a heat-using side device. In the case of the specific example as illustrated in FIG. 5, the devices on the heat-providing side 120 include a cooling tower 501, a water-cooled chiller 502, and a cooling water pump 503. The cooling tower 501 may be, for example, an open-type cooling tower or a closed-type cooling tower.

In the case of the specific example as illustrated in FIG. 5, the device on the heat-using side 140 includes an air-conditioning apparatus 511. It should be noted that the air-conditioning apparatus 511 includes, for example, an outdoor air handling unit, an indoor fan coil unit, and a water-source heat pump air conditioner.

In the above specific example, the machine learning apparatus 150 obtains, as the operation condition of the devices on the heat-providing side 120 included in the state variables, data such as:
- an ambient wet-bulb temperature of the open-type cooling tower; and
- an ambient wet-bulb temperature of the closed-type cooling tower,
- which affect the processing performance of the devices on the heat-providing side 120.

When the machine learning apparatus 150 obtains the ambient wet-bulb temperature from the open-type cooling tower or the closed-type cooling tower, the machine learning apparatus 150 may obtain an outdoor temperature instead of the ambient wet-bulb temperature.

In the above specific example, the machine learning apparatus 150 obtains, as the operation condition of the device on the heat-using side 140 as the state variables, data such as:
- an intake air temperature and an intake air humidity (and an air volume) of the outdoor air handling unit;
- an intake air temperature and an intake air humidity (and an air volume) of the indoor fan coil unit; and
- an intake air temperature and an intake air humidity (and an air volume) of the water-source heat pump air conditioner,
- which affect the processing performance of the device on the heat-using side 140.

When the machine learning apparatus 150 obtains the intake air temperature and the intake air humidity from the outdoor air handling unit, the machine learning apparatus 150 may obtain an outdoor temperature and an outdoor humidity instead of the intake air temperature and the intake air humidity, respectively. When the machine learning apparatus 150 obtains the intake air temperature and the intake air humidity from the indoor fan coil unit, the machine learning apparatus 150 may obtain an indoor temperature and an indoor humidity instead of the intake air temperature and the intake air humidity, respectively. When the machine learning apparatus 150 obtains the intake air temperature and the intake air humidity from the water-source heat pump air conditioner, the machine learning apparatus 150 may obtain an outdoor temperature and an outdoor humidity or an indoor temperature and an indoor humidity instead of the intake air temperature and the intake air humidity, respectively. Alternatively, the machine learning apparatus 150 may obtain a refrigerant pressure, a refrigerant temperature, and operation situations of the compressor.

In the above specific example, the machine learning apparatus 150 obtains, as the load of the device on the heat-using side 140 included in the state variables, data such as:
- an air supply temperature and an air supply humidity, or the intake air temperature and the intake air humidity (and the air volume) of the outdoor air handling unit;
- an air supply temperature and an air supply humidity, or the intake air temperature and the intake air humidity (and the air volume) of the indoor fan coil unit; and
- a compressor load factor of the water-source heat pump air conditioner,
- which are correlated to the heat quantity required to attain the target value at the device on the heat-using side 140.

The machine learning apparatus 150 may calculate data, which is correlated to the heat quantity required to attain the target value at the device on the heat-using side 140, from the cold water side instead of obtaining it from the air side or the compressor load factor.

In the above specific example, the machine learning apparatus 150 obtains, as the power consumption of the heat-providing side 120 for calculating the total power consumption, data such as:
- the power consumption of the cooling tower 501;
- the power consumption of the water-cooled chiller 502; and
- the power consumption of the cooling water pump 503,
obtains, as the power consumption of the heat-using side 140 for calculating the total power consumption, data such as:
- the power consumption of the air-conditioning apparatus 511, and
obtains, as the power consumption of the thermal transfer apparatus 130 for calculating the total power consumption, data such as:
- the power consumption of a cold water pump 521.

In the above specific example, the machine learning apparatus 150 calculates, as the target value of at least one of the temperature and the flowrate of the thermal medium:
- the target value of the cold water supply temperature; and
- the target value of the cold water flowrate.

Specific Example 2 of Heat-Providing Side Device and Heat-Using Side Devices

Figure 6:
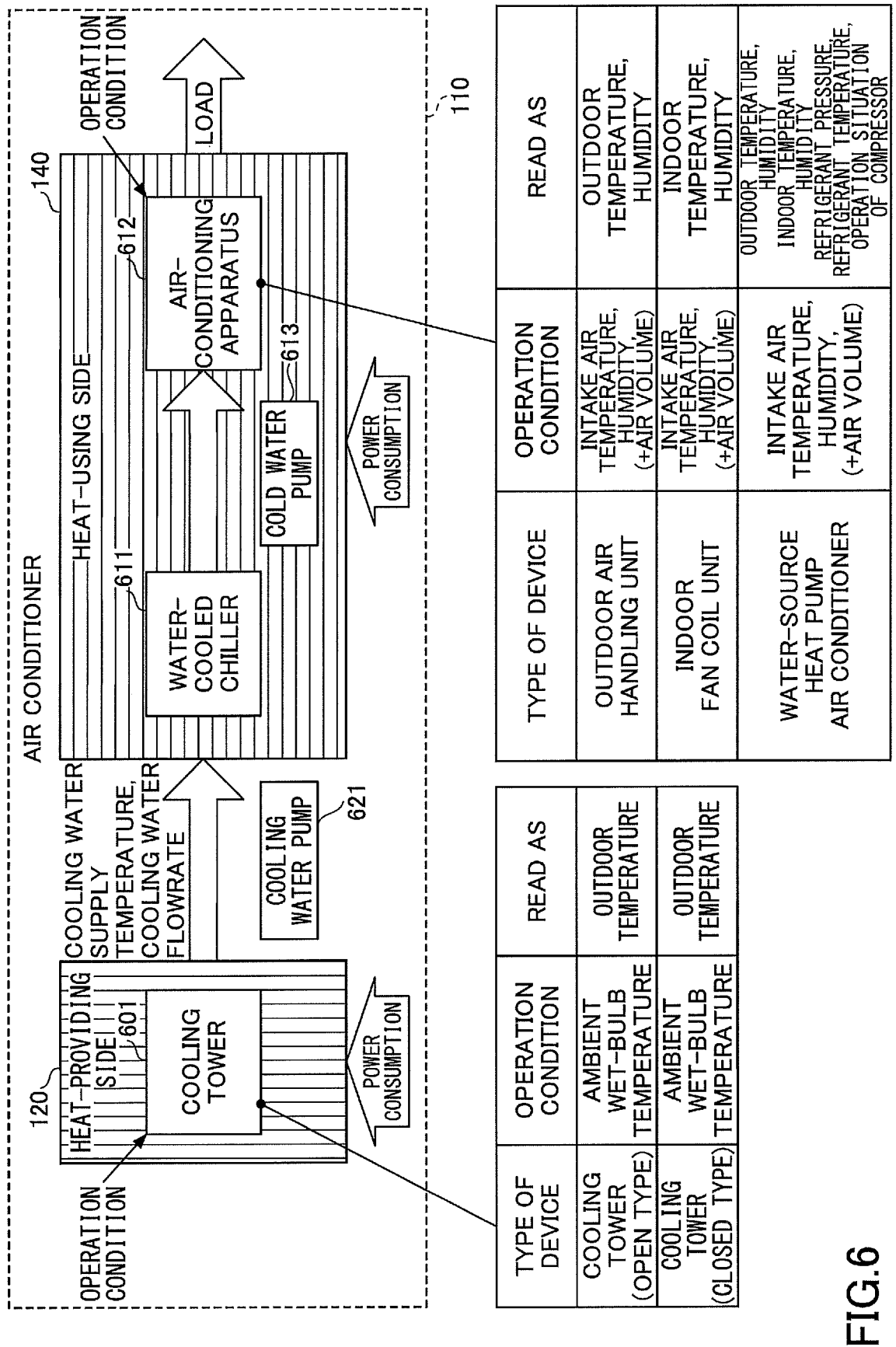
FIG. 6 is a second drawing illustrating a specific example of a heat-providing side device and heat-using side devices.

FIG. 6 is a second drawing illustrating a specific example of a heat-providing side device and heat-using side devices. In the case of the specific example as illustrated in FIG. 6, the device on the heat-providing side 120 includes a cooling tower 601. The cooling tower 601 includes, for example, an open-type cooling tower and a closed-type cooling tower.

In the case of the specific example as illustrated in FIG. 6, the devices on the heat-using side 140 include a water-cooled chiller 611, an air-conditioning apparatus 612, and a cold water pump 613. The air-conditioning apparatus 612 includes, for example, an outdoor air handling unit, an indoor fan coil unit, and a water-source heat pump air conditioner.

In the above specific example, the machine learning apparatus 150 obtains, as the operation condition of the device on the heat-providing side 120 included in the state variables, data such as:
- an ambient wet-bulb temperature of the open-type cooling tower; and
- an ambient wet-bulb temperature of the closed-type cooling tower,
- which affect the processing performance of the device on the heat-providing side 120.

When the machine learning apparatus 150 obtains the ambient wet-bulb temperature from the open-type cooling tower or closed-type cooling tower, the machine learning apparatus 150 may obtain an outdoor temperature instead of the ambient wet-bulb temperature.

In the above specific example, the machine learning apparatus 150 obtains, as the operation condition of the devices on the heat-using side 140 as the state variables, data such as:

an intake air temperature and an intake air humidity (and an air volume) of the outdoor air handling unit;

an intake air temperature and an intake air humidity (and an air volume) of the indoor fan coil unit; and an intake air temperature and an intake air humidity (and an air volume) of the water-source heat pump air conditioner, which affect the processing performance of the devices on the heat-using side 140.

When the machine learning apparatus 150 obtains the intake air temperature and the intake air humidity from the outdoor air handling unit, the machine learning apparatus 150 may obtain an outdoor temperature and an outdoor humidity instead of the intake air temperature and the intake air humidity, respectively. When the machine learning apparatus 150 obtains the intake air temperature and the intake air humidity from the indoor fan coil unit, the machine learning apparatus 150 may obtain an indoor temperature and an indoor humidity instead of the intake air temperature and the intake air humidity. When the machine learning apparatus 150 obtains the intake air temperature and the intake air humidity from the water-source heat pump air conditioner, the machine learning apparatus 150 may obtain an outdoor temperature and an outdoor humidity, or an indoor temperature and an indoor humidity, instead of the intake air temperature and the intake air humidity, respectively. Alternatively, the machine learning apparatus 150 may obtain a refrigerant pressure, a refrigerant temperature, and operation situations of the compressor.

In the above specific example, the machine learning apparatus 150 obtains, as the load of the device on the heat-using side 140 included in the state variables, data such as:

an air supply temperature and an air supply humidity, or the intake air temperature and the intake air humidity (and the air volume) of the outdoor air handling unit;

an air supply temperature and an air supply humidity, or the intake air temperature and the intake air humidity (and the air volume) of the indoor fan coil unit; and a compressor load factor of the water-source heat pump air conditioner, which are correlated to the heat quantity required to attain the target value at the device on the heat-using side 140.

The machine learning apparatus 150 may calculate data, which is correlated to the heat quantity required to attain the target value at the device on the heat-using side 140, from the cold water side instead of obtaining it from the air side or the compressor load factor.

In the above specific example, the machine learning apparatus 150 obtains, as the power consumption of the heat-providing side 120 for calculating the total power consumption, data such as:

a power consumption of the cooling tower 601, obtains, as the power consumption of the heat-using side 140 for calculating the total power consumption, data such as:

a power consumption of the water-cooled chiller 611;

a power consumption of the air-conditioning apparatus 612; and a power consumption of the cold water pump 613, and obtains, as the power consumption of the thermal transfer apparatus 130 for calculating the total power consumption, data such as:

a power consumption of a cooling water pump 621.

In the above specific example, the machine learning apparatus 150 calculates, as the target value of at least one of the temperature and the flowrate of the thermal medium:

the target value of the cooling water supply temperature; and the target value of the cooling water flowrate.

<Summary>

As can be understood from the above explanation, the machine learning apparatus 150 can perform the reinforcement learning with the learning data sets as shown in the above specific examples 1 and 2.

Third Embodiment

In the above second embodiment, the case where the devices included in the heat-providing side 120 or the heat-using side 140 are configured in multiple stages has been explained. In contrast, in the third embodiment, a case where a device included in any of the heat-providing side 120 and the heat-using side 140 is configured in a single stage is explained.

Specific Example 1 of Heat-Providing Side Device and Heat-Using Side Device

Figure 7:
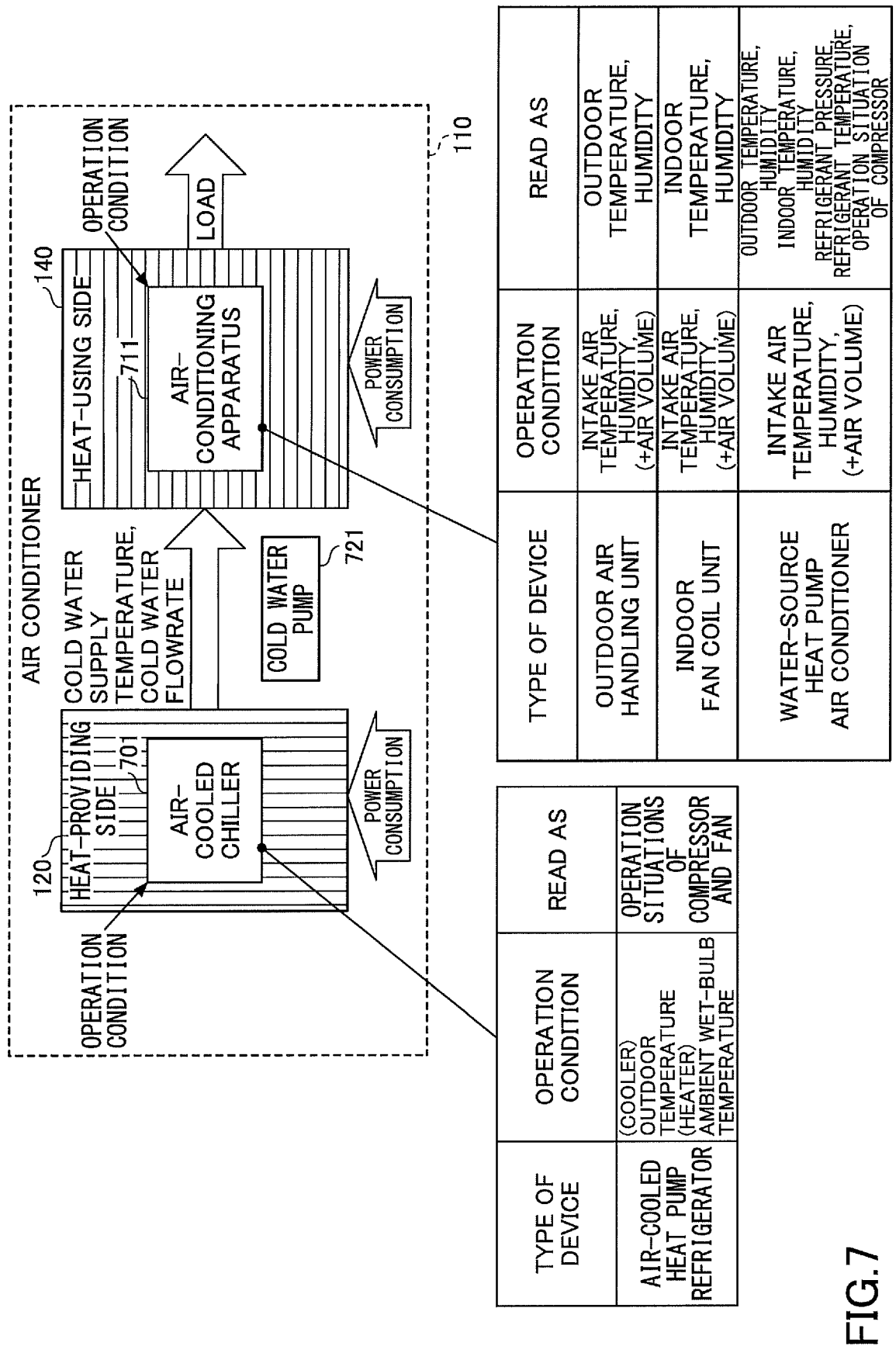
FIG. 7 is a third drawing illustrating a specific example of a heat-providing side device and heat-using side device.

FIG. 7 is a third drawing illustrating a specific example of a heat-providing side device and a heat-using side device. In the case of the specific example as illustrated in FIG. 7, the device on the heat-providing side 120 includes an air-cooled chiller 701 (an example of a chiller unit). The air-cooled chiller 701 includes, for example, an air-cooled heat pump refrigerator.

In the case of the specific example as illustrated in FIG. 7, the device on the heat-using side 140 includes an air-conditioning apparatus 711. The air-conditioning apparatus 711 includes, for example, an outdoor air handling unit, an indoor fan coil unit, and a water-source heat pump air conditioner.

In the above specific example, the machine learning apparatus 150 obtains, as the operation condition of the device on the heat-providing side 120 included in the state variables, data such as:

an outdoor temperature of the air-cooled heat pump refrigerator during cooler operation; and an ambient wet-bulb temperature of the air-cooled heat pump refrigerator during heater operation, which affect the processing performance of the device on the heat-providing side 120.

When the machine learning apparatus 150 obtains the outdoor temperature or the ambient wet-bulb temperature from the air-cooled heat pump refrigerator, the machine learning apparatus 150 may obtain the operation situations of the compressor and the fan instead of the outdoor temperature or the ambient wet-bulb temperature.

In the above specific example, the machine learning apparatus 150 obtains, as the operation condition of the device on the heat-using side 140 as the state variables, data such as:

an intake air temperature and an intake air humidity (and an air volume) of the outdoor air handling unit;

an intake air temperature and an intake air humidity (and an air volume) of the indoor fan coil unit; and an intake air temperature and an intake air humidity (and an air volume) of the water-source heat pump air conditioner, which affect the processing performance of the device on the heat-using side 140.

When the machine learning apparatus 150 obtains the intake air temperature and the intake air humidity from the outdoor air handling unit, the machine learning apparatus 150 may obtain an outdoor temperature and an outdoor humidity instead of the intake air temperature and the intake air humidity, respectively. When the machine learning apparatus 150 obtains the intake air temperature and the intake air humidity from the indoor fan coil unit, the machine learning apparatus 150 may obtain an indoor temperature and an indoor humidity instead of the intake air temperature and the intake air humidity. When the machine learning apparatus 150 obtains the intake air temperature and the intake air humidity from the water-source heat pump air conditioner, the machine learning apparatus 150 may obtain an outdoor temperature and an outdoor humidity, or an indoor temperature and an indoor humidity, instead of the intake air temperature and the intake air humidity, respectively. Alternatively, the machine learning apparatus 150 may obtain a refrigerant pressure, a refrigerant temperature, and operation situations of the compressor.

In the above specific example, the machine learning apparatus 150 obtains, as the load of the device on the heat-using side 140 included in the state variables, data such as:

an air supply temperature and an air supply humidity, or the intake air temperature and the intake air humidity (and the air volume) of the outdoor air handling unit;

an air supply temperature and an air supply humidity, or the intake air temperature and the intake air humidity (and the air volume) of the indoor fan coil unit; and a compressor load factor of the water-source heat pump air conditioner, which are correlated to the heat quantity required to attain the target value at the device on the heat-using side 140.

The machine learning apparatus 150 may calculate data, which is correlated to the heat quantity required to attain the target value at the device on the heat-using side 140, from the cold water side instead of obtaining it from the air side or the compressor load factor.

In the above specific example, the machine learning apparatus 150 obtains, as the power consumption of the heat-providing side 120 for calculating the total power consumption, data such as:

a power consumption of the air-cooled chiller 701, obtains, as the power consumption of the heat-using side 140 for calculating the total power consumption, data such as:

a power consumption of the air-conditioning apparatus 711, and obtains, as the power consumption of the thermal transfer apparatus 130 for calculating the total power consumption, data such as:

a power consumption of a cold water pump 721.

In the above specific example, the machine learning apparatus 150 calculates, as the target value of at least one of the temperature and the flowrate of the thermal medium:

the target value of the cold water supply temperature; and
the target value of the cold water flowrate.

Specific Example 2 of Heat-Providing Side Device and Heat-Using Side Device

Figure 8:
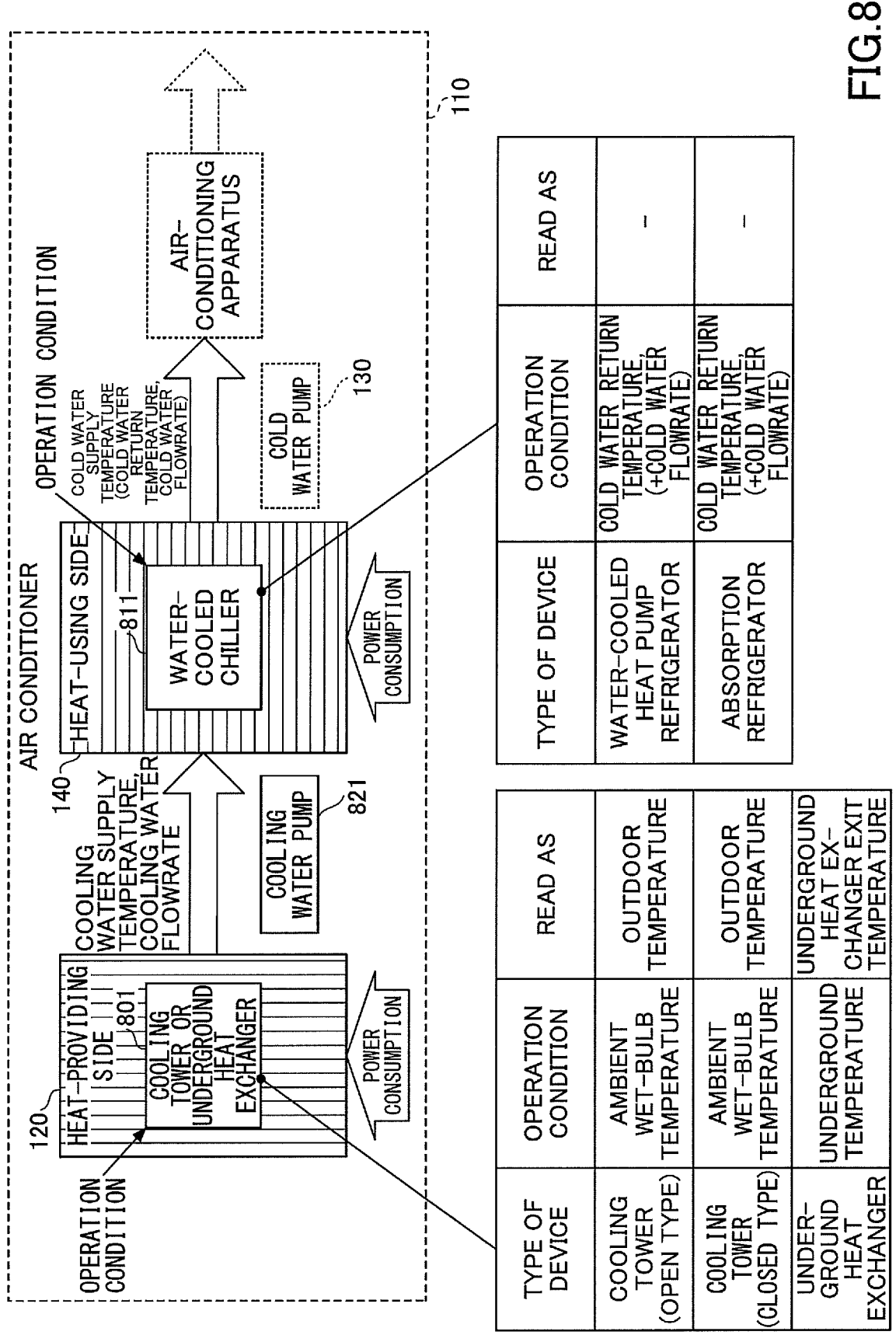
FIG. 8 is a fourth drawing illustrating a specific example of a heat-providing side device and a heat-using side device.

FIG. 8 is a fourth drawing illustrating a specific example of a heat-providing side device and a heat-using side device.

In the case of the specific example as illustrated in FIG. 8, the device on the heat-providing side 120 includes a cooling tower or an underground heat exchanger 801. The cooling tower or the underground heat exchanger 801 includes, for example, an open-type cooling tower, a closed-type cooling tower, and an underground heat exchanger.

In the case of the specific example as illustrated in FIG. 8, the device on the heat-using side 140 includes a water-cooled chiller 811. The water-cooled chiller 811 includes, for example, a water-cooled heat pump refrigerator and an absorption refrigerator.

In the above specific example, the machine learning apparatus 150 obtains, as the operation condition of the device on the heat-providing side 120 included in the state variables, data such as:

an ambient wet-bulb temperature of the open-type cooling tower;

an ambient wet-bulb temperature of the closed-type cooling tower; and an underground temperature of the underground heat exchanger, which affect the processing performance of the device on the heat-providing side 120.

When the machine learning apparatus 150 obtains the ambient wet-bulb temperature from the open-type cooling tower or the closed-type cooling tower, the machine learning apparatus 150 may obtain an outdoor temperature instead of the ambient wet-bulb temperature. When the machine learning apparatus 150 obtains the underground temperature from the underground heat exchanger, the machine learning apparatus 150 may obtain an underground heat exchanger exit temperature instead of the underground temperature.

In the above specific example, the machine learning apparatus 150 obtains, as the operation condition of the device on the heat-using side 140 as the state variables, data such as:

a cold water return temperature (or a cold water return temperature and a cold water flowrate) of the water-cooled heat pump refrigerator; and a cold water return temperature (or a cold water return temperature and a cold water flowrate) of the absorption refrigerator, which affect the processing performance of the device on the heat-using side 140.

In the above specific example, the machine learning apparatus 150 obtains, as the load of the device on the heat-using side 140 included in the state variables, data such as:

a load factor, a cold water supply temperature (or a cold water return temperature and a cold water flowrate) of the water-cooled heat pump refrigerator; and a cold water supply temperature (or a cold water return temperature and a cold water flowrate) of the absorption refrigerator, which are correlated to the heat quantity required to attain the target value at the device on the heat-using side 140.

In the above specific example, the machine learning apparatus 150 obtains, as the power consumption of the heat-providing side 120 for calculating the total power consumption, data such as:

a power consumption of the cooling tower, obtains, as the power consumption of the heat-using side 140 for calculating the total power consumption, data such as:

a power consumption of the water-cooled chiller 811, and obtains, as the power consumption of the thermal transfer apparatus 130 for calculating the total power consumption:

a power consumption of a cooling water pump 821.

In the above specific example, the machine learning apparatus 150 calculates, as the target value of at least one of the temperature and the flowrate of the thermal medium:
the target value of the cooling water supply temperature; and
the target value of the cooling water flowrate.

<Summary>

As can be understood from the above explanation, the machine learning apparatus 150 can perform the reinforcement learning with the learning data sets as shown in the above specific examples 1 and 2.

Fourth Embodiment

In the third embodiment, the case where the device included in any of the heat-providing side 120 and the heat-using side 140 is configured in a single stage has been explained. In contrast, in the fourth embodiment, a case where devices included in both of the heat-providing side 120 and the heat-using side 140 are configured in a single stage in parallel is explained.

Specific Example 1 of Heat-Providing Side Device and Heat-Using Side Device

Figure 9:
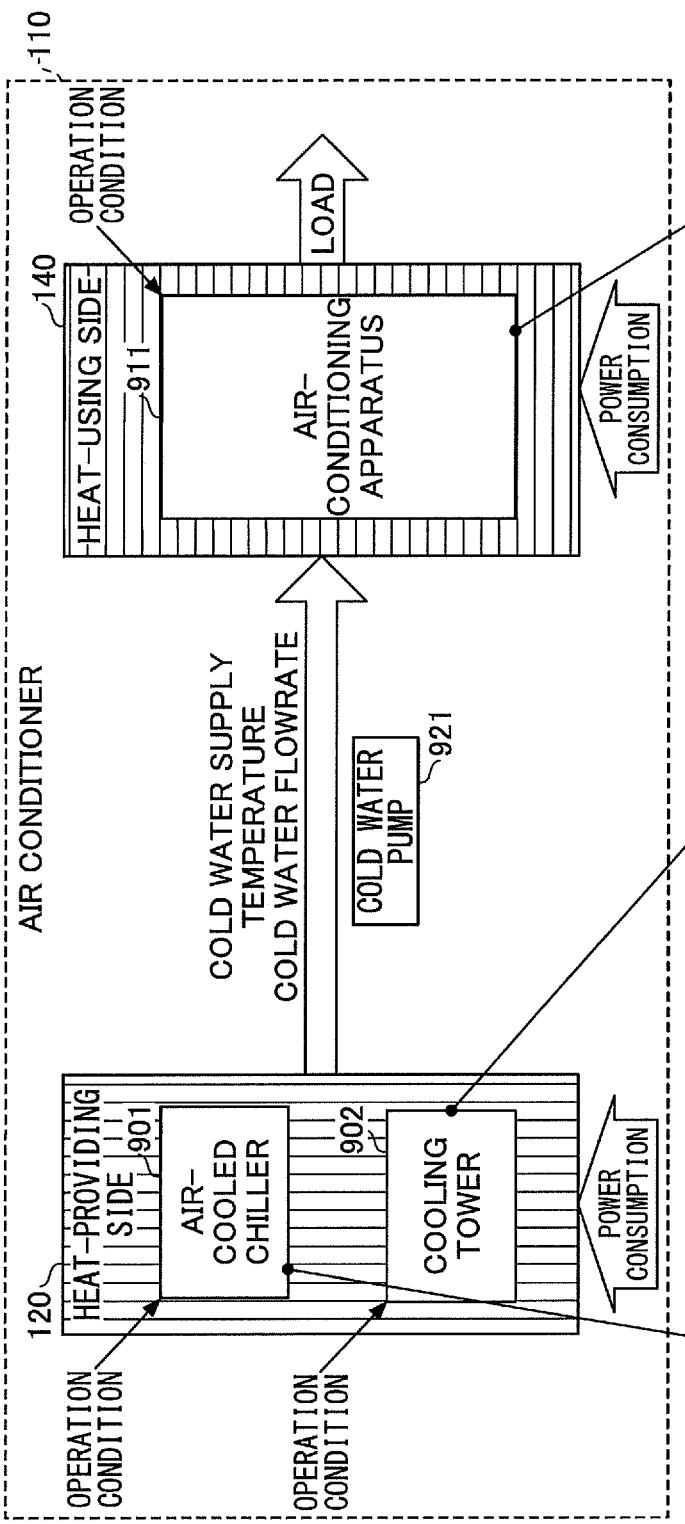
FIG. 9 is a fifth drawing illustrating a specific example of heat-providing side devices and a heat-using side device.

FIG. 9 is a fifth drawing illustrating a specific example of heat-providing side devices and a heat-using side device. In the case of the specific example as illustrated in FIG. 9, the devices on the heat-providing side 120 include an air-cooled chiller 901 and a cooling tower 902. The types of devices included in the air-cooled chiller 901 and the cooling tower 902 have already been explained, and explanation thereabout is omitted here.

In the case of the specific example as illustrated in FIG. 9, the device on the heat-using side 140 includes an air-conditioning apparatus 911. The types of devices included in the air-conditioning apparatus 911 have already been explained, and explanation thereabout is omitted here.

In the above specific example, the machine learning apparatus 150 obtains, as the operation condition of the devices on the heat-providing side 120 included in the state variables, data such as:
an outdoor temperature of the air-cooled heat pump refrigerator during cooler operation;
an ambient wet-bulb temperature of the air-cooled heat pump refrigerator during heater operation;
an ambient wet-bulb temperature of the open-type cooling tower; and
an ambient wet-bulb temperature of the closed-type cooling tower,
which affect the processing performance of the device on the heat-providing side 120.

When the machine learning apparatus 150 obtains these operation conditions, the machine learning apparatus 150 may obtain alternative operation conditions, which have already been explained above, and therefore, explanation there about is omitted here.

In the above specific example, the machine learning apparatus 150 obtains, as the operation condition of the device on the heat-using side 140 as the state variables, data such as:
an intake air temperature and an intake air humidity (and an air volume) of the outdoor air handling unit;
an intake air temperature and an intake air humidity (and an air volume) of the indoor fan coil unit; and
an intake air temperature and an intake air humidity (and an air volume) of the water-source heat pump air conditioner,
which affect the processing performance of the device on the heat-using side 140.

In the above specific example, the machine learning apparatus 150 obtains, as the load of the device on the heat-using side 140 included in the state variables, data such as:
an air supply temperature and an air supply humidity, or the intake air temperature and the intake air humidity (and the air volume) of the outdoor air handling unit;
an air supply temperature and an air supply humidity, or the intake air temperature and the intake air humidity (and the air volume) of the indoor fan coil unit; and
a compressor load factor of the water-source heat pump air conditioner,
which are correlated to the heat quantity required to attain the target value at the device on the heat-using side 140.

In the above specific example, the machine learning apparatus 150 obtains, as the power consumption of the heat-providing side 120 for calculating the total power consumption, data such as:
a power consumption of the air-cooled chiller 901; and
a power consumption of the cooling tower 902,
obtains, as the power consumption of the heat-using side 140 for calculating the total power consumption, data such as:
a power consumption of the air-conditioning apparatus 911, and
obtains, as the power consumption of the thermal transfer apparatus 130 for calculating the total power consumption, data such as:
a power consumption of a cold water pump 921.

In the above specific example, the machine learning apparatus 150 calculates, as the target value of at least one of the temperature and the flowrate of the thermal medium:
the target value of the cold water supply temperature; and
the target value of the cold water flowrate.

Specific Example 2 of Heat-Providing Side Device and Heat-Using Side Device

Figure 10:
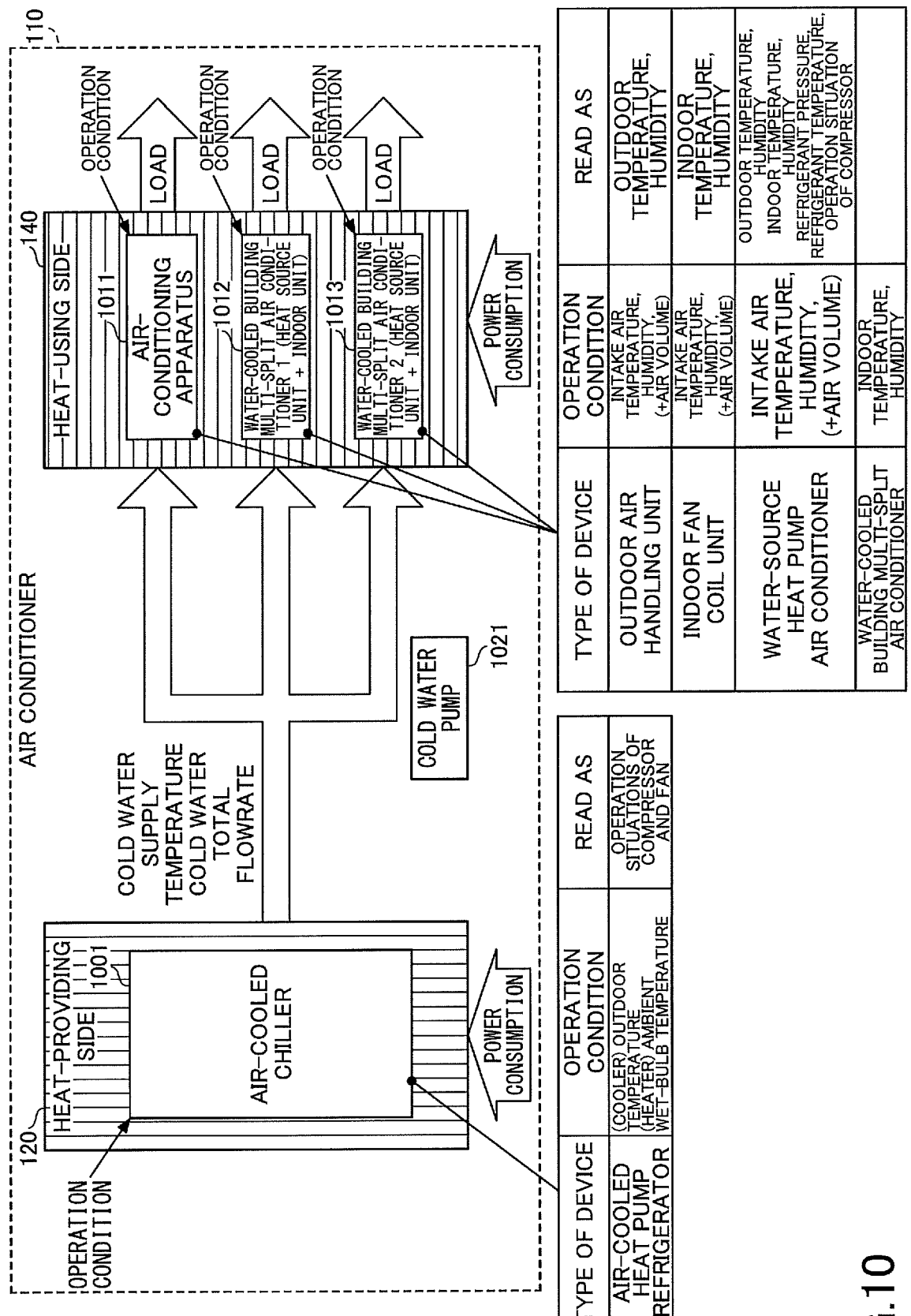
FIG. 10 is a sixth drawing illustrating a specific example of a heat-providing side device and heat-using side devices.

FIG. 10 is a sixth drawing illustrating a specific example of a heat-providing side device and heat-using side device. In the case of the specific example as illustrated in FIG. 10, the device on the heat-providing side 120 includes an air-cooled chiller 1001. The types of devices included in the air-cooled chiller 1001 have already been explained, and explanation thereabout is omitted here.

In the case of the specific example as illustrated in FIG. 10, the devices on the heat-using side 140 include an air-conditioning apparatus 1011, a water-cooled building multi-split air conditioner 1012, and a water-cooled building multi-split air conditioner 1013. The types of devices included in the air-conditioning apparatus 1011 have already been explained, and explanation thereabout is omitted here. The water-cooled building multi-split air conditioners 1012, 1013 include, for example, a heat source unit and an indoor unit of the water-cooled building multi-split air conditioner.

In the above specific example, the machine learning apparatus 150 obtains, as the operation condition of the device on the heat-providing side 120 included in the state variables, data such as:
an outdoor temperature of the air-cooled heat pump refrigerator during cooler operation; and
an ambient wet-bulb temperature of the air-cooled heat pump refrigerator during heater operation, which affect the processing performance of the device on the heat-providing side 120.

When the machine learning apparatus 150 obtains these operation conditions, the machine learning apparatus 150 may obtain alternative operation conditions, which have already been explained above, and therefore, explanation there about is omitted here.

In the above specific example, the machine learning apparatus 150 obtains data such as, as the operation condition of the devices on the heat-using side 140 included in the state variables, an intake air temperature and an intake air humidity (and an air volume) of the outdoor air handling unit;

an intake air temperature and an intake air humidity (and an air volume) of the indoor fan coil unit;

an intake air temperature and an intake air humidity (and an air volume) of the water-source heat pump air conditioner; and an indoor temperature and an indoor humidity of the water-cooled building multi-split air conditioner, which affect the processing performance of the devices on the heat-using side 140.

In the above specific example, the machine learning apparatus 150 obtains, as the load of the device on the heat-using side 140 included in the state variables, data such as:

an air supply temperature and an air supply humidity, or the intake air temperature and the intake air humidity (and the air volume) of the outdoor air handling unit;

an air supply temperature and an air supply humidity, or the intake air temperature and the intake air humidity (and the air volume) of the indoor fan coil unit;

a compressor load factor of the water-source heat pump air conditioner; and a compressor load factor (or an indoor unit operating capacity) of the water-cooled building multi-split air conditioner, which are correlated to the heat quantity required to attain the target value at the device on the heat-using side 140.

In the above specific example, machine learning apparatus 150 obtains, as the power consumption of the heat-providing side 120 for calculating the total power consumption, data such as:

a power consumption of the air-cooled chiller 1001, obtains, as the power consumption of the heat-using side 140 for calculating the total power consumption, data such as:

a power consumption of the air-conditioning apparatus 1011; and power consumptions of the water-cooled building multi-split air conditioners 1012, 1013, and obtains, as the power consumption of the thermal transfer apparatus 130 for calculating the total power consumption, data such as:

a power consumption of a cold water pump 1021.

In the above specific example, the machine learning apparatus 150 calculates, as the target value of at least one of the temperature and the flowrate of the thermal medium:

the target value of the cold water supply temperature; and the target value of the cold water total flowrate.

<Summary>

As can be understood from the above explanation, the machine learning apparatus 150 can perform the reinforcement learning with the learning data sets as shown in the above specific examples 1 and 2.

Fifth Embodiment

In the first to fourth embodiments, it has been explained that the reward calculating unit 320 calculates a reward on the basis of the total value notified by the power consumption obtaining unit 310, and the reward is notified to the reinforcement learning unit 340. However, the method for calculating the reward with the reward calculating unit 320 is not limited thereto.

For example, in a case where a certain abnormality occurs in the device on the heat-providing side 120 or the device on the heat-using side 140, a signal indicating an occurrence of abnormality may be obtained as risk information, and a reward may be calculated in view of the obtained risk information. Hereinafter, with respect to the fifth embodiment, portions different from the first embodiment are mainly explained.

<Functional Configuration of the Machine Learning Apparatus>

Figure 11:
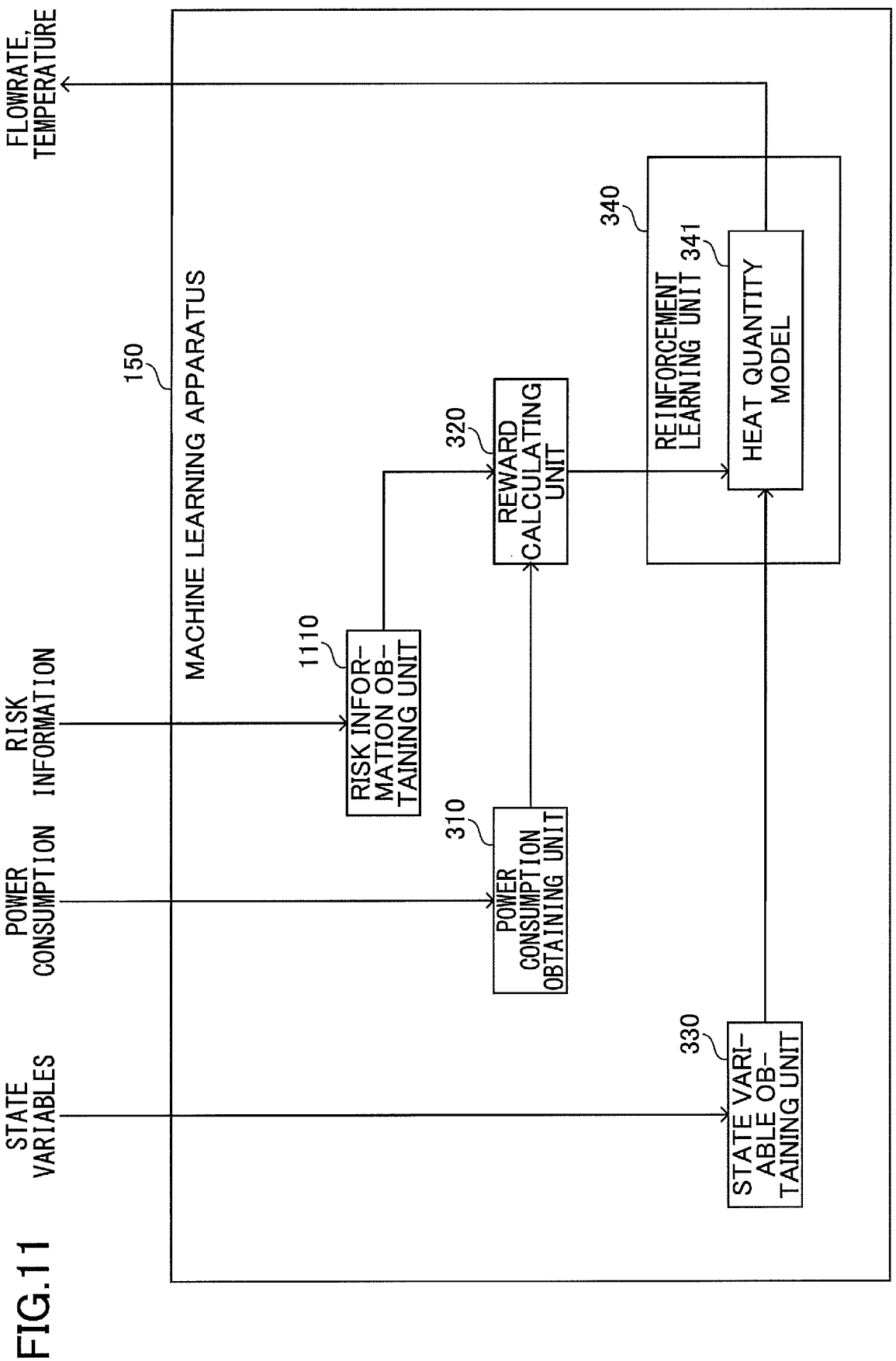
FIG. 11 is a second drawing illustrating an example of a functional configuration of the machine learning apparatus.

First, the details of the functional configuration of a machine learning apparatus 150 according to the fifth embodiment are explained. FIG. 11 is a second drawing illustrating an example of a functional configuration of the machine learning apparatus. The difference from FIG. 3 is that the machine learning apparatus 150 according to the fifth embodiment includes a risk information obtaining unit 1110.

In a case where a certain abnormality occurs in the device on the heat-providing side 120 or the device on the heat-using side 140, the risk information obtaining unit 1110 obtains a signal indicating abnormality as the risk information, and provides notification of the signal to the reward calculating unit 320.

The risk information obtaining unit 1110 obtains, as risk information, a signal indicating, for example:

high pressure abnormality (high temperature, low flowrate), low pressure abnormality (low temperature, low flowrate); and heat exchanger freezing (low temperature, low flowrate), heat exchanger uneven flow (low flowrate), which occur in the air-cooled heat pump refrigerator.

Alternatively, the risk information obtaining unit 1110 obtains, as risk information, a signal indicating, for example:

high pressure abnormality (high temperature, low flowrate), low pressure abnormality (low temperature, low flowrate), heat exchanger freezing (low temperature, low flowrate), or heat exchanger uneven flow (low flowrate), which occur in the water-cooled heat pump refrigerator or the water-source heat pump air conditioner.

Alternatively, the risk information obtaining unit 1110 obtains, as risk information, a signal indicating, for example:

heat exchanger freezing (low temperature, low flowrate), or heat exchanger uneven flow (low flowrate), which occur in the absorption refrigerator.

<Flow of Reinforcement Learning Processing>

Figure 12:
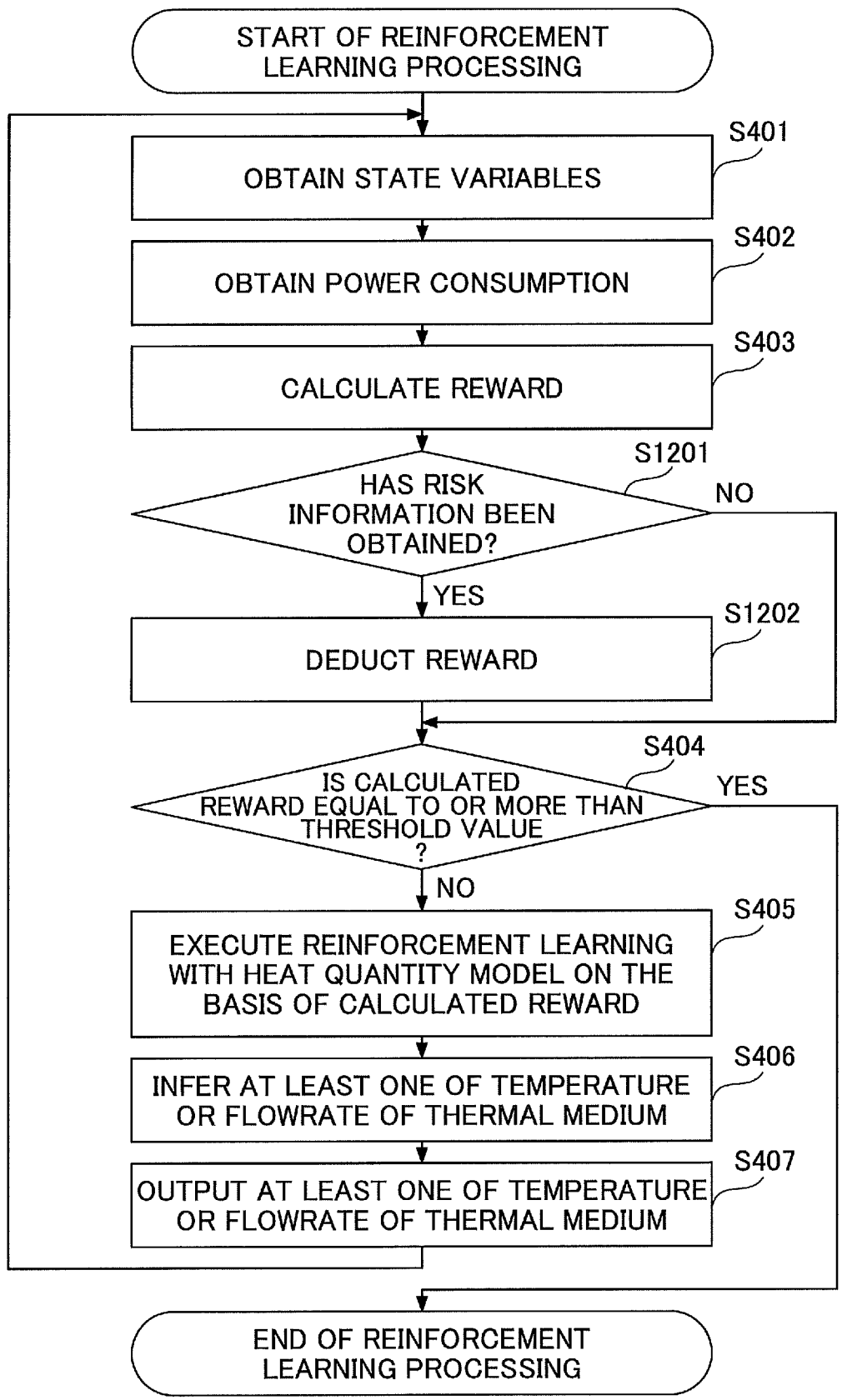
FIG. 12 is a second flowchart illustrating a flow of reinforcement learning processing performed by the machine learning apparatus.

Next, a flow of reinforcement learning processing by the machine learning apparatus 150 is explained. FIG. 12 is a second flowchart illustrating a flow of reinforcement learning processing performed by the machine learning apparatus. Difference from the flowchart illustrated in FIG. 4 is steps S1201 and S1202.

In step S1201, the risk information obtaining unit 1110 determines whether a signal indicating an occurrence of certain abnormality has been obtained as risk information from the device on the heat-providing side 120 or the device on the heat-using side 140.

In step S1202, the reward calculating unit 320 reduces the reward calculated in step S403 according to the obtained risk information.

<Summary>

As can be understood from the above explanation, the machine learning apparatus 150 reduces the reward calculated based on the total value of the power consumption in accordance with the obtained risk information. Therefore, the machine learning apparatus 150 can perform the reinforcement learning using the reward calculated in view of the risk information.

Sixth Embodiment

In the above first to fourth embodiments, it has been explained that the reinforcement learning unit 340 transmits the target value of at least one of the temperature and the flowrate of the thermal medium, calculated by the heat quantity model 341, to the device on the heat-providing side 120. However, the method for outputting the target value of at least one of the temperature and the flowrate of the thermal medium is not limited thereto.

For example, in a case where the calculated target value of at least one of the temperature and the flowrate of the thermal medium is exceeding a predetermined upper or lower limit value, the upper limit value or the lower limit value may be configured to be output. Hereinafter, with respect to the sixth embodiment, portions different from the first embodiment are mainly explained.

<Functional Configuration of Machine Learning Apparatus>

Figure 13:
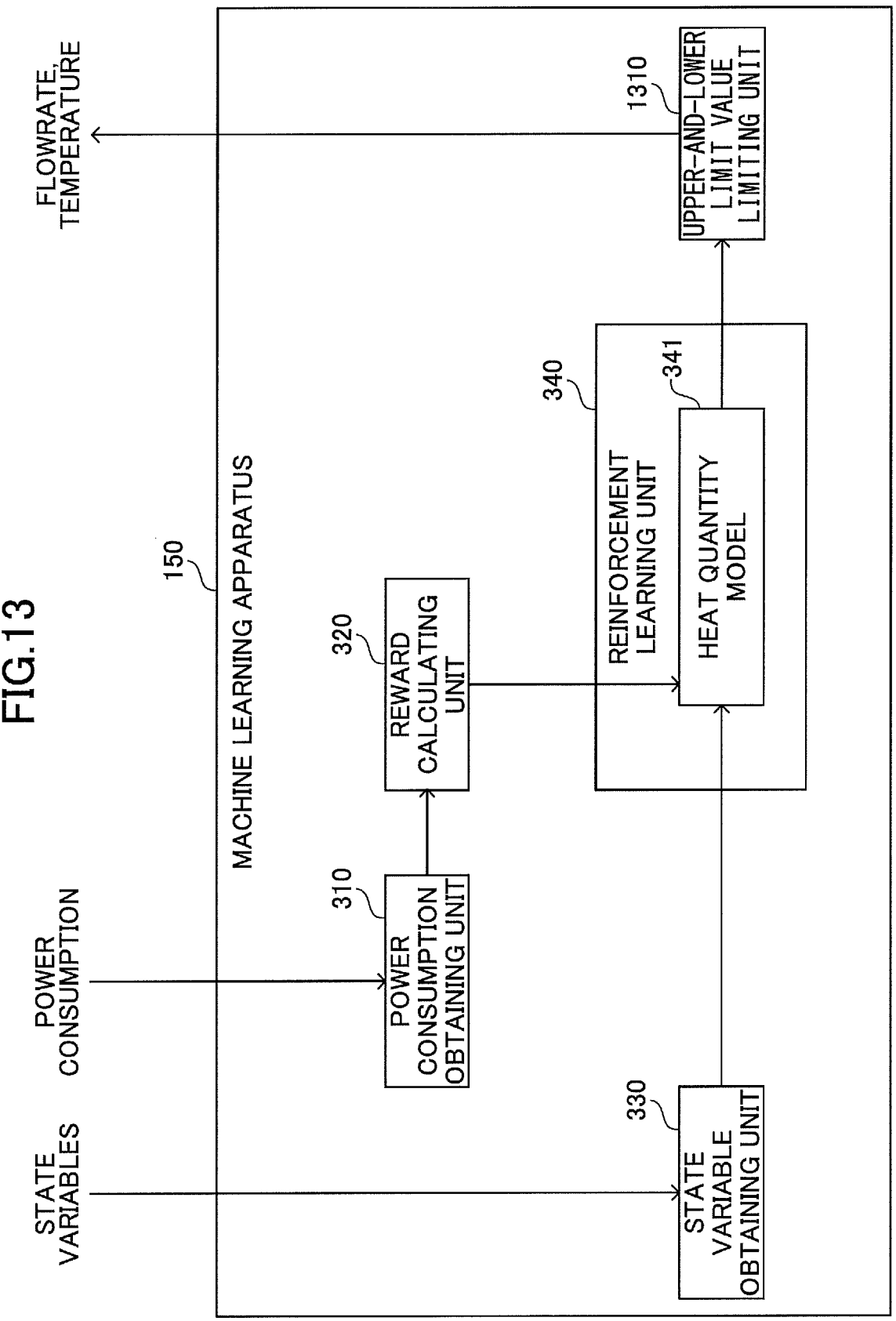
FIG. 13 is a third drawing illustrating an example of a functional configuration of the machine learning apparatus.

First, the details of the functional configuration of a machine learning apparatus 150 according to the sixth embodiment are explained. FIG. 13 is a third drawing illustrating an example of a functional configuration of the machine learning apparatus. The difference from FIG. 3 is that the machine learning apparatus 150 according to the sixth embodiment includes an upper-and-lower limit value limiting unit 1310.

The upper-and-lower limit value limiting unit 1310 obtains the target value of at least one of the temperature and the flowrate of the thermal medium that is calculated by the heat quantity model 341 and that is output by the reinforcement learning unit 340. The upper-and-lower limit value limiting unit 1310 determines whether the obtained target value of at least one of the temperature and the flowrate of the thermal medium is exceeding the upper or lower limit value of the flowrate or the temperature that could be set in the device on the heat-providing side 120. Also, in a case where the upper-and-lower limit value limiting unit 1310 determines that the obtained target value is exceeding the upper and lower limit value, the upper-and-lower limit value limiting unit 1310 transmits the upper limit value or the lower limit value to the device on the heat-providing side 120. Conversely, in a case where the upper-and-lower limit value limiting unit 1310 determines that the obtained target value is not exceeding the upper and lower limit value, the upper-and-lower limit value limiting unit 1310 transmits the obtained target value of at least one of the temperature and the flowrate of the thermal medium to the device on the heat-providing side 120.

<Flow of Reinforcement Learning Processing>

Figure 14:
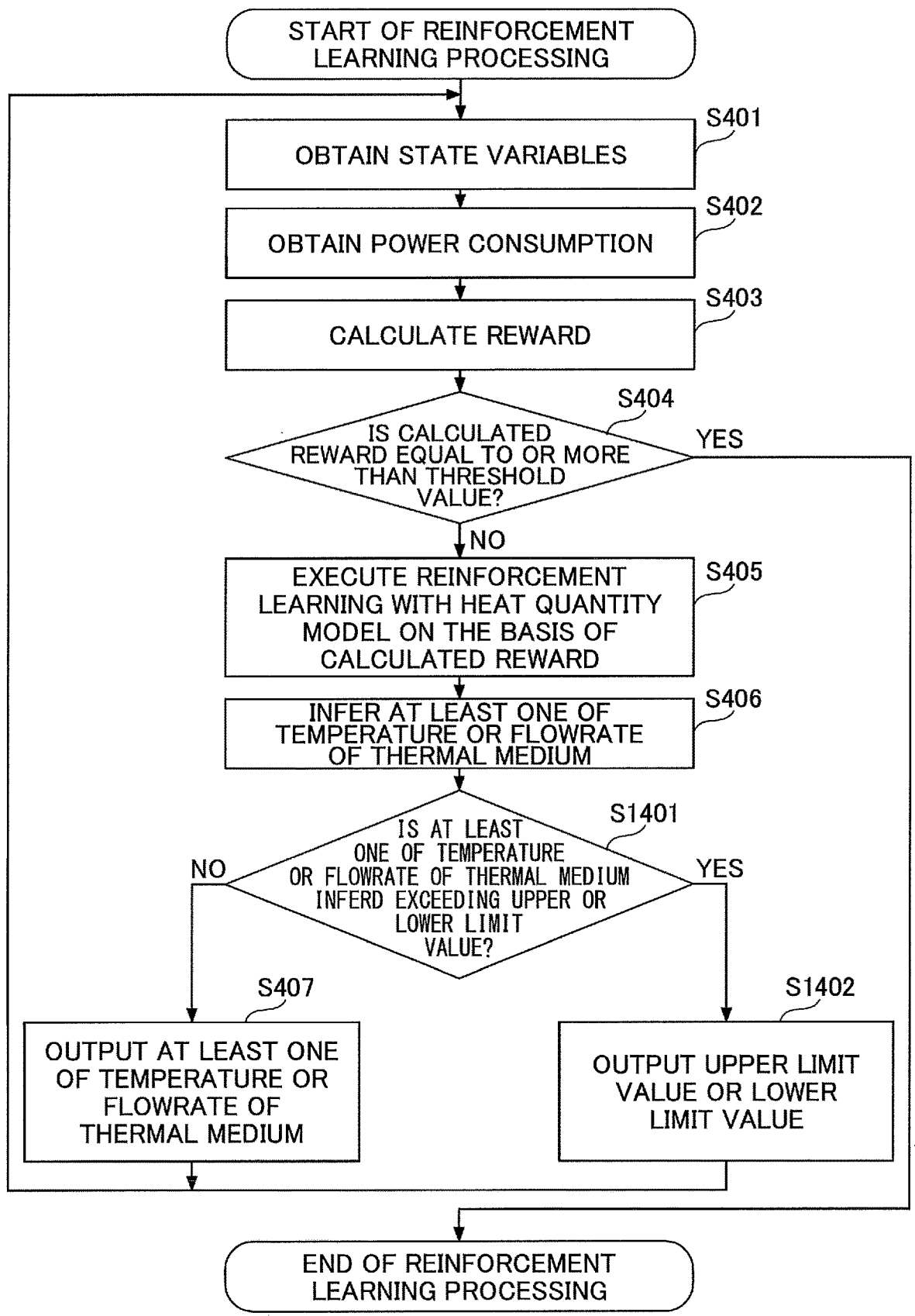
FIG. 14 is a third flowchart illustrating a flow of reinforcement learning processing performed by the machine learning apparatus.

Next, a flow of reinforcement learning processing performed by the machine learning apparatus 150 is explained. FIG. 14 is a third flowchart illustrating a flow of reinforcement learning processing performed by the machine learning apparatus. Difference from the flowchart illustrated in FIG. 4 is steps S1401, S1402

In step S1401, the upper-and-lower limit value limiting unit 1310 determines whether the target value of at least one of the temperature and the flowrate of the thermal medium that is output from the reinforcement learning unit 340 in step S406 is exceeding the upper or lower limit value that could be set in the device on the heat-providing side 120.

In a case where it is determined that the target value is exceeding the upper or lower limit value in step S1401 ("YES" in step S1401), the upper-and-lower limit value limiting unit 1310 proceeds to step S1402.

In step S1401, the upper-and-lower limit value limiting unit 1310 outputs the upper limit value or the lower limit value to the device on the heat-providing side 120.

Conversely, in a case where it is determined that the target value is not exceeding the upper or lower limit value in step S1401 ("NO" in step S1401), the upper-and-lower limit value limiting unit 1310 proceeds to step S407. In this case, the upper-and-lower limit value limiting unit 1310 outputs the target value of at least one of the temperature and the flowrate of the thermal medium that is output from the reinforcement learning unit 340 in step S406 to the device on the heat-providing side 120.

<Summary>

As can be understood from the above explanation, the machine learning apparatus 150 limits the target value of at least one of the temperature and the flowrate of the thermal medium that is to be transmitted to the heat-providing side 120, in accordance with the upper or lower limit value. Therefore, the machine learning apparatus 150 achieves safe operation of the device on the heat-providing side 120.

Seventh Embodiment

In the above first to sixth embodiments, a specific circuit configuration for transferring a thermal medium is omitted in the explanation about the system configuration of the air conditioning system. Accordingly, in the following embodiment, a system configuration of an air conditioning system is explained while clarifying a specific circuit configuration for transferring a thermal medium.

Among them, in the present embodiment, in an air conditioning system (corresponding to the air conditioning system explained in the above second embodiment) including a cooling tower, a water-cooled chiller, and an air-conditioning apparatus, a specific circuit configuration (a cooling water circuit and a cold water circuit) for transferring a thermal medium is clearly explained.

<System Configuration of Air Conditioning System>

Figure 15:
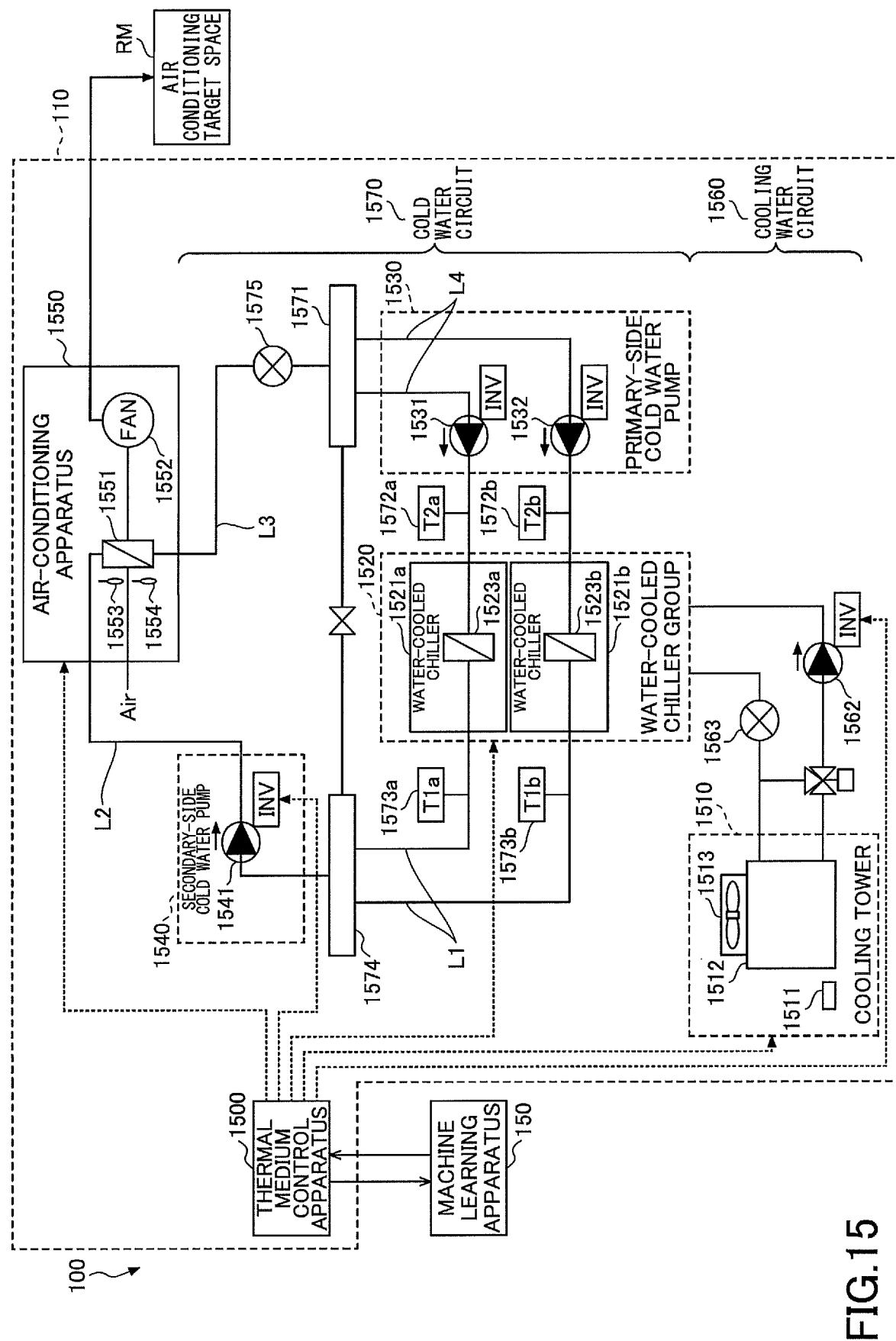
FIG. 15 is a first drawing illustrating an example of a system configuration of an air conditioning system including a cooling water circuit and a cold water circuit.
Figure 16:
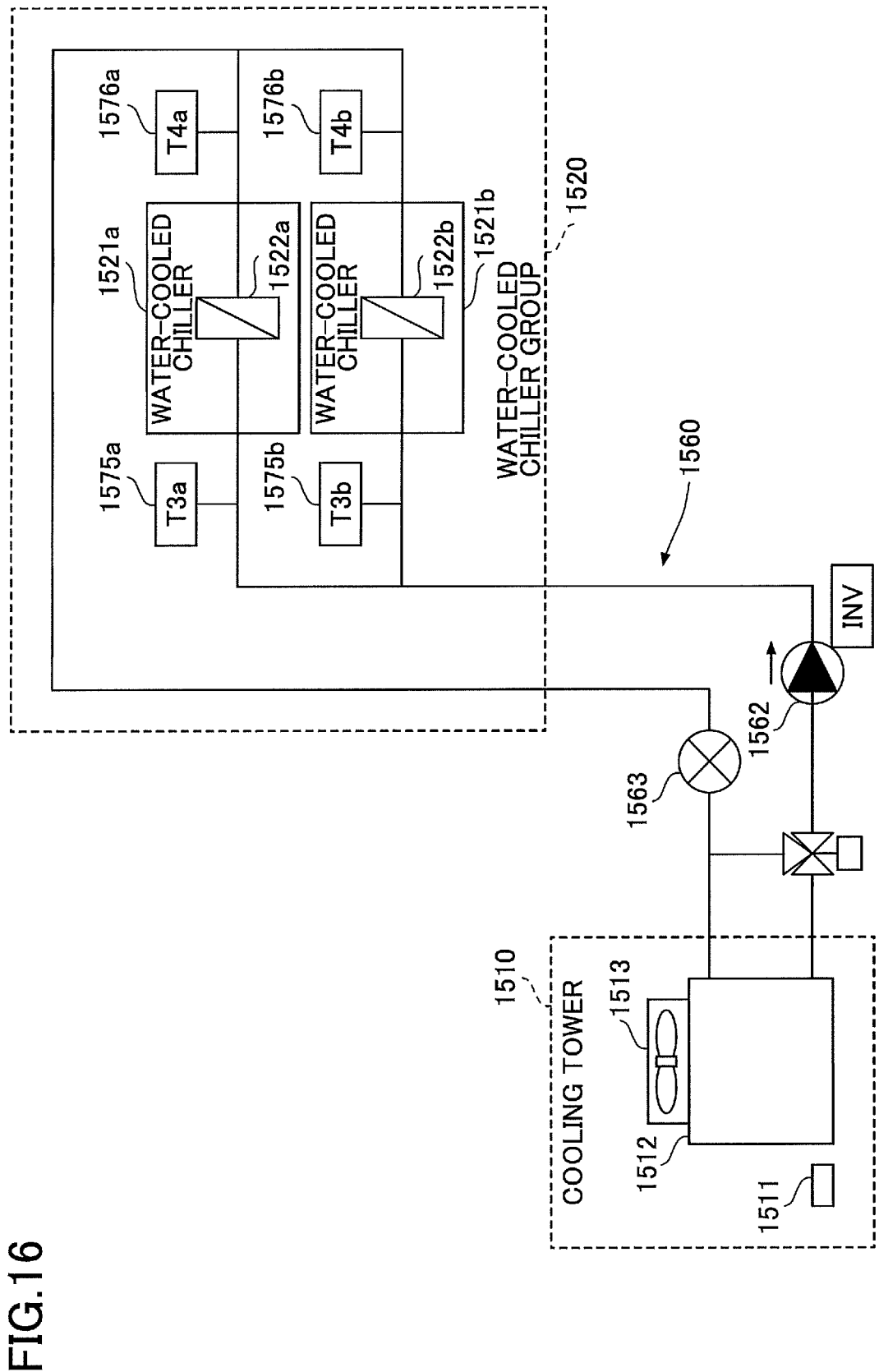
FIG. 16 is a drawing illustrating the details of the cooling water circuit.

FIG. 15 is a drawing illustrating an example of the system configuration of the air conditioning system including the cooling water circuit and the cold water circuit. FIG. 16 is a drawing illustrating the details of the cooling water circuit. Hereinafter, the overall configuration of the air conditioning system 100, each device of the air conditioning system 100, and the configuration of each circuit are explained with reference to FIG. 15 and FIG. 16.

(1) Overall Configuration of Air Conditioning System

The air conditioning system 100 illustrated in FIG. 15 is installed in a relatively large structure such as a building, a factory, a hospital, a hotel, or the like.

In the case of the air conditioning system 100 illustrated in FIG. 15, the air conditioner 110 includes a thermal medium control apparatus 1500, a cooling tower 1510, a water-cooled chiller group 1520, a primary-side cold water pump 1530, a secondary-side cold water pump 1540, and an air-conditioning apparatus 1550.

As illustrated in FIG. 15, a cooling water circuit 1560 is formed between the cooling tower 1510 and the water-cooled chiller group 1520, and a cold water circuit 1570 is formed between the water-cooled chiller group 1520 and the air-conditioning apparatus 1550.

(2) Cooling Tower and Cooling Water Circuit

In the cooling tower 1510, a fan 1513 provided in the main body 1512 operates according to the control of the thermal medium control apparatus 1500 to allow the cooling water circulating in the cooling water circuit 1560 to come into contact with the outside air. The cooling tower 1510 is provided with a wet-bulb thermometer 1511 to measure the wet-bulb temperature of the outside air, and outputs the ambient wet-bulb temperature to the thermal medium control apparatus 1500.

The cooling water circuit 1560 is provided with a cooling water pump 1562 (see FIG. 15). The cooling water pump 1562 is a pump capable of adjusting the discharge flowrate, and is configured to circulate the cooling water in the cooling water circuit 1560. The cooling water pump 1562 is driven with an inverter by the thermal medium control apparatus 1500.

In addition, the cooling water circuit 1560 is provided with temperature detection sensors 1575a, 1575b, 1576a, 1576b (see FIG. 16). The temperature detection sensor 1575a is attached in proximity to the inlet of the water-cooled chiller 1521a to measure a cooling water temperature T3a. Also, the temperature detection sensor 1575b is attached in proximity to the inlet of the water-cooled chiller 1521b to measure a cooling water temperature T3b.

Also, the temperature detection sensor 1576a is attached in proximity to the outlet of the water-cooled chiller 1521a to measure a cooling water temperature T4a. Further, the temperature detection sensor 1576b is attached in proximity to the inlet of the water-cooled chiller 1521b to measure a cooling water temperature T4b.

The cooling water temperatures measured by the temperature detection sensors 1575a, 1575b, 1576a, 1576b are output to the thermal medium control apparatus 1500.

A flowmeter 1563 is attached to the cooling water circuit 1560 (see FIG. 16). The flowmeter 1563 is attached to a position that is on the outlet sides of the water-cooled chillers 1521a, 1521b and that is on the inlet side of the cooling tower 1510, and is configured to measure the flowrate of the cooling water circulating in the cooling water circuit 1560.

(3) Water-Cooled Chiller Group

The water-cooled chiller group 1520 includes water-cooled chillers 1521a, 1521b which are water-cooled heat source units. The water-cooled chillers 1521a, 1521b are connected in parallel with each other in the cooling water circuit 1560 (see FIG. 16).

The water-cooled chillers 1521a, 1521b includes refrigerant circuits (not illustrated) in which compressors (not illustrated), radiators 1522a, 1522b (see FIG. 16), chiller-side expansion valves (not illustrated), evaporators 1523a, 1523b (see FIG. 15), and the like are successively connected. The inner spaces of the refrigerant circuits are filled with refrigerant. The cooling water circulating in the cooling water circuit 1560 passes through the radiators 1522a, 1522b so that heat exchange occurs with the refrigerant in the refrigerant circuit. Further, in the evaporators 1523a, 1523b, the refrigerant in the refrigerant circuit performs heat exchange with the cold water circulating in the cold water circuit 1570.

In this manner, the water-cooled chillers 1521a, 1521b cool or heat the cold water, serving as a thermal medium, via the refrigerant circuit.

(4) Cold Water Circuit

The cold water circuit 1570 is constituted by connection pipes L1 to L4 filled with cold water serving as a thermal medium (see FIG. 15).

Specifically, pipes L1 equal in number to the number of water-cooled chillers 1521a, 1521b (two connection pipes L1 in the case of FIG. 15) are provided, and first ends of the connection pipes L1 are connected to the evaporators 1523a, 1523b on the outlet sides of the water-cooled chillers 1521a, 1521b, respectively. Second ends of the connection pipes L1 are connected to the inflow port of a tank 1574.

A first end of the connection pipe L2 is connected to the outflow port of the tank 1574, and a second end thereof is connected to a use-side heat exchanger 1551 serving as the inlet side of the air-conditioning apparatus 1550. A first end of the connection pipe L3 is connected to the outlet side of the air-conditioning apparatus 1550, and a second end thereof is connected to a header 1571. Connection pipes L4 equal in number to the number of the water-cooled chillers 1521a, 1521b (two connection pipes L4 in the case of FIG. 15) are provided, and are connected to the evaporators 1523a, 1523b.

In this manner, the connection pipes L1 to L4 circularly connect the water-cooled chillers 1521a, 1521b and the air-conditioning apparatus 1550. In the present embodiment, further, a connection pipe L5 is provided to directly connect the header 1571 and the tank 1574 without going through the water-cooled chillers 1521a, 1521b.

In the connection pipes L4, primary-side cold water pumps 1531, 1532 equal in number to the number of water-cooled chillers 1521a, 1521b (two water-cooled chillers 1521a, 1521b in the case of FIG. 15) are provided as the primary-side cold water pump 1530.

The primary-side cold water pumps 1531, 1532 are variable capacity pumps that can adjust the capacity and that can adjust the discharge capacity, and are driven with inverters by the thermal medium control apparatus 1500. The primary-side cold water pumps 1531, 1532 circulate the cold water in the cold water circuit 1570 by transferring the cold water flowing out from the use-side heat exchanger 1551 of the air-conditioning apparatus 1550 to the water-cooled chillers 1521a, 1521b. Specifically, the primary-side cold water pumps 1531, 1532 cause the cold water in the connection pipes L1 to L4 to circulate between the water-cooled chillers 1521a, 1521b and the air-conditioning apparatus 1550.

Also, the tank 1574 is provided between the connection pipes L1, L2. The tank 1574 is connected to the water-cooled chillers 1521a, 1521b via the connection pipes L1, and is connected to the air-conditioning apparatus 1550 via the connection pipe L2. The tank 1574 accumulates cold water that is heated or cooled by the water-cooled chillers 1521a, 1521b.

The secondary-side cold water pump 1540 is provided in the connection pipe L2. Similarly to the primary-side cold water pumps 1531, 1532, the secondary-side cold water pump 1540 is a variable capacity pump that can adjust the capacity and that can adjust the discharge capacity, and is driven with an inverter by the thermal medium control apparatus 1500. The secondary-side cold water pump 1540 circulates the cold water in the cold water circuit 1570 by transferring the cold water from the water-cooled chillers 1521a, 1521b to the air-conditioning apparatus 1550.

A flowmeter 1575 is attached to the connection pipe L3. The flowmeter 1575 is attached to the upstream-side of the header 1571 in the connection pipe L3. The flowmeter 1575 measures the flowrate of the cold water circulating through the cold water circuit 1570.

Temperature detection sensors 1573a, 1573b are attached to the connection pipe L1, and temperature detection sensors 1572a, 1572b are attached to the connection pipe L4.

Among them, the temperature detection sensor 1573*a* measures a cold water temperature Tia at a position in proximity to the outlet of the water-cooled chiller 1521*a*, and the temperature detection sensor 1573*b* measures a cold water temperature T1*b* at position in proximity to the outlet of the water-cooled chiller 1521*b*.

The temperature detection sensor 1572*a* measures a cold water temperature T2*a* at a position in proximity to the inlet of the water-cooled chiller 1521*a*, and the temperature detection sensor 1572*b* measures a cold water temperature T2*b* at a position in proximity to the inlet of the water-cooled chiller 1521*b*.

The cold water temperatures measured by the temperature detection sensors 1572*a*, 1572*b*, 1573*a*, 1573*b* are output to the thermal medium control apparatus 1500.

(5) Air-Conditioning Apparatus

As illustrated in FIG. 15, the air-conditioning apparatus 1550 is connected to an air conditioning target space RM via a duct or the like. The air-conditioning apparatus 1550 includes a use-side heat exchanger 1551, an air-blowing fan 1552, a temperature detection sensor 1553, and a humidity detection sensor 1554.

The use-side heat exchanger 1551 heats or cools air by performing heat exchange between air taken from the air conditioning target space RM and the cold water in the cold water circuit 1570. The use-side heat exchanger 1551 is, for example, a fin-and-tube heat exchanger including multiple thermal transfer fins and a thermal transfer tube penetrating the thermal transfer fins.

The air-blowing fan 1552 is a fan that can adjust the volume of heated or cooled air to be blown by changing the number of revolutions in a stepwise manner by being driven with an inverter. The air-blowing fan 1552 forms a flow of air blown to the air conditioning target space RM via the use-side heat exchanger 1551.

The temperature detection sensor 1553 measures the intake air temperature of the air-conditioning apparatus 1550, and outputs the measured intake air temperature to the thermal medium control apparatus 1500. The humidity detection sensor 1554 measures the intake air humidity of the air-conditioning apparatus 1550 and outputs the measured intake air humidity to the thermal medium control apparatus 1500.

<Functions of Thermal Medium Control Apparatus>

Figure 17:
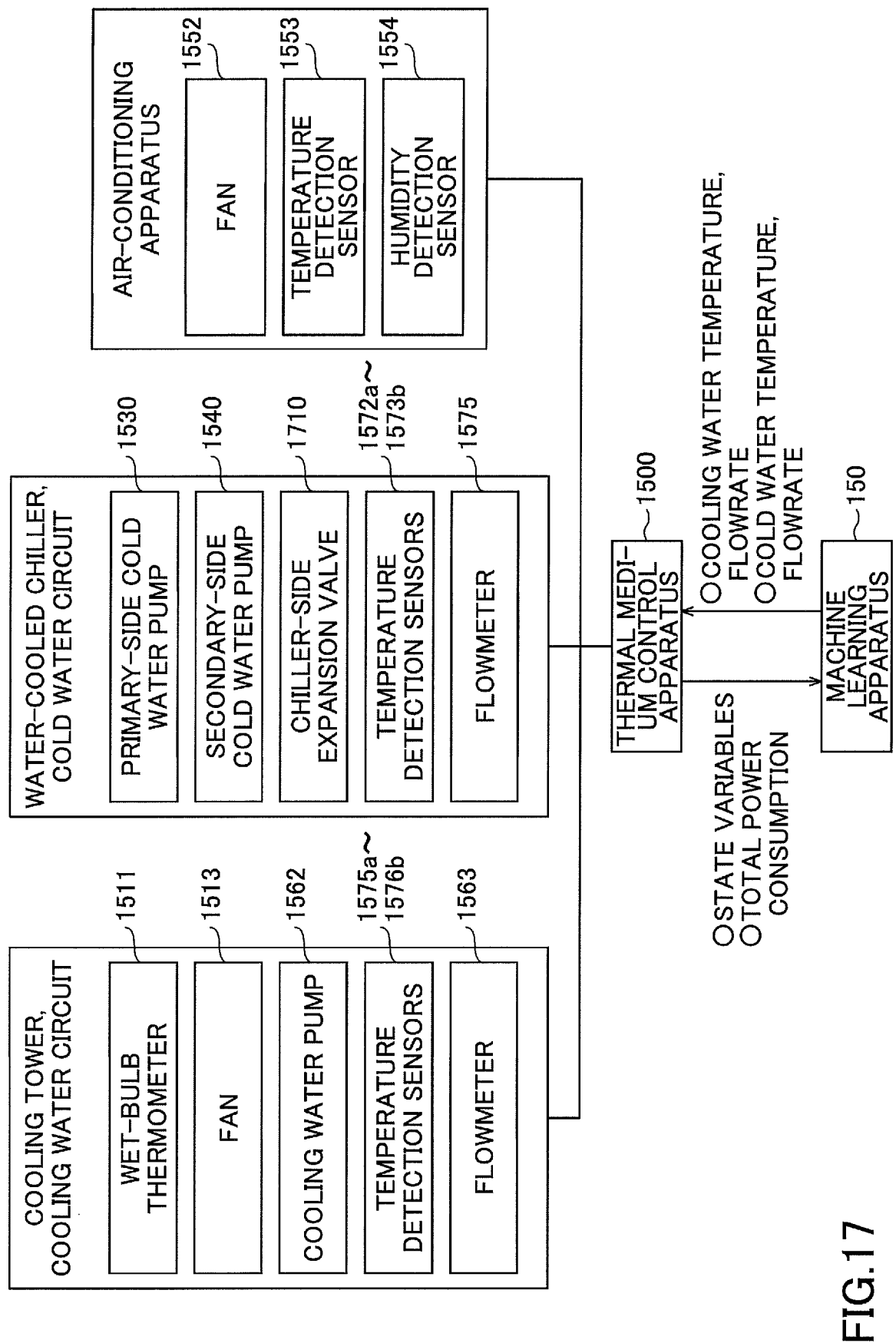
FIG. 17 is a first drawing for explaining the functions of a thermal medium control apparatus.

Next, the functions of the thermal medium control apparatus 1500 are briefly explained. FIG. 17 is a first drawing for explaining the functions of the thermal medium control apparatus. The thermal medium control apparatus 1500 is an apparatus for centrally controlling the air conditioning system 100, and is electrically connected to various sensors constituting the air conditioner 110, various driving apparatus (pumps, fans, valves), and the like.

In the present embodiment, the thermal medium control apparatus 1500 identifies the operation condition of the cooling tower 1510 and the operation condition of the air-conditioning apparatus 1550 on the basis of the outputs and the like of various sensors. Also, the thermal medium control apparatus 1500 identifies the load of the air-conditioning apparatus 1550 on the basis of the outputs and the like of various sensors. Then, the thermal medium control apparatus 1500 transmits, to the machine learning apparatus 150, "state variables" including the operation condition of the cooling tower 1510, the operation condition of the air-conditioning apparatus 1550, and the load of the air-conditioning apparatus 1550.

The operation condition of the cooling tower 1510 included in the state variables includes:

the ambient wet-bulb temperature measured by the wet-bulb thermometer 1511 of the cooling tower 1510.

The operation condition of the air-conditioning apparatus 1550 included in the state variables includes:

the intake air temperature measured by the temperature detection sensor 1553 of the air-conditioning apparatus 1550; and the intake air humidity measured by the humidity detection sensor 1554 of the air-conditioning apparatus 1550.

The load of the air-conditioning apparatus 1550 included in the state variables includes:

the heat quantity currently required for the air-conditioning apparatus 1550 (that is calculated using the intake air temperature, the air supply temperature target value, and the air volume).

The state variables may include the load of the cooling tower 1510 and the load of the water-cooled chiller group 1520.

In a case where the current operation performance of the air conditioning system 100 satisfies the load of the air-conditioning apparatus 1550 (an air supply temperature target value), or in a case where an operation is performed so that the current operation performance of the air conditioning system 100 approaches the load of the air-conditioning apparatus 1550, i.e., in a case where the operation state of the air conditioning system 100 transitions to the steady operation in which "load=operation performance" is satisfied after the start up, the load of the cooling tower 1510 is calculated from, for example, a product of the supply-and-return temperature difference of the cooling water and the cooling water flowrate.

For example, the supply-and-return temperature difference of the cooling water is calculated using a difference between the cooling water temperatures T3*a*, T3*b* measured by the temperature detection sensors 1575*a*, 1575*b* and the cooling water temperatures T4*a*, T4*b* measured by the temperature detection sensors 1576*a*, 1576*b*. For example, the cooling water flowrate is calculated from the voltage or the frequency of the inverter of the cooling water pump 1562 when the inverter is driven, or is measured by the flowmeter 1563.

In a case where the operation state of the air conditioning system 100 transitions to the steady operation in which "load=operation performance" is satisfied after the start up, the load of the water-cooled chiller group 1520 is calculated from the product of the supply-and-return temperature difference of the cold water and the cold water flowrate or from the load factor of the water-cooled chiller group 1520.

For example, the supply-and-return temperature difference of the cold water is calculated using a difference between the cold water temperatures T1*a*, T1*b* measured by the temperature detection sensors 1573*a*, 1573*b*, respectively, and the cold water temperatures T2*a*, T2*b* measured by the temperature detection sensors 1572*a*, 1572*b*, respectively.

For example, the cold water flowrate is calculated from the voltage or the frequency of the inverter of the primary-side cold water pumps 1531, 1532 or the secondary-side cold water pump 1540 when the inverter is driven, or is measured by the flowmeter 1575.

In the present embodiment, the thermal medium control apparatus 1500 identifies the power consumptions of various driving apparatuses, and transmits the identified power consumptions to the machine learning apparatus 150. The power consumptions of various driving apparatuses include:
- the power consumption of the cooling tower 1510;
- the power consumption of the water-cooled chiller group 1520;
- the power consumption of the cooling water pump 1562;
- the power consumptions of the primary-side cold water pump 1530 and the secondary-side cold water pump 1540; and
- the power consumption of the air-conditioning apparatus 1550.

In the present embodiment, the thermal medium control apparatus 1500 outputs the state variables and the power consumptions to the machine learning apparatus 150 and obtains, from the machine learning apparatus 150, at least any one of:
- a pair of target values that are the target value of the cooling water temperature and the target value of the cold water temperature; and
- a pair of target values that are the target value of the cooling water flowrate and the target value of the cold water flowrate.

The thermal medium control apparatus 1500 controls the air conditioner 110 (the fan 1513, the cooling water pump 1562, the primary-side cold water pump 1530, the secondary-side cold water pump 1540, the chiller-side expansion valve 1710, the air-blowing fan 1552, and the like),
- on the basis of a pair of target values that are the obtained target value of the cooling water temperature and the target value of the cold water temperature; or
- on the basis of a pair of target values that are the target value of the cooling water flowrate and the target value of the cold water flowrate.

<Functional Configuration of Machine Learning Apparatus>

Figure 18:
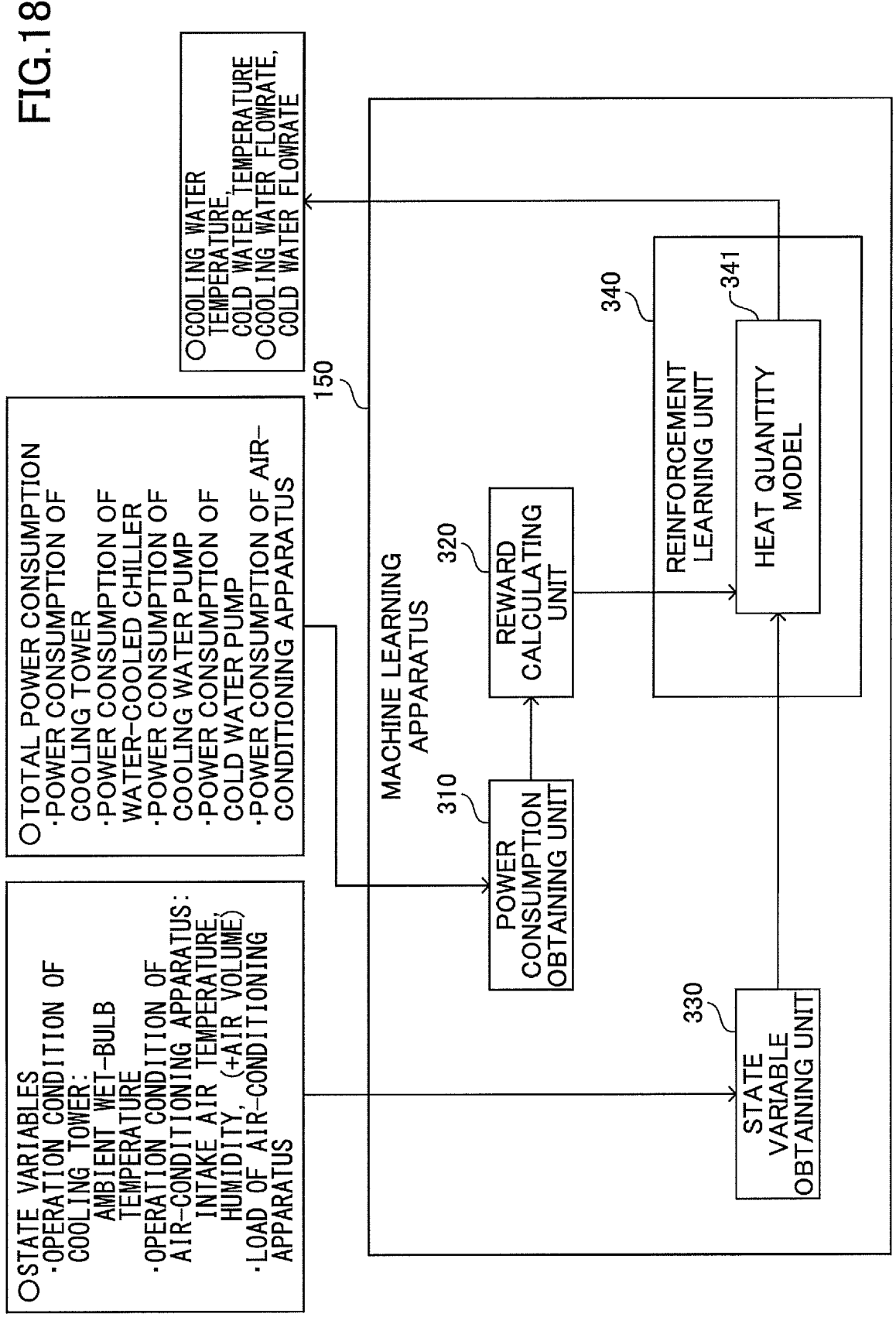
FIG. 18 is a fourth drawing illustrating an example of a functional configuration of the machine learning apparatus.

Next, the functional configuration of the machine learning apparatus 150 is explained. FIG. 18 is a fourth drawing illustrating an example of a functional configuration of the machine learning apparatus.

As described above, the machine learning program is installed in the machine learning apparatus 150, and when the machine learning program is executed, the machine learning apparatus 150 functions as the power consumption obtaining unit 310, the reward calculating unit 320, the state variable obtaining unit 330, and the reinforcement learning unit 340.

The power consumption obtaining unit 310 obtains, from the thermal medium control apparatus 1500:
- the power consumption of the cooling tower 1510;
- the power consumption of the water-cooled chiller group 1520;
- the power consumption of the cooling water pump 1562;
- the power consumption of the primary-side cold water pump 1530;
- the power consumption of the secondary-side cold water pump 1540;
- the power consumption of the air-conditioning apparatus 1550;
- and calculates the total value. Also, the power consumption obtaining unit 310 provides notification of the calculated total power consumption to the reward calculating unit 320.

The reward calculating unit 320 calculates the reward on the basis of the total power consumption notified from the power consumption obtaining unit 310, and provides notification of the reward to the reinforcement learning unit 340.

The state variable obtaining unit 330 obtains, from the thermal medium control apparatus 1500, the state variables (the operation condition of the cooling tower 1510, the operation condition of the air-conditioning apparatus 1550, and the load of the air-conditioning apparatus 1550), and provides notification of the state variables to the reinforcement learning unit 340.

The reinforcement learning unit 340 includes a heat quantity model 341, and changes the model parameters of the heat quantity model 341 so as to maximize the reward notified by the reward calculating unit 320. Accordingly, the reinforcement learning unit 340 performs the reinforcement learning with respect to the heat quantity model 341 in which the following are associated with each other:
- the state variables; and
- at least any one of pairs of target values, i.e., a pair of target values that are the target value of the cooling water temperature and the target value of the cold water temperature, or a pair of target values that are the target value of the cooling water flowrate and the target value of the cold water flowrate.

The reinforcement learning unit 340 obtains at least any one of pairs of target values, i.e:
- a pair of target values that are the target value of the cooling water temperature and the target value of the cold water temperature; or,
- a pair of target values that are the target value of the cooling water flowrate and the target value of the cold water flowrate, which are calculated by inputting the current state variables notified by the state variable obtaining unit 330 into the heat quantity model 341 in which the model parameters have been changed. Further, the reinforcement learning unit 340 transmits the obtained pair of target values to the air conditioner 110. Accordingly, the air conditioner 110 operates to achieve the received pair of target values. As a result, the machine learning apparatus 150 can reduce the power consumption of the air conditioner 110.

<Flow of Reinforcement Learning Processing>

Figure 19:
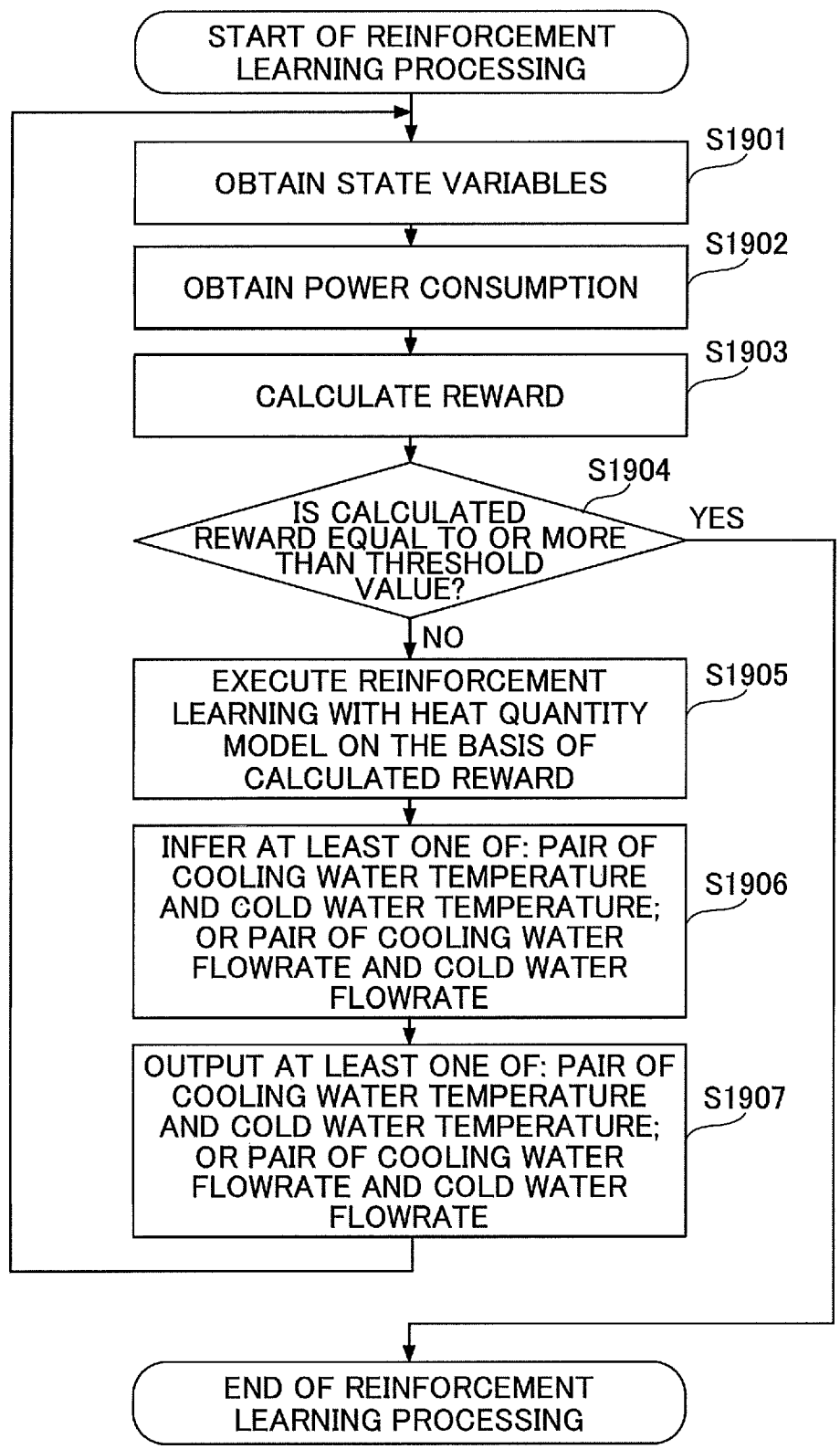
FIG. 19 is a fourth flowchart illustrating a flow of reinforcement learning processing performed by the machine learning apparatus.

Next, a flow of reinforcement learning processing performed by the machine learning apparatus 150 is explained. FIG. 19 is a fourth flowchart illustrating a flow of reinforcement learning processing performed by the machine learning apparatus.

In step S1901, the state variable obtaining unit 330 obtains the state variables in the predetermined period of time from the thermal medium control apparatus 1500.

In step S1902, the power consumption obtaining unit 310 obtains the respective power consumptions in the predetermined period of time from the thermal medium control apparatus 1500, and calculates the total value.

In step S1903, the reward calculating unit 320 calculates the reward on the basis of the calculated total power consumption.

In step S1904, the reward calculating unit 320 determines whether the calculated reward is equal to or more than the predetermined threshold value. In a case where it is determined that the calculated reward is not equal to or more than the predetermined threshold value in step S1904 ("NO" in step S1904), the reward calculating unit 320 proceeds to step S1905.

In step S1905, the reinforcement learning unit 340 performs the machine learning with respect to the heat quantity model 341 so as to maximize the calculated reward heat.

In step S1906, the reinforcement learning unit 340 executes the heat quantity model 341 by inputting the current state variables into the heat quantity model 341. Accordingly, the reinforcement learning unit 340 outputs at least any one of pairs of target values, i.e., a pair of target values that are the target value of the cooling water temperature and the target value of the cold water temperature, or a pair of target values that are the target value of the cooling water flowrate and the target value of the cold water flowrate.

In step S1907, the reinforcement learning unit 340 transmits the pair of target values, which has been output, to the thermal medium control apparatus 1500. Thereafter, the reinforcement learning unit 340 returns back to step S1901.

Conversely, in a case where it is determined that the calculated reward is equal to or more than the predetermined threshold value in step S1904 ("YES" in step S1904), the reinforcement learning processing is ended.

<Summary>

As can be understood from the above explanation, in the seventh embodiment, the air conditioning system including the cooling tower, the water-cooled chiller, and the air-conditioning apparatus can optimize the transfer of the heat quantity in the cooling water circuit and the cold water circuit.

Eighth Embodiment

In the above seventh embodiment, the specific circuit configuration of the thermal medium in the air conditioning system (the above second embodiment) that includes the cooling tower, the water-cooled chiller, and the air-conditioning apparatus and that optimizes the transfer of the heat quantity in the cooling water circuit and the cold water circuit has been clearly explained.

In contrast, in the eighth embodiment, a specific circuit configuration of a thermal medium in an air conditioning system (the above third embodiment) that includes an air-cooled chiller (a chiller unit) and an air-conditioning apparatus (an air handling unit) and that optimizes transfer of heat quantity in a cold water circuit (a water circuit) is clearly explained.

<System Configuration of Air Conditioning System>

Figure 20:
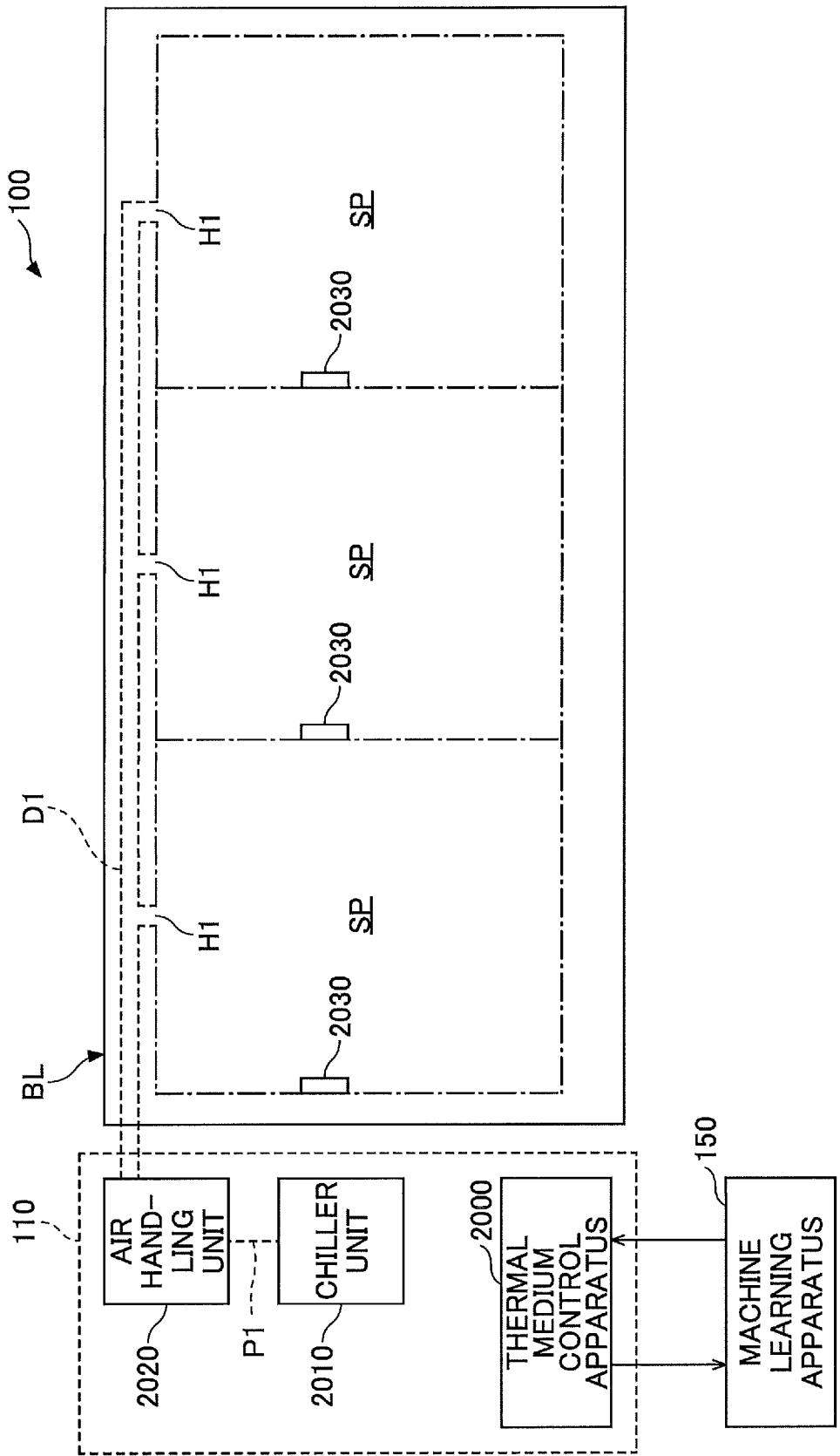
FIG. 20 is a first drawing illustrating an example of a system configuration of an air conditioning system including a water circuit.

FIG. 20 is a first drawing illustrating an example of a system configuration of an air conditioning system including a water circuit. The air conditioning system 100 is an air conditioning system of a central air conditioning method, and achieves air-conditioning in target spaces SP in a structure such as a house, a building, a factory, a public facility, or the like. In the present embodiment, a case where the air conditioning system 100 is applied to a building BL including multiple (in this case, three) target spaces SP (SP1, SP2, SP3) is explained.

As illustrated in FIG. 20, the air conditioning system 100 includes an air conditioner 110 and a machine learning apparatus 150. The air conditioner 110 takes in outside air OA, conditions the taken-in outside air OA, and provides the conditioned outside air OA to the target spaces SP, so that air-conditioning such as cooling, heating, ventilation, dehumidification and/or humidification is performed for the target spaces SP. The outside air OA is air outside of the target spaces SP, and in the present embodiment, the outside air OA means outdoor air.

As illustrated in FIG. 20, the air conditioner 110 further includes a thermal medium control apparatus 2000, a chiller unit 2010, an air handling unit 2020, and a remote controller 2030. The thermal medium control apparatus 2000 controls the operations of the respective devices in response to commands input to the remote controller 2030 (commands related to an ON/OFF state, an operation type, a setting temperature, a setting humidity, a setting air volume, and the like) and load situations (the temperature and the humidity of the outside air OA, the temperature and the humidity of an interior air IA, and the like).

<Configuration of Air Conditioner>

Next, the configurations of respective apparatuses (which are, in this case, the chiller unit 2010, the air handling unit 2020, and the remote controller 2030) including the air conditioner 110 and the configurations of respective circuits are explained.

(1) Water Circuit and Refrigerant Circuit

Figure 21:
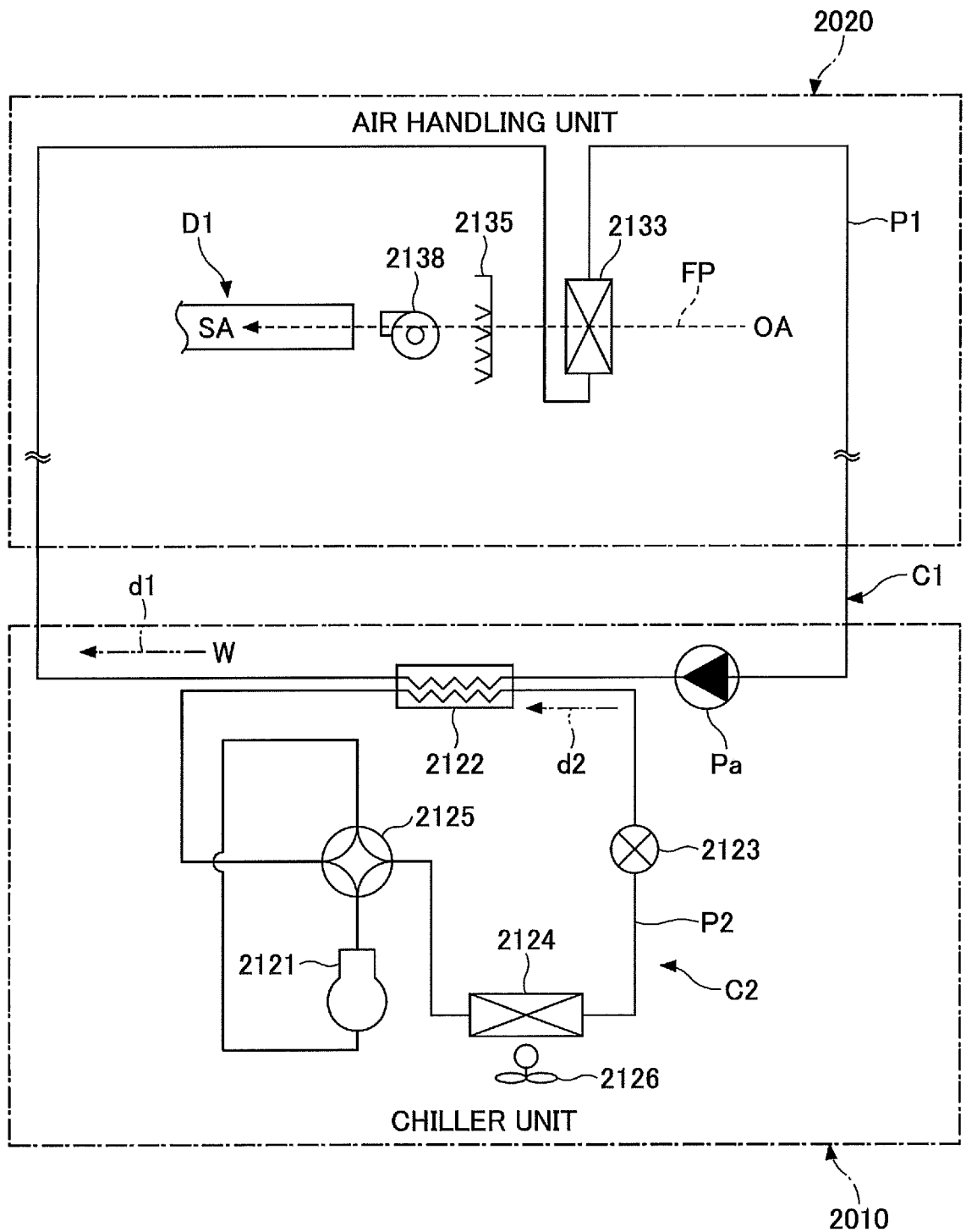
FIG. 21 is a first drawing illustrating a detailed configuration of an air conditioner.

First, a specific circuit configuration for transferring a thermal medium in the air conditioner 110 is explained. FIG. 21 is a first drawing illustrating a detailed configuration of an air conditioner. As illustrated in FIG. 21, the air handling unit 2020 and the chiller unit 2010 includes a water circuit C1 and a refrigerant circuit C2, respectively.

The water circuit C1 is a circuit in which a thermal medium (water, which is denoted as "W" in FIG. 21), which undergoes heat exchange with the outside air OA, circulates. The water circuit C1 is configured to extend across the chiller unit 2010 and the air handling unit 2020. The water circuit C1 is configured such that, mainly, an air heat exchanger 2133 arranged in the air handling unit 2020, a water heat exchanger 2122 arranged in the chiller unit 2010, and a water pump Pa are connected by a first piping P1.

When the operation of the water pump Pa is controlled, the water serving as the thermal medium is transferred in a predetermined direction (a direction indicated by a long dashed double-short dashed line arrow d1 of FIG. 21) in the water circuit C1. The flowrate of water in the water circuit C1 is adjusted mainly by the number of revolutions of the water pump Pa. Although not illustrated in FIG. 21, it is assumed that a header collecting pipe for merging and splitting water, an opening and closing valve for blocking the flow of water, and devices such as a pump other than the water pump Pa are arranged in water circuit C1 (in the first piping P1).

The refrigerant circuit C2 is a circuit in which refrigerant serving as the cooling source for water in the water circuit C1 circulates. The refrigerant circuit C2 is provided in the chiller unit 2010. The refrigerant circuit C2 is configured such that, mainly, a compressor 2121, a water heat exchanger 2122, an expansion valve 2123, an outdoor heat exchanger 2124, and a four-way switching valve 2125 arranged in the chiller unit 2010 are connected by a second piping P2. When the operation of the compressor 2121 is controlled and the opening degree of the expansion valve 2123 is controlled, the refrigerant serving as the thermal medium is transferred in a predetermined direction in the refrigerant circuit C2, so that a vapor compression refrigeration cycle is performed. In a positive cycle operation, the predetermined direction indicates a direction indicated by a long dashed double-short dashed line arrow d2 of FIG. 21, and in a reverse cycle operation, the predetermined direction indicates a direction opposite to d2.

(2) Chiller Unit

The chiller unit 2010 is an example of a "heat source apparatus". In the chiller unit 2010, the refrigerant circuit C2 performs a refrigeration cycle to cool or heat the water (W) in the water circuit C1, and the cooled or heated water (W) is discharged and provided to the air handling unit 2020 in operation. The chiller unit 2010 mainly includes the compressor 2121, the water heat exchanger 2122, the expansion valve 2123, the outdoor heat exchanger 2124, the four-way switching valve 2125, an outdoor fan 2126, and the water pump Pa. Instead of the chiller unit 2010, another heat source apparatus such as a refrigerator, a boiler, or the like may be provided.

The compressor 2121 is a device for compressing the refrigerant from a low pressure to a high pressure in a refrigeration cycle. In this case, a compressor of a closed-type structure including a compressor motor is employed as the compressor 2121. For example, a compression element (not illustrated) of a volume type such as a scroll type is accommodated in the compressor 2121, and the compression element is rotationally driven by the compressor motor. The compressor motor is driven with an inverter, and accordingly, the volume control of the compressor 2121 is performed. Therefore, the compressor 2121 is capable of changing the capacity.

The water heat exchanger 2122 is a device that performs heat exchange between the water in the water circuit C1 and the refrigerant in the refrigerant circuit C2 to cool or heat the water. A water flow path in communication with the water circuit C1 and a refrigerant flow path in communication with the refrigerant circuit C2 are formed in the water heat exchanger 2122, so that the water heat exchanger 2122 performs heat exchange between water in the water flow path and the refrigerant in the refrigerant flow path. Specifically, during the positive cycle operation (the cooling operation and the dehumidifying operation), the water heat exchanger 2122 functions as an evaporator for low pressure refrigerant to cool the cold water. In addition, during the reverse cycle operation (the heating operation), the water heat exchanger 2122 functions as a condenser for high pressure refrigerant to heat heating water.

The expansion valve 2123 functions as decompression means or flowrate adjustment means for refrigerant. In the present embodiment, the expansion valve 2123 is an electric expansion valve capable of controlling the degree of opening.

The outdoor heat exchanger 2124 is a device for performing heat exchange between refrigerant and air in the refrigerant circuit C2 to radiate heat to air or absorb heat from air. The outdoor heat exchanger 2124 includes a thermal transfer tube in communication with the refrigerant circuit C2 and thermal transfer fins. The outdoor heat exchanger 2124 performs heat exchange between air (outdoor air flow explained later) passing around the thermal transfer tube and thermal transfer fins and the refrigerant passing through the thermal transfer tube. The outdoor heat exchanger 2124 functions as the condenser of for high pressure refrigerant during the positive cycle operation, and functions as an evaporator for low pressure refrigerant during the heating operation.

The four-way switching valve 2125 is a valve for switching the flow of the refrigerant circuit C2. The four-way switching valve 2125 includes four connection ports, which are connected to the intake pipe of the compressor 2121, the discharge pipe of the compressor 2121, the gas side of the refrigerant flow path of the water heat exchanger 2122, the gas side of the outdoor heat exchanger 2124. Accordingly, the four-way switching valve 2125 switches between the first state and the second state.

The first state is a state in which the gas side of the refrigerant flow path of the water heat exchanger 2122 and the intake pipe of the compressor 2121 are in communication with each other, and the discharge pipe of the compressor 2121 and the gas side of the outdoor heat exchanger 2124 are in communication with each other (see a solid line of the four-way switching valve 2125 in FIG. 21).

The second state is a state in which the discharge pipe of the compressor 2121 and the gas side of the refrigerant flow path of the water heat exchanger 2122 are in communication with each other, and the gas side of the outdoor heat exchanger 2124 and the intake pipe of the compressor 2121 are in communication with each other (see a broken line of the four-way switching valve 2125 in FIG. 21). The four-way switching valve 2125 is controlled to be in the first state during the positive cycle operation and is controlled to be in the second state during the reverse cycle operation.

The outdoor fan 2126 is a fan for generating the outdoor air flow. The outdoor air flow is a flow of air that flows into the chiller unit 2010, passes the outdoor heat exchanger 2124, and flows out of the chiller unit 2010. The outdoor air flow is a cooling source for refrigerant in the outdoor heat exchanger 2124 during the positive cycle operation, and is a heating source for refrigerant in the outdoor heat exchanger 2124 during the reverse cycle operation. The outdoor fan 2126 includes a fan motor, and the fan motor is driven with an inverter, so that the number of revolutions is adjusted. In other words, the outdoor fan 2126 is capable of changing the air volume.

The water pump Pa is provided in the water circuit C1. During the operation, the water pump Pa sucks in and discharges the water. The water pump Pa includes a motor serving as a drive source, and the motor is driven with an inverter, so that the number of revolutions is adjusted. Therefore, the water pump Pa is capable of changing the discharge flowrate.

(3) Air Handling Unit

The air handling unit 2020 is an example of an "air-conditioning apparatus". The air handling unit 2020 cools, dehumidifies, heats, and/or humidifies the outside air OA. The air handling unit 2020 is provided outdoors (outside of the target spaces SP).

The air handling unit 2020 mainly includes an air heat exchanger 2133, a humidifier 2135, and an air supply fan 2138.

The air heat exchanger 2133 (heat exchanger) is a device that functions as a cooler or a heater of the outside air OA. The air heat exchanger 2133 is provided in the water circuit C1. The air heat exchanger 2133 includes a thermal transfer tube in communication with the water circuit C1 and thermal transfer fins. The air heat exchanger 2133 performs heat exchange between the outside air OA passing around the thermal transfer tube and the thermal transfer fins and the water passing through the thermal transfer tube.

The humidifier 2135 is a device for humidifying the outside air OA having passed through the air heat exchanger 2133. The method and the type of the humidifier 2135 are not particularly limited, but in this case, it is assumed that a generally-available evaporative humidifier is adopted.

The air supply fan 2138 (air conditioning fan) is a fan that takes the outside air OA into the air handling unit 2020 and that blows the outside air OA via a duct D1 to the target spaces SP. The type of the air supply fan 2138 is not particularly limited, but in the present embodiment, it is assumed that a sirocco fan is adopted as the air supply fan 2138. In this case, an air flow path FP (see a broken line arrow "FP" of FIG. 21) in which the outside air OA flows is formed in the air handling unit 2020, and during the operation of the air supply fan 2138, the outside air OA flows along the air flow path FP. The air supply fan 2138 includes a fan motor, and the fan motor is driven with an inverter, so that the number of revolutions is adjusted. Therefore, the air supply fan 2138 is capable of changing the air volume.

The air handling unit 2020 includes an air heat exchanger 2133, a humidifier 2135, and an air supply fan 2138, which are from the windward side to the leeward side of the air flow path FP. The end portion of the leeward side of the air flow path FP is connected to the duct D1.

Various sensors are provided in the air handling unit 2020. For example, the various sensors provided in the air handling unit 2020 include: an outdoor temperature sensor S1 configured to measure the temperature of the outside air OA took into the air handling unit 2020; and an outdoor humidity sensor S2 configured to measure the humidity. In addition, the various sensors include an air supply temperature sensor S3 configured to measure the temperature (air supply temperature) of the air supply SA blown into the duct D1 (i.e., the target spaces SP).

(4) Remote Controller

The remote controller 2030 is an input apparatus with which a user inputs, to the air conditioning system 100, various commands such as ON/OFF of the air handling unit 2020, an operation type, a setting temperature, a setting humidity, a setting humidity, a setting air volume, and the like. The remote controller 2030 also functions as a display apparatus for displaying predetermined information (for example, the operation state of the air conditioning system 100, the temperature and the humidity of the interior air IA, the humidity and the temperature of the outside air OA, and the like).

Also, the remote controller 2030 is provided with, as various sensors, for example:

an indoor temperature sensor S4 (FIG. 22) configured to measure the temperature of the air (the interior air IA) of the target spaces SP;

an indoor humidity sensor S5 (FIG. 22) configured to measure the humidity; and a carbon dioxide density sensor S6 (FIG. 22) configured to measure a carbon dioxide density.

(5) Operations of Respective Apparatuses Constituting Air Conditioner in the ON State Next, operations of respective apparatuses constituting the air conditioner 110 in the ON state are explained. When the air conditioner 110 is in the ON state, normally, the water pump Pa operates to cause water to circulate in the water circuit C1. Also, the compressor 2121 operates to cause refrigerant to circulate in the refrigerant circuit C2.

When the air conditioner 110 is in the ON state, the heat of the water in the water circuit C1 is exchanged with the refrigerant in the refrigerant circuit C2 in the water heat exchanger 2122, so that the water in the water circuit C1 is cooled or heated to attain a target water temperature Tw, up. The water cooled or heated by the water heat exchanger 2122 is supplied to the air handling unit 2020, and the heat of the water is exchanged with the outside air OA in the air heat exchanger 2133 to be heated or cooled. The water having passed through the air heat exchanger 2133 is transferred to the water heat exchanger 2122 again.

During cooling operation, the refrigerant in the refrigerant circuit C2 is compressed by the compressor 2121 and is discharged as a high pressure refrigerant. In the outdoor heat exchanger 2124, the heat of the high pressure refrigerant discharged from the compressor 2121 is exchanged with air (outdoor air flow generated by the outdoor fan 2126), so that the high pressure refrigerant is condensed or radiates heat. The refrigerant having passed through the outdoor heat exchanger 2124 is decompressed by the expansion valve 2123 to become a low pressure refrigerant, and thereafter the low pressure refrigerant is transferred to the water heat exchanger 2122. The heat of the low pressure refrigerant transferred to the water heat exchanger 2122 is exchanged with the water in the water circuit C1, so that the low pressure refrigerant evaporates or is heated. The low pressure refrigerant having passed through the water heat exchanger 2122 is transferred to the compressor 2121 again.

Conversely, during the heating operation, the refrigerant in the refrigerant circuit C2 is compressed by the compressor 2121, and is discharged as a high pressure refrigerant. In the water heat exchanger 2122, the heat of the high pressure refrigerant discharged from the compressor 2121 is exchanged with the water in the water circuit C1, so that the high pressure refrigerant is condensed or radiates heat. The refrigerant having passed through the water heat exchanger 2122 is decompressed by the expansion valve 2123 to become a low pressure refrigerant, and thereafter, the low pressure refrigerant is transferred to the outdoor heat exchanger 2124. The heat of the low pressure refrigerant transferred to the outdoor heat exchanger 2124 is exchanged with air (an outdoor air flow generated by the outdoor fan 2126), so that the low pressure refrigerant evaporates or is heated. The low pressure refrigerant having passed through the outdoor heat exchanger 2124 is transferred to the compressor 2121 again.

In the air heat exchanger 2133 of the air handling unit 2020 during operation, the heat of the outside air OA is exchanged with water, so that the outside air OA is cooled, dehumidified, or heated. Air having passed through the air heat exchanger 2133 is blown as air supply SA to the target spaces SP. In this case, in a case where the humidifier 2135 is operating, the air having passed through the air heat exchanger 2133 is humidified by the humidifier 2135, and thereafter supplied as the air supply SA to the target spaces SP.

<Functions of Thermal Medium Control Apparatus>

Figure 22:
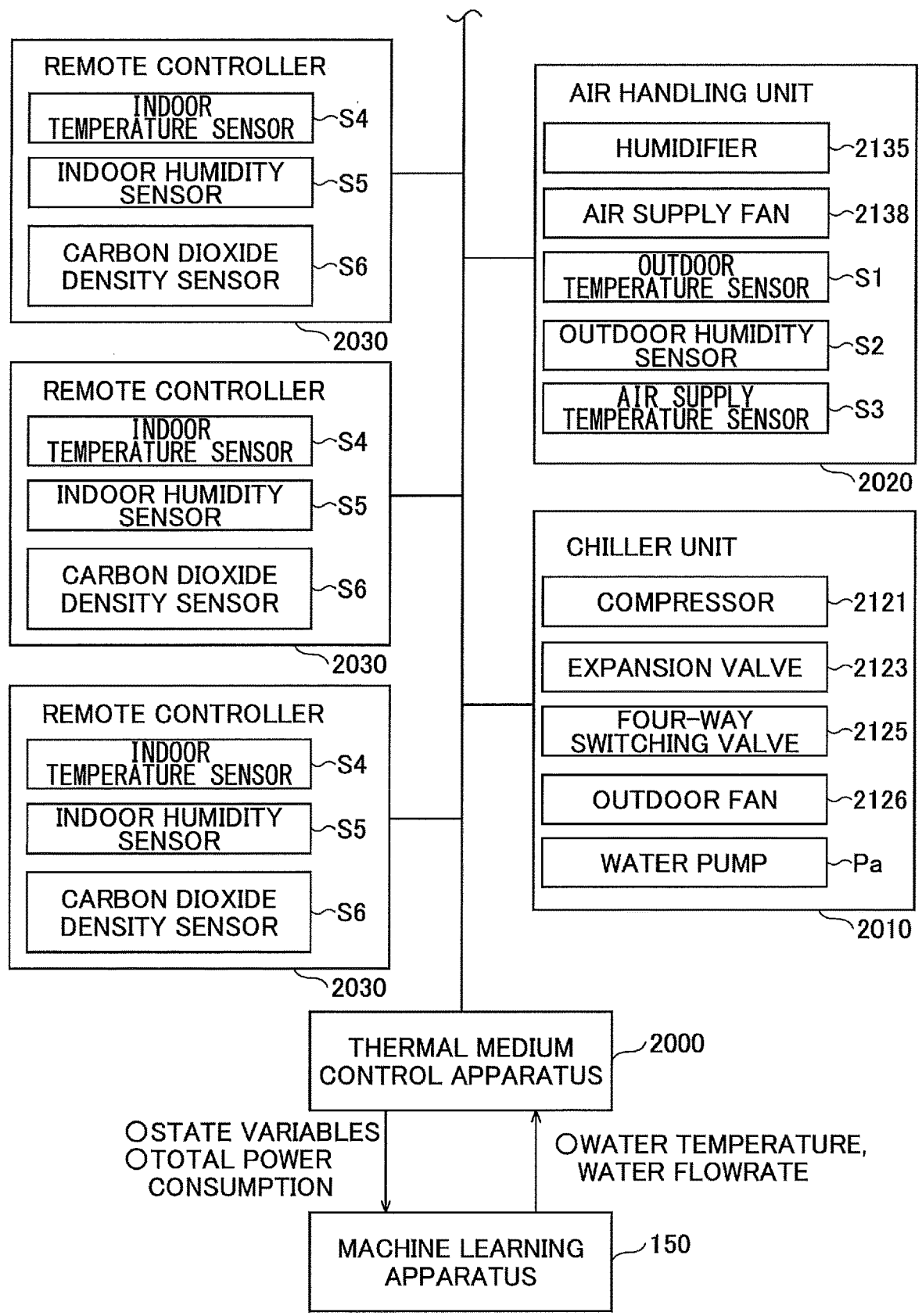
FIG. 22 is a second drawing for explaining the functions of a thermal medium control apparatus.

Next, the functions of the thermal medium control apparatus 2000 are briefly explained. FIG. 22 is a second drawing for explaining the functions of a thermal medium control apparatus. The thermal medium control apparatus 2000 is an apparatus for centrally controlling the air conditioning system 100, and is electrically connected to various sensors constituting the air conditioner 110, various driving apparatuses (a humidifier, a compressor, a pump, a fan, a valve), and the like.

Specifically, the thermal medium control apparatus 2000 controls operations of various driving apparatuses (a humidifier, a compressor, a pump, a fan, a valve, and the like) on the basis of the target value (a target water temperature Tw), up) of the temperature of the water circulating in the water circuit C1 that is output from the machine learning apparatus 150.

For example, the thermal medium control apparatus 2000 controls the volume of the compressor 2121, the opening degree of the expansion valve 2123, the state of the four-way switching valve 2125, the number of revolutions of the outdoor fan 2126, the number of revolutions of the water pump Pa, an ON/OFF of the humidifier 2135, or the number of revolutions of the air supply fan 2138, and the like. When the thermal medium control apparatus 2000 controls operations of various driving apparatuses, the thermal medium control apparatus 2000 obtains outputs of various sensors, and transmits and receives signals to and from the remote controller 2030.

Also, the thermal medium control apparatus 2000 identifies the operation condition of the chiller unit 2010 and the operation condition of the air handling unit 2020 on the basis of the outputs and the like of various sensors. Also, the thermal medium control apparatus 2000 identifies the load of the air handling unit 2020 on the basis of the outputs and the like of various sensors. Further, the thermal medium control apparatus 2000 transmits "state variables" including the operation condition of the chiller unit 2010, the operation condition of the air handling unit 2020, and the load of the air handling unit 2020 to the machine learning apparatus 150.

The operation condition of the chiller unit 2010 included in the state variables includes:
  an outdoor temperature during cooler operation and an ambient wet-bulb temperature during heater operation (which are, however, actually read as values of the frequency of the compressor 2121, the state of the four-way switching valve 2125, the number of revolutions of the outdoor fan 2126, and the number of revolutions of the water pump Pa).

The operation condition of the air handling unit 2020 included in the state variables includes:
  a coil entrance air temperature of the air handling unit 2020 (alternatively, the temperature of the outside air OA outside of the target spaces SP, and the temperature of the interior air IA in the target spaces SP). The coil entrance air temperature is measured by the outdoor temperature sensor S1. The temperature of the interior air IA in the target spaces SP is measured by the indoor temperature sensor S4.

The operation condition of the air handling unit 2020 included in the state variables further includes:
  a coil entrance air humidity of the air handling unit 2020 (alternatively, the humidity of the outside air OA of the target spaces SP, the humidity of the interior air IA in the target spaces SP). The coil entrance air humidity is measured by the outdoor humidity sensor S2. The humidity of the interior air IA in the target spaces SP is measured by the indoor humidity sensor S5.

The operation condition of the air handling unit 2020 included in the state variables still further includes:
  the air volume of the air supply fan 2138.

The load of the air handling unit 2020 includes:
  the air supply setting temperature of the air handling unit 2020. The air supply setting temperature is identified on the basis of a command that is input to the remote controller 2030 (a command related to the setting temperature).

The load of the air handling unit 2020 further includes:
  the air supply setting humidity of the air handling unit 2020. The air supply setting humidity is identified on the basis of a command that is input to the remote controller 2030 (a command related to the setting humidity).

In the present embodiment, the thermal medium control apparatus 2000 identifies and transmits the power consumptions of various driving apparatuses to the machine learning apparatus 150. The power consumptions of various driving apparatuses include:
  the power consumption of the chiller unit 2010;
  the power consumption of the air handling unit 2020; and
  the power consumption of the water pump Pa.

Further, in the present embodiment, the thermal medium control apparatus 2000 outputs the state variables and the power consumptions to the machine learning apparatus 150, and in response, the thermal medium control apparatus 2000 receives, from the machine learning apparatus 150, at least any one of:
  the target value (target water temperature) of the water temperature; and,
  the target value (target water quantity) of a water flowrate.

The thermal medium control apparatus 2000 controls operations of the air conditioner 110 (the compressor 2121, the expansion valve 2123, the four-way switching valve 2125, the outdoor fan 2126, the water pump Pa, the air supply fan 2138, and the like),
  on the basis of the target value of the obtained water temperature; or
  on the basis of the target value of the water flowrate.

<Functional Configuration of Machine Learning Apparatus>

Figure 23:
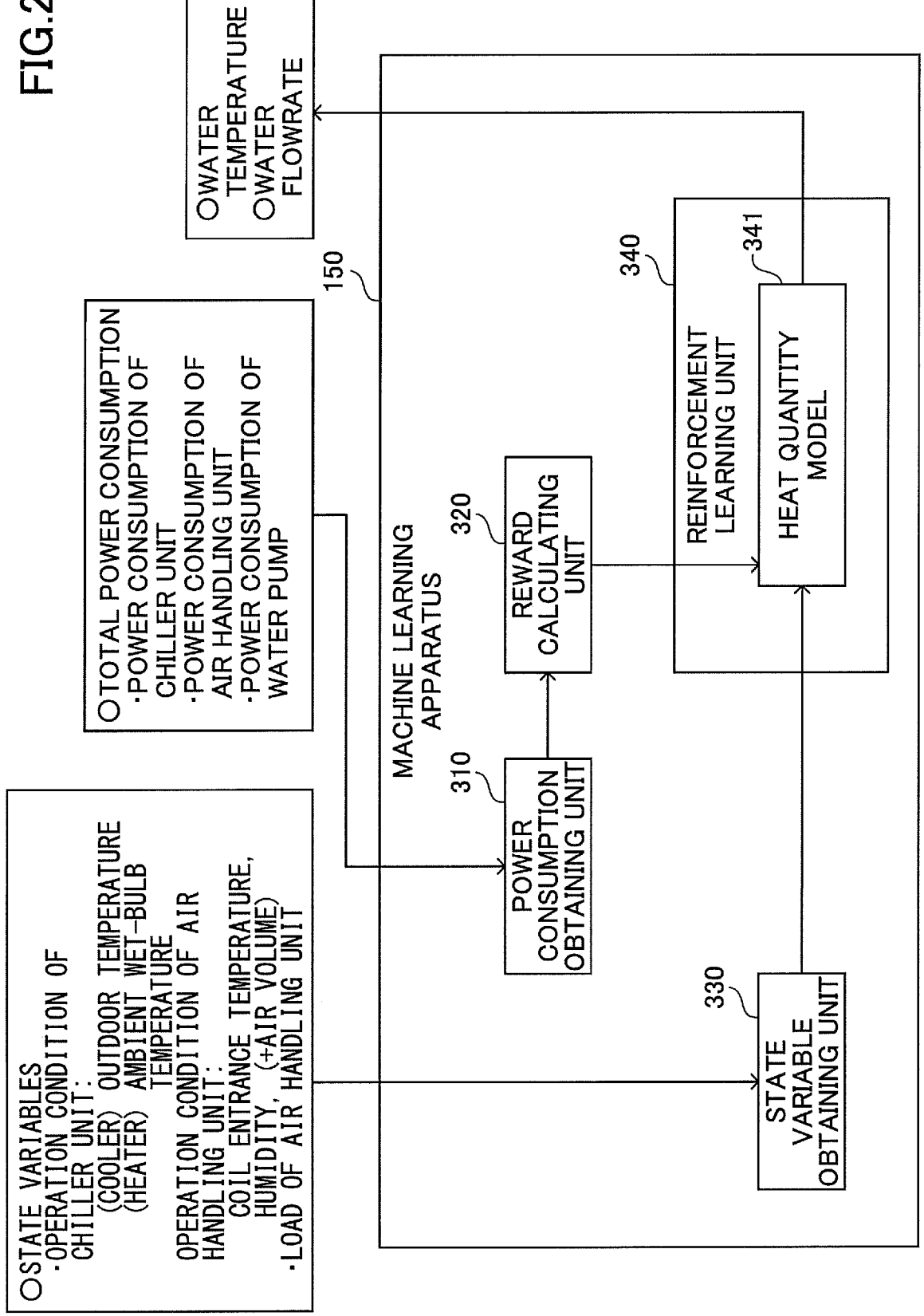
FIG. 23 is a fifth drawing illustrating an example of a functional configuration of the machine learning apparatus.

Next, the functional configuration of the machine learning apparatus 150 is explained. FIG. 23 is a fifth drawing illustrating an example of a functional configuration of the machine learning apparatus.

As described above, the machine learning program is installed in the machine learning apparatus 150, and when the machine learning program is executed, the machine learning apparatus 150 functions as the power consumption obtaining unit 310, the reward calculating unit 320, the state variable obtaining unit 330, and the reinforcement learning unit 340.

The power consumption obtaining unit 310 obtains, from the thermal medium control apparatus 1500, the power consumptions (the power consumption of the chiller unit 2010, the power consumption of the air handling unit 2020, and the power consumption of the water pump Pa). Also, the power consumption obtaining unit 310 calculates the obtained total value of the power consumption, and provides notification of the calculated total power consumption to the reward calculating unit 320.

The reward calculating unit 320 calculates a reward on the basis of the total power consumption notified from the power consumption obtaining unit 310, and provides notification of the reward to the reinforcement learning unit 340.

The state variable obtaining unit 330 obtains, from the thermal medium control apparatus 1500, the state variables (the operation condition of the chiller unit 2010, the operation condition of the air handling unit 2020, and the load of the air handling unit 2020), and provides notification of the state variables to the reinforcement learning unit 340.

The reinforcement learning unit 340 includes a heat quantity model 341, and changes the model parameters of the heat quantity model 341 so that the reward provided by the reward calculating unit 320 is maximized. Accordingly, the reinforcement learning unit 340 performs reinforcement learning with respect to the heat quantity model 341 in which:
  the state variable; and
  at least any one of the target value of the water temperature and the target value of the water flowrate,
  are associated with each other.

The reinforcement learning unit 340 obtains at least any one of:
  the target value of the water temperature; and,
  the target value of the water flowrate,
  which are calculated by inputting the current state variables provided by the state variable obtaining unit 330 into the heat quantity model 341 in which the model parameters have been changed. The reinforcement learning unit 340 transmits the obtained target value to the air conditioner 110. Accordingly, the air conditioner 110 operates to achieve the received target value. As a result, the machine learning apparatus 150 can reduce the power consumption of the air conditioner 110.

<Flow of Reinforcement Learning Processing>

Figure 24:
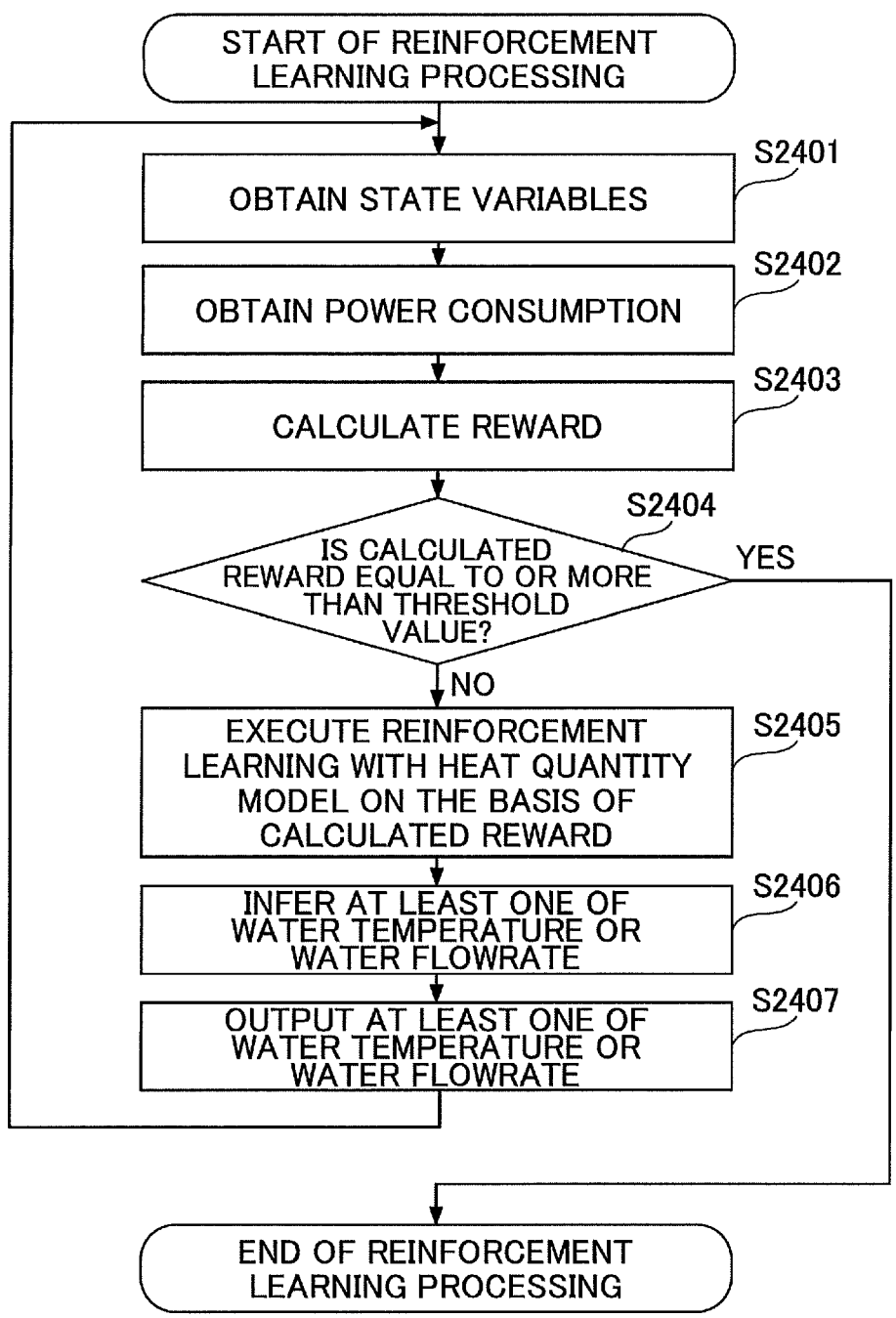
FIG. 24 is a fifth flowchart illustrating a flow of reinforcement learning processing performed by the machine learning apparatus.

Next, a flow of the reinforcement learning processing performed by the machine learning apparatus 150 is explained. FIG. 24 is a fifth flowchart illustrating a flow of reinforcement learning processing performed by the machine learning apparatus.

In step S2401, the state variable obtaining unit 330 obtains the state variables for the predetermined period of time from the thermal medium control apparatus 2000.

In step S2402, the power consumption obtaining unit 310 obtains each power consumption from the thermal medium control apparatus 2000, and calculates the total value.

In step S2403, the reward calculating unit 320 calculates a reward on the basis of the calculated total power consumption.

In step S2404, the reward calculating unit 320 determines whether the calculated reward is equal to or more than the predetermined threshold value. In a case where it is determined that the calculated reward is not equal to or more than the predetermined threshold value in step S2404 ("NO" in step S2404), the reward calculating unit 320 proceeds to step S2405.

In step S2405, the reinforcement learning unit 340 performs machine learning so as to maximize the calculated reward heat quantity model 341.

In step S2406, the reinforcement learning unit 340 executes the heat quantity model 341 by inputting the current state variables into the heat quantity model 341. Accordingly, the reinforcement learning unit 340 outputs at least any one of the target value of the water temperature and the target value of the water flowrate.

In step S2407, the reinforcement learning unit 340 transmits the output target value to the thermal medium control apparatus 2000, and thereafter, returns back to step S2401.

Conversely, in a case where it is determined that the calculated reward is equal to or more than the predetermined threshold value in step S2404 ("YES" in step S2404), the reinforcement learning unit 340 ends the reinforcement learning processing.

<Summary>

As can be understood from the above explanation, in the eighth embodiment, the air conditioning system including the chiller unit and the air handling unit can optimize the transfer of the heat quantity in the water circuit.

Ninth Embodiment

In the eighth embodiment, the air conditioning system including the chiller unit and the air handling unit has been explained. In contrast, in the ninth embodiment, an air conditioning system including a fan coil unit instead of the air handling unit is explained as a modified embodiment of the eighth embodiment.

System Configuration of Air Conditioning System (First Modified Embodiment)

Figure 25:
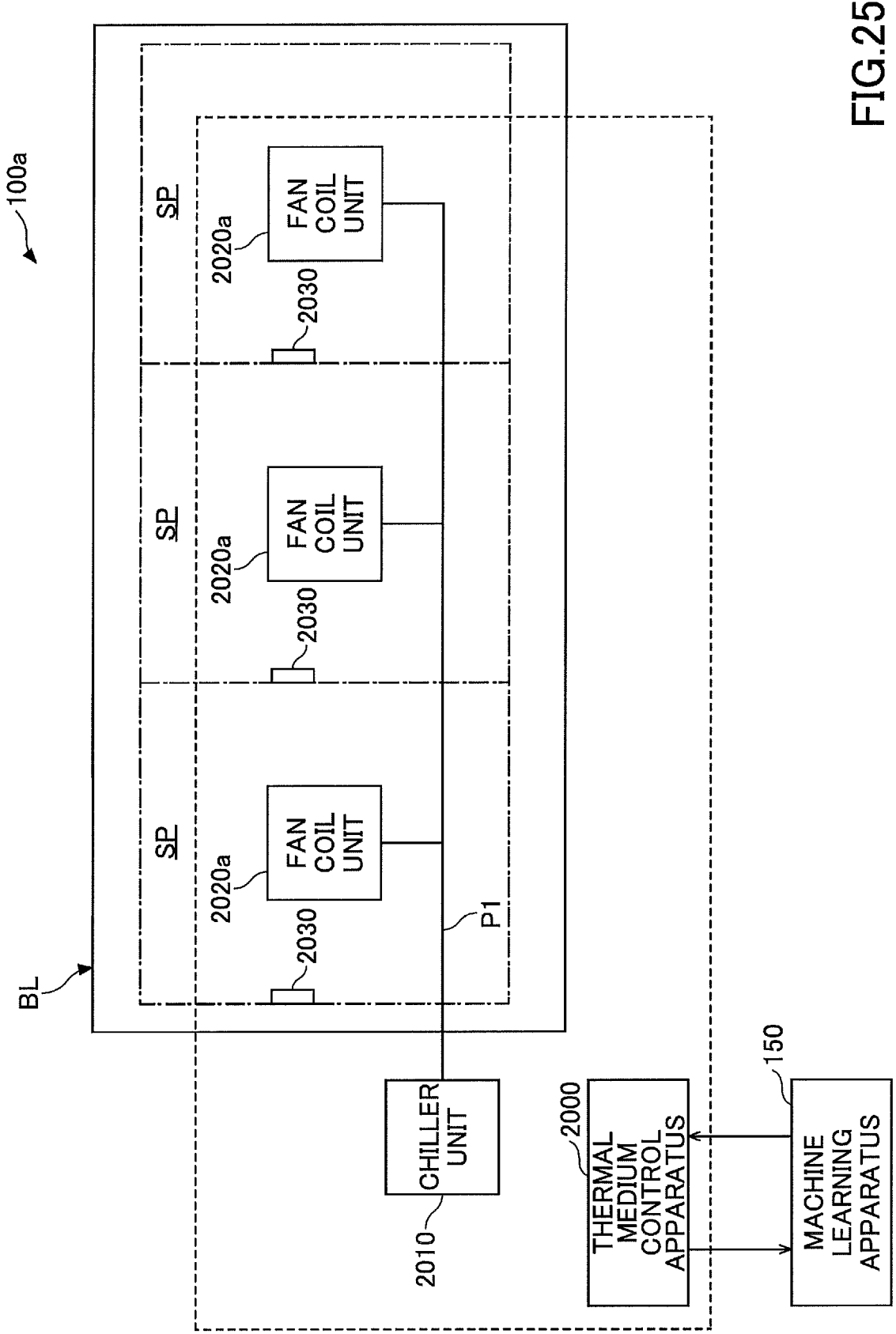
FIG. 25 is a second drawing illustrating an example of a system configuration of an air conditioning system including a water circuit.
Figure 26:
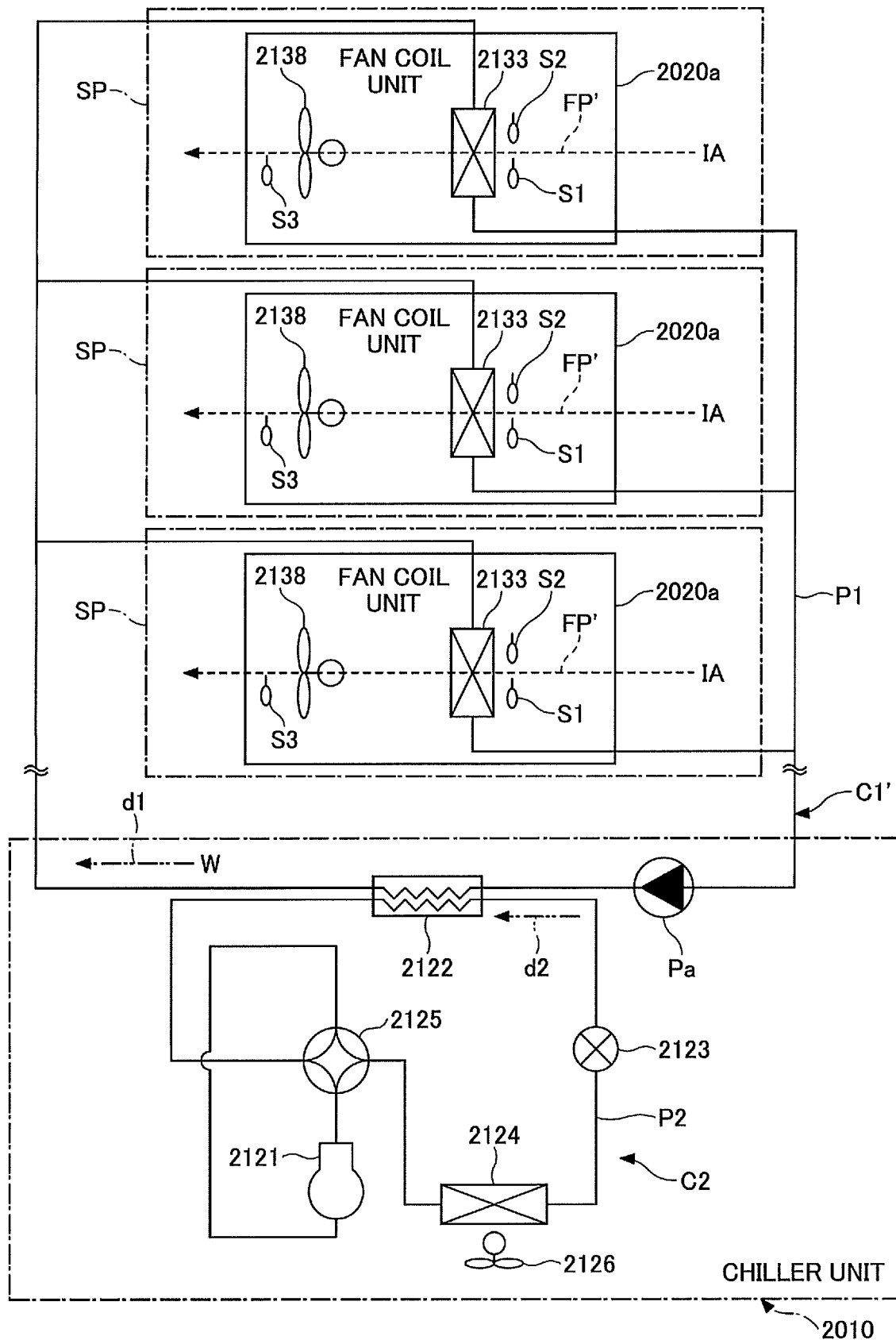
FIG. 26 is a second drawing illustrating a detailed configuration of an air conditioner.

FIG. 25 is a second drawing illustrating an example of a system configuration of an air conditioning system including a water circuit. FIG. 26 is a second drawing illustrating a detailed configuration of an air conditioner.

As illustrated in FIG. 25, the air conditioning system 100a includes multiple fan coil units 2020a (in this case, fan coil units 2020a equal in number of the number of target spaces SP), instead of the air handling unit 2020. During operation, in the air conditioning system 100a, the fan coil units 2020a takes air (interior air IA) into the target spaces SP, cools, heats, or dehumidifies the air, and supplies the air as air supply SA to the target spaces SP. In the present embodiment, it is not necessary to provide a humidification function.

As illustrated in FIG. 26, the chiller unit 2010 and the fan coil unit 2020a have a water circuit C1' instead of the water circuit C1. The water circuit C1' is constituted such that, mainly, an air heat exchanger 2133 provided in each fan coil unit 2020a and a water heat exchanger 2122 and a water pump Pa provided in the chiller unit 2010 are connected by a first piping P1.

The fan coil unit 2020a is an example of an "air-conditioning apparatus", and is configured to cool, dehumidify, or heat the interior air IA. The fan coil units 2020a are arranged in the target spaces SP.

Figure 27:
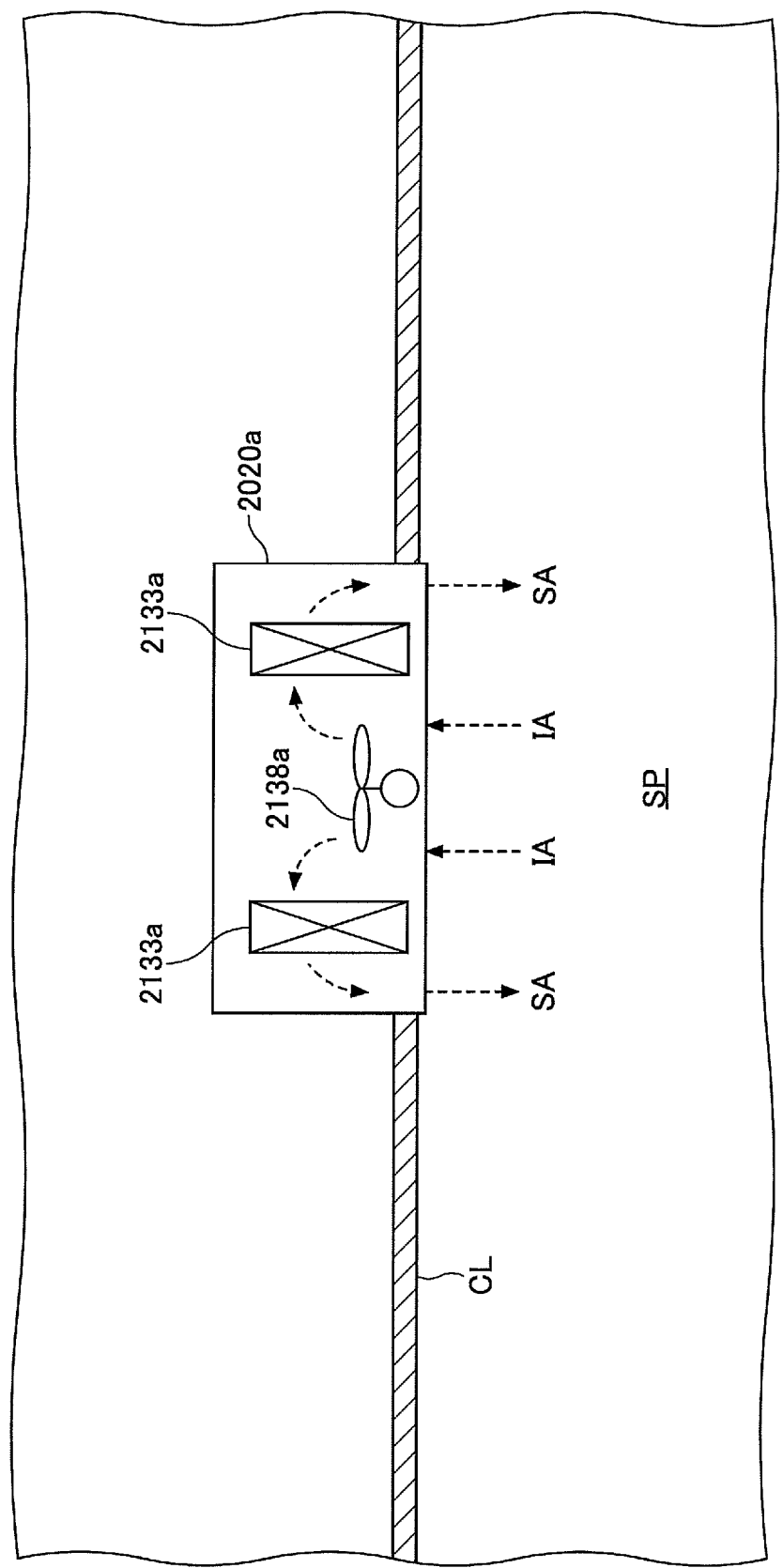
FIG. 27 is a first drawing illustrating how a fan coil unit is installed in a target space.

FIG. 27 is a first drawing illustrating how a fan coil unit is installed in a target space. In the present embodiment, it is assumed that a ceiling-mounted type mounted in a ceiling CL of the target space SP is employed for each fan coil unit 2020a. As illustrated in FIG. 27, the fan coil unit 2020a is mounted such that a ventilation outlet is exposed from the ceiling CL in the target space SP.

Similarly to the air handling unit 2020, each fan coil unit 2020a includes an air heat exchanger 2133a and an air supply fan 2138a. The air heat exchanger 2133a and the air supply fan 2138a are arranged in an order from the windward side to the leeward side of the air flow path FP' in which the interior air IA flows. In each fan coil unit 2030a, the end portion on the air flow path FP' on the leeward side is in communication with the target space SP. Unlike the air handling unit 2020, the fan coil unit 2020a is not connected to the duct D1. Instead of blowing the air supply SA into the target spaces SP by taking in the outside air OA, the fan coil unit 2020a takes in the interior air IA, cools, dehumidifies, or heats the interior air IA, and blows the air supply SA into the target space SP.

In the air conditioning system 100a including the fan coil unit 2020a as illustrated in FIG. 25, the machine learning apparatus 150 can also output, as the target value of the water temperature or the target value of the water flowrate, the optimum target values for reducing the power consumption according to a method similar to the eighth embodiment.

In the air conditioning system 100a, even in a case where the fan coil unit 2020a and the air handling unit 2020 are arranged in a mixed manner, the machine learning apparatus 150 can output an optimum target value according to a method similar to the eighth embodiment.

The number of fan coil units 2020a does not have to be the same number as the target spaces SP, and may be more than or less than the number of target spaces SP. For example, multiple fan coil units 2020a may be arranged in a single target space SP.

System Configuration of Air Conditioning System (Second Modified Embodiment)

Figure 28:
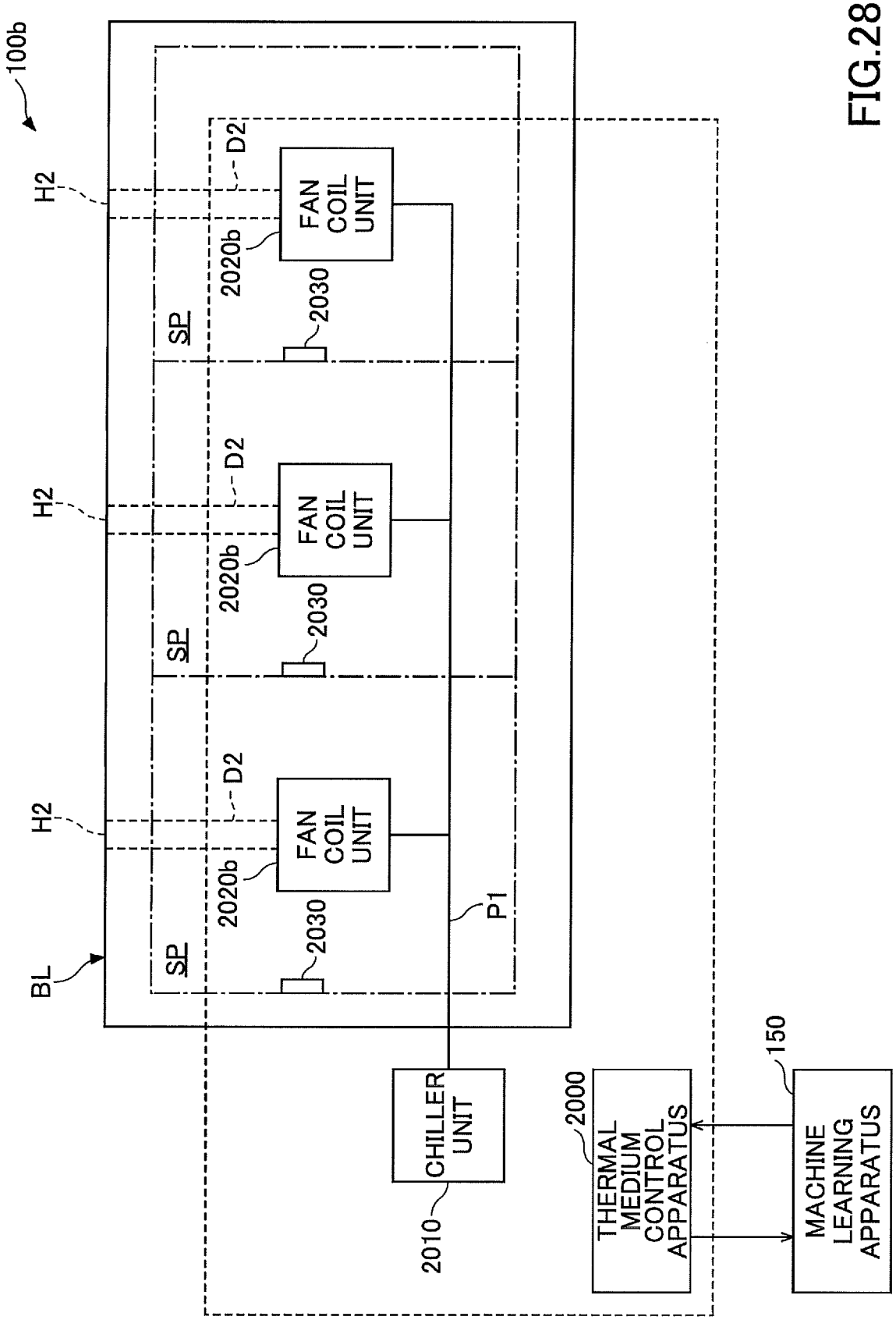
FIG. 28 is a third drawing illustrating an example of a system configuration of the air conditioning system including the water circuit.
Figure 29:
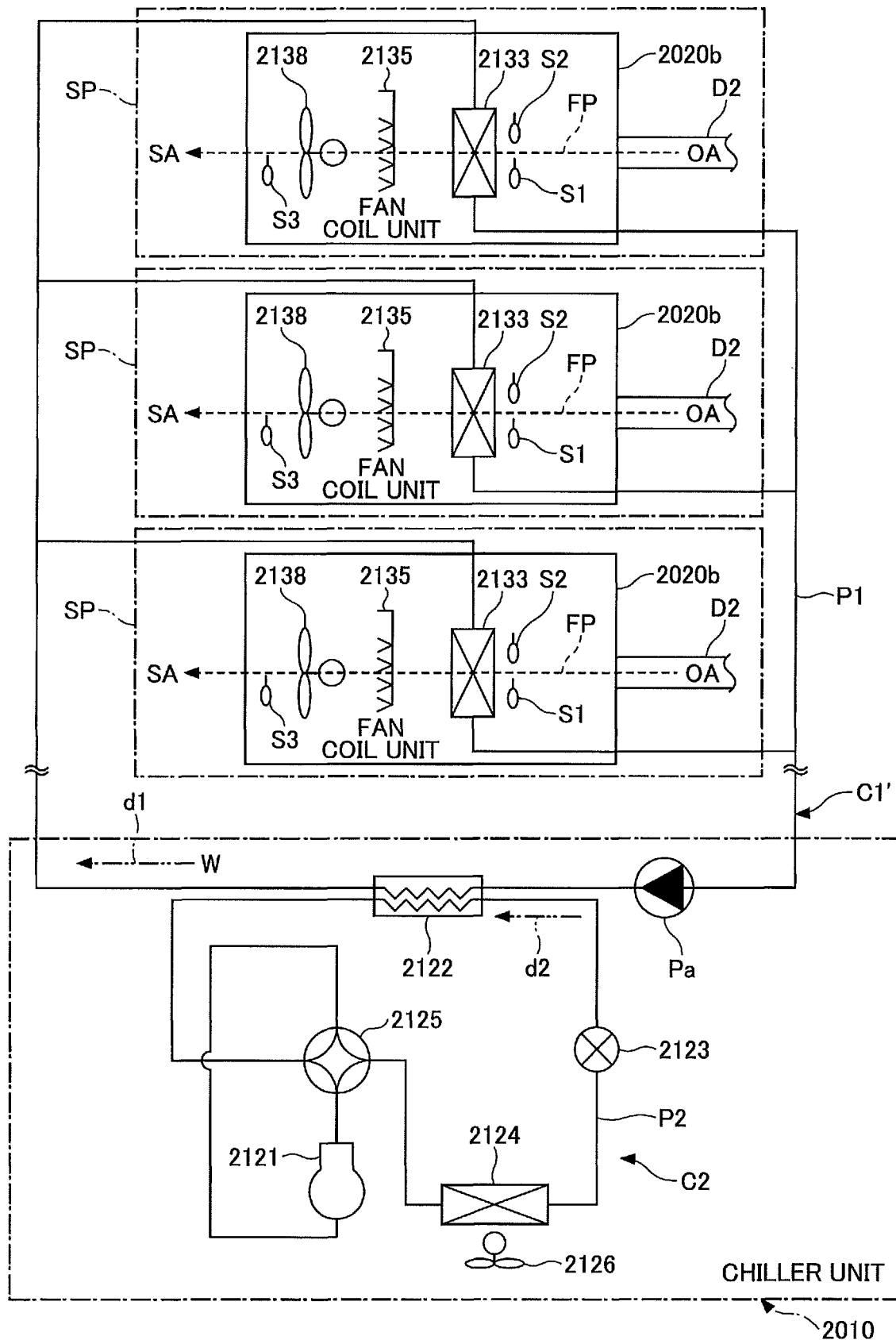
FIG. 29 is a third drawing illustrating a detailed configuration of an air conditioner.

Next, another modified embodiment is explained. FIG. 28 is a third drawing illustrating an example of a system configuration of the air conditioning system including the water circuit. FIG. 29 is a third drawing illustrating a detailed configuration of an air conditioner. Hereinafter, difference in detailed configuration between the air conditioning system 100a as illustrated in FIG. 25 and the air conditioner as illustrated in FIG. 26 is mainly explained.

As illustrated in FIG. 28, the air conditioning system 100b includes a fan coil unit 2020b instead of the fan coil unit 2030a. During operation, in the air conditioning system 100b, the fan coil units 2020b takes in outside air OA via the duct D2, cools, heats, dehumidifies, or humidifies the outside air OA, and supplies the air supply SA to the target spaces SP.

The fan coil unit 2020b is an example of an "air-conditioning apparatus", and includes an air heat exchanger 2133, a humidifier 2135, and an air supply fan 2138, in a manner similar to the fan coil unit 2020a (see FIG. 29).

As illustrated in FIG. 29, the air heat exchanger 2133, the humidifier 2135, and the air supply fan 2138 are arranged in an order from the windward side to the leeward side of the air flow path FP in which the outside air OA flows. Unlike the fan coil unit 2020a, the fan coil unit 2020b is configured such that the end portion on the windward side of the air flow path FP is connected to the duct D2. The fan coil unit 2020b takes in the outside air OA via the duct D2, cools, dehumidifies, heats or humidifies the outside air OA, and supplies the air supply SA to the target space SP.

In the present embodiment, the fan coil unit 2020b is associated with any one of the target spaces SP, and is installed in the corresponding target space SP. FIG. 30 is a second drawing illustrating how a fan coil unit is installed in a target space. In the present embodiment, it is assumed that a ceiling-mounted type mounted in a ceiling CL of the target space SP is employed for each fan coil unit 2020b. As illustrated in FIG. 30, the fan coil unit 2020b is mounted such that a ventilation outlet is exposed from the ceiling CL in the target space SP.

In FIG. 30, the duct D2 is a member constituting the flow path of the outside air OA. The first end of the duct D2 is connected to the corresponding fan coil unit 2030b, so that the outside air OA is taken into the fan coil unit 2020b with the air supply fan 2138 being driven. Also, the second end thereof is connected to a ventilation inlet H2 (see FIG. 28) formed in the target space SP.

In the air conditioning system 100b having the fan coil unit 2020b as illustrated in FIG. 28, the machine learning apparatus 150 can output, as the target value of the water temperature or the target value of the water flowrate, an optimum target value for reducing the power consumption, according to a method similar to the eighth embodiment.

Also, even in a case where,
the fan coil unit 2020b; and
the air handling unit 2020 and/or the fan coil unit 2020a,
are arranged in a mixed manner in the air conditioning system 100b, the machine learning apparatus 150 can output an optimum target value by using a method similar to the eighth embodiment.

<Summary>

As can be understood from the above explanation, in the ninth embodiment, the air conditioning system including the chiller unit and the fan coil unit can optimize the transfer of the heat quantity in the water circuit.

Other Embodiments

In each of the above embodiments, the timing for obtaining the power consumption used for calculation of the reward has not been mentioned. However, for example, the power consumption obtaining unit 310 may obtain the power consumption after a predetermined period of time elapses since the reinforcement learning unit 340 transmits the target value of at least one of the temperature and the flowrate of the thermal medium.

Also, in each of the above embodiments, it has been explained that the reward is calculated using the total value of the power consumption, but the total value of the energy consumption used for calculation of the reward is not limited to the total value of the power consumption. For example, the total value of the energy consumptions such as coefficient of performance (COP), carbon dioxide discharge quantity, energy cost (electricity fee, gas fee), and the like may be used to calculate the reward.

Also, in each of the above embodiments, the details of the model (heat quantity model) used for performing machine learning have not been particularly explained, but any type of model is to be assumed to the model used for performing the machine learning. Specifically, any type of model such as an NN (Neural Network) model, a random forest model, an SVM (Support Vector Machine) model, and the like is applicable.

Also, the air conditioning system 100 according to the above eighth embodiment may be configured not to perform a heating operation. In other words, the chiller unit 2010 is not necessarily a heat pump type.

Also, in the air conditioning system 100b according to the above ninth embodiment, the humidifier 2135 may be omitted as appropriate. Specifically, the air conditioning system 100b may be configured not to perform a humidifying operation.

Also, in the above ninth embodiment, a case where the air conditioning system 100b is applied to the building BL including three target spaces SP has been explained. However, the environment in which the air conditioning system 100 is installed is not limited thereto. For example, the air conditioning system 100b may be applied to a building including four or more target spaces SP. For example, the air conditioning system 100b may be applied to a building including two or less target spaces SP (including one target space SP). In such a case, the number of fan coil units 2020b may be changed as appropriate according to the number of target spaces SP. Multiple fan coil units may be arranged in a single target space SP.

Also, in the above eighth embodiment, it has been explained that the air conditioning system 100 includes the single chiller unit 2010 and the single air handling unit 2020. However, the number of chiller units 2010 and the number of air handling units 2020 provided in the air conditioning system 100 are not necessarily limited to one, and may be changed as appropriate according to the environment of installation and the specification of design. In other words, the air conditioning system 100 may include multiple chiller units 2010 and/or multiple air handling units 2020. The number of chiller units 2010 and the number of air handling units 2020 do not have to be necessarily the same.

Also, in the above eighth embodiment, it has been explained that all the air flowing into the air handling unit 2020 is outside air. However, the air flowing into the air handling unit 2020 is not limited thereto. For example, the air flowing into the air handling unit 2020 may be a mixture of outside air and return air, or may be totally interior air.

Also, how the refrigerant circuit (C2) is configured in the above eighth and ninth embodiments may be changed as appropriate according to the environment of installation and the specification of design. For example, in a case where the heating operation is omitted, the four-way switching valve 2125 may be omitted. Also, a water heat exchanger may be arranged instead of the outdoor heat exchanger 2124, and in the water heat exchanger, heat exchange may be performed between refrigerant and water to cool or heat the refrigerant. Also, how the water circuit C1 is configured in the air handling unit 2020 may be changed as appropriate according to the environment of installation and the specification of design.

Also, the refrigerant circulating in the refrigerant circuit (C2) in the above eighth and ninth embodiment is assumed to be an HFC refrigerant such as R32 and R410A, but does not have to be necessarily the HFC refrigerant. For example, other refrigerants (for example, HFO1234yf, HFO1234ze (E), CO2, ammonia, and the like) may be used. The thermal medium circulating in the water circuit C1 does not have to be necessarily water, and other fluids may be used.

The positions where various sensors included in the air conditioning system 100 are arranged are not necessarily limited to the aspects of the above eighth and ninth embodiments, and may be changed as appropriate. For example, the outdoor temperature sensor S1, the outdoor humidity sensor S2, and the air supply temperature sensor S3 do not have to be necessarily arranged in the air handling unit 2020, and may be arranged in other units or arranged independently. The indoor temperature sensor S4, the indoor humidity sensor S5, and/or the carbon dioxide density sensor S6 do not have to be necessarily arranged in the remote controller 2030, and may be arranged in other units or arranged independently.

Also, in the above eighth and ninth embodiment, how the machine learning apparatus 150 is installed has not been particularly explained, but how the machine learning apparatus 150 is installed may be chosen as appropriate. For example, the thermal medium control apparatus 2000 may be installed in a manager's room of the building BL, or may be installed at a remote location communicably connected via a WAN or a LAN.

Also, how the thermal medium control apparatus 2000 and the machine learning apparatus 150 are configured may be changed as appropriate. For example, the thermal medium control apparatus 2000 and the machine learning apparatus 150 may be arranged integrally, or may be arranged in a distributed manner and connected via a communication network. Even in a case where the thermal medium control apparatus 2000 and the machine learning apparatus 150 are arranged integrally, the thermal medium control apparatus 2000 and the machine learning apparatus 150 may be constituted by a single computer, or, may be constituted by connecting multiple devices (for example, a PC, a smartphone, or the like).

Although a description has been given of the embodiments, it may be understood that various modifications may be made to the configurations and details thereof, without departing from the subject matter and scope of the claims.

This application is based on and claims priority to Japanese Patent Application No. 2019-086781 filed on Apr. 26, 2019, Japanese Patent Application No. 2019-086782 filed on Apr. 26, 2019, and Japanese Patent Application No. 2019-086785 filed on Apr. 26, 2019, and the entirety of the contents of the foregoing Japanese Patent Applications are incorporated herein by reference.

DESCRIPTION OF REFERENCE SYMBOLS

100: air conditioning system
110: air conditioner
120: heat-providing side
130: thermal transfer apparatus
140: heat-using side
150: machine learning apparatus
310: power consumption obtaining unit
320: reward calculating unit
330: state variable obtaining unit
340: reinforcement learning unit
341: heat quantity model
1110: risk information obtaining unit
1310: upper-and-lower limit value limiting unit
1500: thermal medium control apparatus
1510: cooling tower
1520: water-cooled chiller group
1530: primary-side cold water pump
1540: secondary-side cold water pump
1550: air-conditioning apparatus
2000: thermal medium control apparatus
2010: chiller unit
2020: air handling unit
2020a, 2020b: fan coil unit

The invention claimed is:

1. A machine learning apparatus for learning at least one of a temperature or a flowrate at which a thermal transfer apparatus transfers a thermal medium in an air conditioning system including a device on a heat-providing side, a device on a heat-using side, and the thermal transfer apparatus configured to transfer the thermal medium from the device on the heat-providing side to the device on the heat-using side, the machine learning apparatus comprising:
a memory; and
a processor coupled to the memory and configured to:
  obtain state variables including an operation condition of the device on the heat-providing side, an operation condition of the device on the heat-using side, and a value correlated with a heat quantity required by the device on the heat-using side;
  perform learning by associating the state variables with the at least one of the temperature or the flowrate; and
  calculate a reward, based on a total value of a power consumption of the device on the heat-providing side, a power consumption of the device on the heat-using side, and a power consumption of the thermal transfer apparatus,
wherein the processor is configured to:
  perform the learning by using the calculated reward, and
  control, based on the calculated reward, the air conditioning system to reduce power consumption.

2. The machine learning apparatus according to claim 1, wherein the operation condition of the device on the heat-providing side includes any one of an outdoor temperature, an ambient wet-bulb temperature, or an underground temperature that affect a processing performance of the device on the heat-providing side.

3. The machine learning apparatus according to claim 1, wherein the operation condition of the device on the heat-using side includes either an intake air temperature or a cold water return temperature that affect a processing performance of the device on the heat-using side.

4. The machine learning apparatus according to claim 3, wherein the operation condition of the device on the heat-using side further includes either an air volume or a cold water flowrate.

5. The machine learning apparatus according to claim 1, wherein the value correlated with the heat quantity required by the device on the heat-using side includes either an air supply temperature or a cold water supply temperature.

6. The machine learning apparatus according to claim 5, wherein a temperature at which the thermal transfer apparatus transfers the thermal medium includes a cold water supply temperature or a cooling water supply temperature, and a flowrate at which the thermal transfer apparatus transfers the thermal medium includes either a cold water flowrate or a cooling water flowrate.

7. The machine learning apparatus according to claim 1, wherein the device on the heat-providing side includes an air-cooled chiller, the device on the heat-using side includes an air-conditioning apparatus, and the thermal transfer apparatus includes a cold water pump.

8. The machine learning apparatus according to claim 1, wherein the device on the heat-providing side includes a cooling tower, the device on the heat-using side includes a water-cooled chiller, and the thermal transfer apparatus includes a cooling water pump.

9. The machine learning apparatus according to claim 1, wherein the device on the heat-providing side includes an underground heat exchanger, the device on the heat-using side includes a water-cooled chiller, and the thermal transfer apparatus includes a cooling water pump.

10. The machine learning apparatus according to claim 1, wherein the device on the heat-providing side includes a cooling tower, a cooling water pump, and a water-cooled chiller, the device on the heat-using side includes an air-conditioning apparatus, and the thermal transfer apparatus includes a cold water pump.

11. The machine learning apparatus according to claim 1, wherein the device on the heat-providing side includes a cooling tower, the device on the heat-using side includes a water-cooled chiller, a cold water pump, and an air-conditioning apparatus, and the thermal transfer apparatus includes a cooling water pump.

12. The machine learning apparatus according to claim 1, wherein in a case where a risk of the air conditioning system increases when the device on the heat-providing side is caused to operate based on at least any one of the temperature or the flowrate learned by the learning unit, the reward calculating unit decreases the reward.

13. The machine learning apparatus according to claim 1, wherein in a case where at least any one of the temperature or the flowrate learned by the learning unit exceeds an upper limit value or a lower limit value determined in advance, the device on the heat-providing side is caused to operate based on the upper limit value or the lower limit value determined in advance.

14. An air conditioning system comprising a device on a heat-providing side, a device on a heat-using side, a thermal transfer apparatus configured to transfer a thermal medium from the device on the heat-providing side to the device on the heat-using side, and the machine learning apparatus of claim 1.

15. A machine learning method for causing the machine learning apparatus of claim 1 to learn at least one of the temperature or the flowrate.

16. A machine learning apparatus for learning at least one pair of: a pair of temperatures that are a temperature of cooling water supplied by a cooling water pump and a temperature of cold water supplied by a cold water pump; or a pair of flowrates that are a flowrate of the cooling water supplied by the cooling water pump and a flowrate of the cold water supplied by the cold water pump, in an air conditioning system including a water-cooled chiller, a cooling water pump configured to supply cooling water for cooling refrigerant by performing heat exchange in the water-cooled chiller, a cooling tower configured to bring the cooling water transferred from the water-cooled chiller into contact with outside air to cool the cooling water, an air-conditioning apparatus, and a cold water pump configured supply the cold water cooled by the refrigerant in the heat exchange performed in the water-cooled chiller to the air-conditioning apparatus,
wherein the machine learning apparatus comprises:
a memory; and
a processor coupled to the memory and configured to:
obtain state variables including an operation condition of the cooling tower, an operation condition of the air-conditioning apparatus, and a load of the air-conditioning apparatus;
perform learning by associating the state variables with the at least one pair; and
calculate a reward, based on a total value of energy consumptions of the cooling tower, the water-cooled chiller, the cooling water pump, the cold water pump, and the air-conditioning apparatus,
wherein the processor is configured to:
perform the learning by using the calculated reward, and
control, based on the calculated reward, the air conditioning system to reduce power consumption.

17. A machine learning apparatus for learning at least one of a temperature or a flowrate of a thermal medium supplied by a pump, in an air conditioning system including a heat source apparatus configured to heat or cool the thermal medium, the pump configured to discharge the thermal medium heated or cooled by the heat source apparatus, and a heat exchanger configured to perform heat exchange between passing air and the thermal medium discharged from the pump, wherein the air-conditioning apparatus blows the air having passed through the heat exchanger to a target space,
wherein the machine learning apparatus comprises:
a memory; and
a processor coupled to the memory and configured to:
obtain state variables including an operation condition of the heat source apparatus, an operation condition of the air-conditioning apparatus, and a load of the air-conditioning apparatus;
perform learning by associating the state variables with at least one of the temperature or the flowrate of the thermal medium; and calculate a reward, based on a total value of energy consumptions of the heat source apparatus, the air-conditioning apparatus, and the pump,
wherein the processor is configured to:
perform the learning by using the calculated reward, and
control, based on the calculated reward, the air conditioning system to reduce power consumption.

* * * * *